United States Patent
Lee et al.

(10) Patent No.: US 12,455,245 B2
(45) Date of Patent: Oct. 28, 2025

(54) CANCER DIAGNOSIS USING RAMAN SIGNAL OF URINE

(71) Applicant: SAMSUNG LIFE PUBLIC WELFARE FOUNDATION, Seoul (KR)

(72) Inventors: Min Young Lee, Seoul (KR); Dong Il Choi, Seoul (KR); Jung Bin Phyo, Seoul (KR); Ho Jae Yu, Incheon (KR); A Young Woo, Gyeonggi-do (KR)

(73) Assignee: SAMSUNG LIFE PUBLIC WELFARE FOUNDATION, Seoul (KR)

( * ) Notice: Subject to any disclaimer, the term of this patent is extended or adjusted under 35 U.S.C. 154(b) by 637 days.

(21) Appl. No.: 17/802,250

(22) PCT Filed: Feb. 26, 2021

(86) PCT No.: PCT/KR2021/002473
§ 371 (c)(1),
(2) Date: Aug. 25, 2022

(87) PCT Pub. No.: WO2021/172944
PCT Pub. Date: Sep. 2, 2021

(65) Prior Publication Data
US 2023/0083533 A1    Mar. 16, 2023

(30) Foreign Application Priority Data

Feb. 26, 2020 (KR) .................. 10-2020-0023553
Feb. 24, 2021 (KR) .................. 10-2021-0025150

(51) Int. Cl.
*G01N 21/65* (2006.01)
*G01N 1/40* (2006.01)
(Continued)

(52) U.S. Cl.
CPC ......... *G01N 21/658* (2013.01); *G01N 1/4077* (2013.01); *G01N 33/493* (2013.01);
(Continued)

(58) Field of Classification Search
USPC ........................................................ 436/64
See application file for complete search history.

(56) References Cited

U.S. PATENT DOCUMENTS

2016/0146737 A1    5/2016   Kim et al.

FOREIGN PATENT DOCUMENTS

| CN | 104614361 A | 5/2015 |
| KR | 10-2009-0001015 A | 1/2009 |

(Continued)

OTHER PUBLICATIONS

Markina, N.E. et al. Liquid-liquid extraction-assisted SERS-based determination of sulfamethoxazole in spiked human urine, Analytica Chimica Acta 1109 (2020) 61-68 (Year: 2020).*
(Continued)

*Primary Examiner* — Xiaoyun R Xu
(74) *Attorney, Agent, or Firm* — Harness, Dickey & Pierce, P.L.C.

(57) ABSTRACT

The present invention relates to a method for manufacturing a surface-enhanced Raman scattering substrate, a urine pretreatment method, and a method for providing information required for cancer diagnosis through urine metabolite analysis using same.

13 Claims, 63 Drawing Sheets

(51) Int. Cl.
*G01N 33/493* (2006.01)
*G01N 33/574* (2006.01)

(52) U.S. Cl.
CPC . *G01N 33/57434* (2013.01); *G01N 33/57438* (2013.01); *G01N 2001/4088* (2013.01)

(56) References Cited

FOREIGN PATENT DOCUMENTS

| KR | 10-1545989 B1 | 8/2015 |
|---|---|---|
| KR | 10-2017-0130195 A | 11/2017 |

OTHER PUBLICATIONS

Lin, J. et al. Rapid and label-free urine test based on surface-enhanced Raman spectroscopy for the non-invasive detection of colorectal cancer at different stages, Biomedical Optics Express vol. 11, No. 12, 7109-7119 (Year: 2020).*

International Search Report from corresponding PCT Application No. PCT/KR2021/002473, dated May 28, 2021.

Moisoiu, V., et al.; "Breast cancer diagnosis by surface-enhanced Raman scattering (SERS) of urine", Applied Sciences, 2019, vol. 9, Article No. 806, pp. 1-10.

Extended European Search Report from corresponding Europe Patent Application No. 21760238.2, issued on Dec. 29, 2022.

Phyo, J. B., et al.; "Label-Free SERS Analysis of Urine Using a 3D-Stacked AgNW-Glass Fiber Filter Sensor for the Diagnosis of Pancreatic Cancer and Prostate Cancer" Anal Chem, Mar. 2, 2021;93(8)3778-3785.

Stefancu, A., et al.; "SERS-based liquid biopsy of saliva and serum from Sjogren's sydrome", Anal Bioanal Chem, Sep. 2019;411(22)5877-5883.

* cited by examiner

|  | Normal | Pancreatic |
|---|---|---|
| Normal | 25 | 4 |
| Pancreatic | 0 | 33 |
| Sensitivity | Specificity | Accuracy |
| 89.2% | 100% | 93.5% |

|  | Normal | Prostate |
|---|---|---|
| Normal | 23 | 6 |
| Prostate | 2 | 34 |
| Sensitivity | Specificity | Accuracy |
| 85% | 92% | 87.7% |

| | Pancreatic | Prostate |
|---|---|---|
| Pancreatic | 29 | 4 |
| Prostate | 2 | 34 |
| Sensitivity | Specificity | Accuracy |
| 93.5% | 89.5% | 91.3% |

CANCER DIAGNOSIS USING RAMAN SIGNAL OF URINE

CROSS-REFERENCE TO RELATED APPLICATIONS

This application is a national phase application of PCT Application No. PCT/KR2021/002473, filed on Feb. 26, 2021, which claims the benefit and priority to Korean Patent Application Nos. 10-2020-0023553, filed on Feb. 26, 2020 and 10-2021-0025150, filed on Feb. 24, 2021. The entire disclosures of the applications identified in this paragraph are incorporated herein by references.

TECHNICAL FIELD

The present disclosure was made with the support of the Ministry of Health and Welfare of the Republic of Korea, under Project No. 2018R1C1B6007391, which was conducted as the research project named "Research and Development of 3D Nanostructure for Detection of Volatile Organic Compounds for Cancer Diagnosis" in the research program entitled "Science and Engineering Fundamental Research Project>Advanced Research Support Project", by Samsung Seoul Medical Center under the management of the National Research Foundation of Korea, 1 Mar., 2018 to 28 Feb., 2022.

The present disclosure relates to a method for fabrication of a surface-enhanced Raman scattering substrate, a method for pretreatment of urine, and a method for providing information necessary for cancer diagnosis through analysis of metabolites in urine using same.

BACKGROUND ART

Metabolomics is an important study to identify and quantify changes of metabolites in cells or tissues and to correlate groups of metabolites (metabolome) with various physiological and pathological conditions from the results to reveal metabolic mechanisms. According to the metabolomics, small-molecular metabolites derived from the human body have recently exhibited great potentials as biomarkers for early diagnosis and monitoring of cancer. However, an improved analysis method in complex biological products is required as an effective diagnostic tool for clinical application.

Pancreatic cancer is the only cancer in the past 20 years with almost the same 5-year survival rate, and more than 90% of patients with pancreatic cancer die within one year of diagnosis. Such pancreatic cancer metastasizes well to nearby lymph nodes or the liver, and the existence of many important blood vessels or structures in the vicinity allows for very few cases in which the cancer can be completely removed by surgery.

When the tumor size is diagnosed to be less than 1 cm in size and to confined to the pancreas without metastasis, it is reported to that a 5-year survival rate of 60% or more can be expected if surgery is performed. However, pancreatic cancer has no specific early symptoms, and is not easily detected in the early stages of cancer due to the anatomical characteristics of being surrounded by other organs deep in the abdomen and the relationship with surrounding organs. In addition, unlike other cancers, an early detection method for pancreatic cancer has not been established. Carbohydrate antigen (CA) 19-9 is the only pancreatic cancer biomarker approved by the U.S. Food and Drug Administration. However, the low positive prediction value renders CA 19-9 irrelevant in the mass screening of asymptomatic patients, allowing it to be used only as a marker for treatment response monitoring and recurrent disease.

Prostate cancer is a malignant tumor that occurs in the prostate gland in men and is known as a high-risk group of diseases because of its high incidence. Recently, a major risk factor for prostate cancer found in men in their 60s has also been increasing in people in their 50s, with the consequent increase of the incidence of prostate cancer in men in their 50s.

Conventional methods for diagnosing prostate cancer include imaging methods such as ultrasound imaging and biopsy, contrast enhanced ultrasound, sonoelastography, and magnetic resonance (MR). However, these methods are being used to increase the diagnostic rate after biopsy. Digital Rectal Examination (DRE) and Prostate Specific Antigen (PSA) tests are mainly used for prostate cancer screening. However, since the DRE and PSA tests have somewhat low predictive accuracy, a new test method that can increase the accuracy is required.

Just as the genes and proteins expressed differ from one type of cells to another type, the metabolites excreted are also different. It has been reported that cancer cells cause peroxidation of DNA, proteins, and lipids by excessive oxidative stress and reactive oxygen in the vicinity thereof, and form metabolites different from those of normal cells. Therefore, research on disease diagnosis using human metabolite analysis is continuously increasing. Therefore, research on disease diagnosis using human metabolite analysis is continuously increasing. In order to analyze various metabolites, mass spectrometry methods such as Gas Chromatography Mass Spectrometry (GC-MS) and liquid chromatography were mainly used.

It was reported that higher levels of specific metabolic byproducts were detected compared to controls as measured by mass spectrometry for tumor tissue metabolites in the early stages of pancreatic adenocarcinoma. The results of analysis of metabolites in plasma by mass spectrometry demonstrated the potential of metabolites as biomarkers for early diagnosis of pancreatic adenocarcinoma, and various preliminary studies are being conducted to diagnose pancreatic cancer at an early stage. Analysis for isolated cell lines of prostate cancer by mass spectrometry reported that prostate cancer cells excrete metabolites different from those of normal cells. Another report also described that a significant difference in nucleosides was found between urines from prostate cancer patients and healthy persons as measured by mass spectrometry.

However, the conventional mass spectrometry methods have the disadvantages of difficult analysis conditions, a long time required for pretreatment and separation, and low sensitivity. There is a need for a simple analysis method that enables short analysis time, high sensitivity, and multiple detection.

Raman spectroscopy is a useful method for inferring the structure of molecules by measuring the vibrational energy of specific functional groups present in a sample. However, However, the very weak spectral signal is a limitation in applying Raman spectroscopy to extremely low concentration substances.

Surface-enhanced Raman spectroscopy (hereinafter referred to as "SERS") is a surface-sensitive technique that enhances Raman signals by nanostructures such as plasmonic-metal nanotubes. The Raman scattering signals enhanced by SERS makes it possible to detect even extremely low levels of substances without labeling by signal analysis at specific wavelengths, thus allowing for multiple detection of biological samples. In addition, unlike mass spectrometry, Raman spectroscopy does not require separation of substances and thus can detect them quickly in a simple manner.

Since plasmon resonance characteristics according to the metal nanostructure are affected by various physicochemical factors including the dielectric constant, shape, and size of the material, the SERS signal increase efficiency may vary greatly depending on the target material. There are a method for pretreatment of urine and a method for fabrication of a surface-enhanced Raman substrate that can maximize the correlation of various metabolites associated with specific cancers (pancreatic cancer or prostate cancer) with metal nanostructure surfaces, and a method for discriminating cancer-specific signals in SERS spectra of urine, using same.

DISCLOSURE OF INVENTION

Technical Problem

The present inventors developed a reliable and fast urine analysis system on the basis of surface-enhanced Raman spectroscopy (SERS) by using silver nanowires (AgNW) deposited in a 3D structure on a glass fiber filter (GFF) and applied same to the diagnosis of pancreatic cancer and prostate cancer.

An aspect of the present disclosure is to provide a method for fabrication of a surface-enhanced Raman scattering substrate.

Another aspect of the present disclosure is to provide a method for diagnosis of cancer through analysis of metabolites in urine by surface-enhanced Raman spectroscopy.

A further aspect of the present disclosure is to provide a method for pretreatment of urine for analyzing metabolites in urine by surface-enhanced Raman spectroscopy.

Solution to Problem

The present disclosure is drawn to a method for fabrication of a surface-enhanced Raman spectroscopy (SERS) substrate, a method for pretreatment of urine, and a method for providing information necessary for cancer diagnosis through analysis of metabolites in urine using same.

Below, a detailed description will be given of the present description.

In the present disclosure, a 3D metal nanostructure capable of easily absorbing metabolites of urine thereto is developed and used to comparatively analyze surface-enhanced Raman scattering spectra of urines from patients with pancreatic cancer and/or prostate cancer and normal persons.

Metabolomics, which is a type of recently established omics, such as genomics, proteomics, etc., is the scientific study of chemical processes involving metabolites and has continually revealed the correlation of metabolites with diseases. Among others, increased reports on a difference in the metabolite excretion pattern of exhalation and urine between cancer patients and normal people give a prospect of early cancer diagnosis based on metabolites.

Metabolites are small molecules as intermediates or end products of metabolism and constitute metabolome that forms the metabolic network together with genome, transcriptome, and proteome. Since metabolites can reflect the biochemical phenotype well at the time of detection, the potential for early cancer diagnosis based on metabolites is rising.

Due to the existence of complex and diverse metabolites in biological samples, analytic studies on metabolites have relied mainly on mass spectrometry. However, such characteristics make it difficult to conduct clinical translational research and are not suitable for user interface.

In order to enable metabolite-based, early cancer diagnosis or monitoring, there is a need for a method that allows for short analysis time, high sensitivity, and multiplex detection and is convenient and simple for users. Accordingly, SERS, which is a technique capable of greatly enhancing Raman signals of molecules absorbed onto the surface of a substrate, is capable of fast, high-sensitivity, unlabeled multiplex detection and thus has attracted attention as a promising detection tool for metabolite analysis.

According to the SERS analysis method of urine reported previously, an attempt has been made to coat a metal nanostructure with a carbon substance such as 2D graphene in order to further enhance the adsorption of nucleoside metabolites such as purine and pyrimidine, or aromatic metabolites such as tyrosine onto the surface of the metal nanostructures. However, such 2D platforms are very low in surface area, thus having high difficulty in adsorbing a large amount of metabolites contained in urine thereto and in sufficiently conducting SERS detection.

In the present disclosure, a 3D metal nanostructure that can guarantee reproducibility of SERS signaling and allows metabolites in urine to be easily adsorbed to the surface thereof is developed. In this regard, a silver nanowire (AgNW)-deposited glass fiber filter (GFF) was prepared and then thermally treated to carbonized the polymeric material coat on the AgNW surface. The degree of carbonization can be adjusted with heating temperatures and times. An optimal degree of carbonization was established by comparing and analyzing absorption rates of metabolites in urine and SERS spectra among a group of pancreatic cancer patients, a group of prostate cancer patients, and a normal control.

In order to maximize SERS signals for cancer-associated metabolites in urine, a urine sample was centrifuged to remove large debris and subjected to pretreatments including extraction of metabolomes different in polarity therefrom with organic solvents such as chloroform, methanol, etc.

An optimal urine pretreatment method was established by evaluating SERS signals on the developed surface-carbonized AgNW-GFF substrate. Multivariate analysis of the SERS spectrum using principal component analysis (PCA) and orthogonal partial least squares discriminant analysis (OPLS-DA) made it possible to effectively distinguish among a group of pancreatic cancer patients, a group of prostate cancer patients, and a normal control group.

An aspect of the present disclosure is concerned with a method for fabrication of a surface-enhanced Raman scattering substrate, the method including:
  a filtration step of passing a silver nanowire solution through a glass fiber filter to prepare a substrate;
  a drying step of drying the substrate; and
  a carbonization step of thermally treating the substrate.

In the present disclosure, the filtration step may be carried out by vacuum filtration, but with no limitations thereto.

In the present disclosure, the silver nanowire solution may have a concentration of 0.5 wt %, but with no limitations thereto.

In the present disclosure, the silver nanowire solution may be stabilized with an organic substance, but with no limitations thereto.

In the present disclosure, the carbonization step may be carried out at 100 to 400° C., 100 to 350° C., 100 to 300° C., 100 to 250° C., 150 to 400° C., 150 to 350° C., 150 to 300° C., 150 to 250° C., 200 to 400° C., 200 to 350° C., 200 to 300° C., or 200 to 250° C., for example, at 250° C. The organic substance is carbonized in the carbonization step whereby an improvement can be brought about in the adsorption rate of volatile organic compounds and/or aromatic organic compounds.

In the present disclosure, the carbonization step may be carried out for 1 to 24 hours, 3 to 24 hours, 5 to 24 hours, 7 to 24 hours, 9 to 24 hours, 11 to 24 hours, 13 to 24 hours, 15 to 24 hours, 17 to 24 hours, 19 to 24 hours, 21 to 24 hours, or 23 to 24 hours, for example, for 24 hours. Through the carbonization step, the organic substance is carbonized whereby an improvement can be brought about in the adsorption rate of volatile organic compounds and/or aromatic organic compounds.

The substrate of the present disclosure has silver nanowires deposited at a high density thereon so that many intersection points among the silver nanowires and a large surface area are formed, thereby enabling great enhancement of SERS signals while the surface carbonized layer of the silver nanowires contributes to an improvement in adsorption of metabolites in urine.

Another aspect of the present disclosure relates to a urine pretreatment method for SERS-based analysis of metabolites in urine, the method including:
a sample preparation step of preparing a sample; and
a mixing step of mixing the sample with a cation or an organic solvent.

In the present disclosure, the sample preparation step may include a precipitate removal step of removing large particles interfering with surface-enhanced Raman scattering signals, but with no limitations thereto.

In the present disclosure, the precipitate removal step may be carried out by syringe filtration, membrane filtration, and/or centrifugation, for example, by centrifugation, but with no limitations thereto.

In the present disclosure, the filter used in the syringe filtration and/or membrane filtration may have a pore size of 0.05 μm to 0.45 μm, but with no limitations thereto.

In the present disclosure, the centrifugation may be carried out at 1,000 to 10,000 rpm, 1,000 to 9,000 rpm, 1,000 to 8,000 rpm, 1,000 to 7,000 rpm, 1,000 to 6,000 rpm, 1,000 to 5,000 rpm, 1,000 to 4,000 rpm, 1,000 to 3,000 rpm, or 1,000 to 2,000 rpm, for example, at 1,500 rpm, but with no limitations thereto.

In the present disclosure, the centrifugation may be carried out for 1 to 10 minutes, 1 to 8 minutes, 1 to 6 minutes, 2 to 10 minutes, 2 to 8 minutes, 2 to 6 minutes, 3 to 10 minutes, 3 to 8 minutes, 3 to 6 minutes, 4 to 10 minutes, 4 to 8 minutes, 4 to 6 minutes, for example, 5 minutes, but with no limitations thereto.

In the present disclosure, the sample may be a supernatant after centrifugation, but with no limitations thereto.

In the present disclosure, the sample may be at least one selected from the group consisting of a tissue extract, a cell lysate, whole blood, plasma, serum, and urine, for example, urine, but with no limitations thereto.

In the present disclosure, the cation in the mixing step is used to increase an absorption rate of metabolites to the silver nanowires and may be derived by treatment of the sample with at least one selected from the group consisting of $MgCl_2$, $MgCl_2$, $CaCl_2$, and $Ca(NO_3)_2$, for example, with $Ca(NO_3)_2$, but with no limitations thereto.

In the present disclosure, the cation is used at a final concentration of 0.01 mM to 1 mM, 0.02 mM to 1 mM, 0.04 mM to 1 mM, 0.06 mM to 1 mM, 0.08 mM to 1 mM, 0.1 mM to 1 mM, 0.01 mM to 0.5 mM, 0.02 mM to 0.5 mM, 0.04 mM to 0.5 mM, 0.06 mM to 0.5 mM, 0.08 mM to 0.5 mM, 0.1 mM to 0.5 mM, 0.01 mM to 0.3 mM, 0.02 mM to 0.3 mM, 0.04 mM to 0.3 mM, 0.06 mM to 0.3 mM, 0.08 mM to 0.3 mM, or 0.1 mM to 0.3 mM, for example, at a final concentration of 0.1 nM in the sample, but with no limitations thereto.

In the present disclosure, the organic solvent may be at least one selected from the group consisting of methanol, chloroform, and DMSO, for example, methanol, but with no limitations thereto.

In the present disclosure, the organic solvent may be added to the sample and then separated.

A further aspect of the present disclosure relates to a method for providing information necessary for cancer diagnosis through surface-enhanced Raman spectrometry-based analysis of metabolites in urine, the method including:
a specimen pretreatment step of pretreating a specimen;
a sample preparation step of loading the specimen on to the surface-enhanced Raman scattering substrate and drying same;
a light application step of applying a laser beam to the surface-enhanced Raman scattering substrate;
a measurement step of measuring surface-enhanced Raman scattering (SERS) signals; and
an analysis step of comparing and analyzing patterns of the measured SERS signals.

In the present disclosure, the specimen pretreatment step is as described for the urine pretreatment step above, and the description thereof is thus omitted.

In the present disclosure, the specimen is used in an amount of 5 to 100 μL, 5 to 80 μL, 5 to 60 μL, 5 to 40 μL, 5 to 20 μL, or 5 to 15 μL, for example, 10 μL, but with no limitations thereto.

In the present disclosure, the laser beam may have a wavelength of 650 nm, but with no limitations thereto.

In the present disclosure, the measurement step may be adapted for measuring SERS signals in a band of 502 to 1998 cm-1.

In the present disclosure, the analysis step may include a normalizations step of normalizing a sum of SERS spectrum signals in a band of 502 to 1998 cm-1 to 1.

In the present disclosure, the analysis step may be conducted in a non-autonomous learning manner or in an autonomous learning manner.

In the present disclosure, the autonomous learning manner may be adapted for discrimination with a test set formed by orthogonal partial least squares discriminant analysis (OPLS-DA), but with no limitations thereto.

In the present disclosure, the analysis step may include a discrimination step of determining the state as a cancer when the SERS signal is 0.0006 or less when normalized at 527.4cm-1; 0.0005 or less when normalized at 699 cm-1; 0.0004 or less when normalized at 888.2 cm-1; 0.0045 or less when normalized at 1000.4 cm-1; 0.00025 or less when normalized at 1151 cm-1; 0 or more when normalized at 1298.1 cm-1; or 0.0006 or more when normalized at 1683.5 cm-1.

In the present disclosure, the cancer may be at least one selected from the group consisting of lung cancer, bronchial cancer, colorectal cancer, breast cancer, stomach cancer, ovarian cancer, bladder cancer, brain cancer, thyroid cancer, esophageal cancer, uterine cancer, liver cancer, gallbladder cancer, pancreatic cancer, and prostate cancer, for example, pancreatic cancer or prostate cancer, but with no limitations thereto.

Advantageous Effects of Invention

The present disclosure is drawn to a method for fabrication of a surface-enhanced Raman scattering substrate, a urine pretreatment method, and a method for providing information necessary for cancer diagnosis through analysis of metabolites in urine, using the fabrication method and the urine pretreatment method, whereby pancreatic cancer and prostate cancer can be early diagnosed in a non-invasive inspection manner and an extremely high level of sensitivity and multivariate analysis can be achieved.

BEST MODE FOR CARRYING OUT THE INVENTION

Figure 1A:
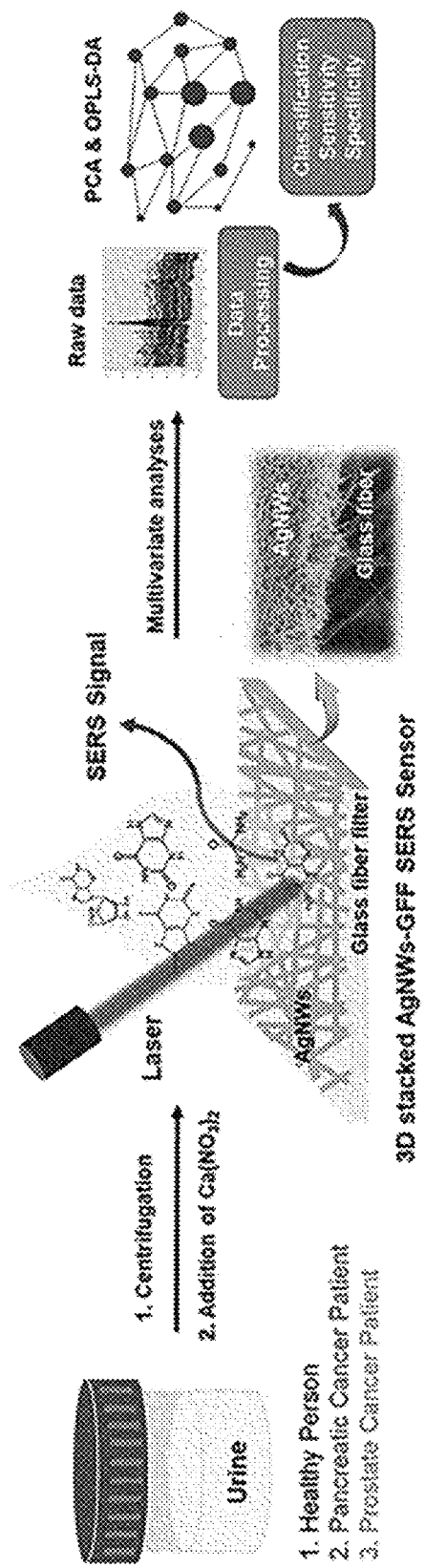
FIG. 1a is a scheme of a method for providing information necessary for cancer diagnosis through surface-enhanced Raman spectrometry-based analysis of metabolites in urine according to an embodiment of the present disclosure.

The present disclosure relates to a method for fabrication of a surface-enhanced Raman scattering substrate, a urine pretreatment method, and a method for providing information necessary for cancer diagnosis through analysis of metabolites in urine, using the fabrication method and the urine pretreatment method.

BEST MODE FOR CARRYING OUT THE INVENTION

A better understanding of the present disclosure may be obtained through the following Examples, which are set forth to illustrate, but are not to be construed to limit the present disclosure.

EXAMPLE 1

Urine Pretreatment

For use in experiments, human urine specimens were collected at the Samsung Medical Center, Seoul, Korea with the approval of the Institutional Review Board (IRB) of Samsung Medical Center and the consent of the subjects to participate in the study. Sterilely packaged 120-mL specimen cups (400102, SPL Life Sciences) were used in collecting the specimens. For a normal control group, specimens were collected from people with no cancer-specific findings in the tumor level and imaging tests as measured by diagnostic tests at the Department of Diagnosis Laboratory Medicine of the Samsung Medical Center (SMC). Urine specimens of cancer patients were collected before surgery from patients who were hospitalized and finally diagnosed with the target carcinoma as a result of biopsy. In addition, in order to maintain the freshness of the urine specimens, dry ice was added to the ice box during transportation of collected specimens.

The collection of urine specimens was excluded only in the following cases. First, the urine of the subjects after meals was excluded because nutrients may affect the measurement results. Second, subjects who had previously suffered other cancer-related diseases were excluded by checking the medical records. Finally, subjects who were undergoing other chemotherapy or in the course of treatment that could affect the experiment were excluded. Urine was collected from the selected subjects during fasting before surgery.

In addition, the collected urine specimens were aliquoted into 15-mL centrifuge tubes (15 mL PP centrifuge tubes 430791, CORNING) and stored at −80° C. in a deep freezer so as to readily utilize the specimens in experiments and to prevent metabolites from vaporizing and denaturing.

1-1. Calcium Pretreatment

Before surface-enhanced Raman spectroscopy (SERS), the urine specimens during storage in a deep freezer were liquefied at room temperature (24° C.) for 2 hours. The urine to be used in experiments was loaded into 1.5-mL sterilized microtubes. Precipitates in urine were removed because they might be a barrier to SERS measurement. To this end, the collected urine specimens were centrifuged at 1,500 rpm for 5 minutes in a centrifuge (Daihan Scientific Co. Ltd., Korea) and the supernatants thus formed were isolated.

The urine specimens were added with calcium (calcium nitrate: $Ca(NO_3)_2$, Sigma Aldrich, USA) in order to accelerate the adsorption of metabolites to silver nanowires on the surface-enhanced Raman scattering. Ten μL of 1 mM calcium was added to 90 μL of a urine specimen to form a final concentration of 0.1 mM.

1-2. Methanol Pretreatment

Before surface-enhanced Raman spectroscopy, the urine specimen stored in a deep freezer was thawed at room temperature (24° C.) for 2 hours. Metabolites in urine included substances with high polarity, relatively low polarity, and no polarity. Non-polar substances were separated and extracted. In order to increase the dissolution and dispersibility of less-polar substances, the urine specimen was centrifuged at 2,000 rpm for 5 minutes in a centrifuge (Daihan Scientific Co. Ltd., Korea), and the supernatant was isolated.

Figure 1B:
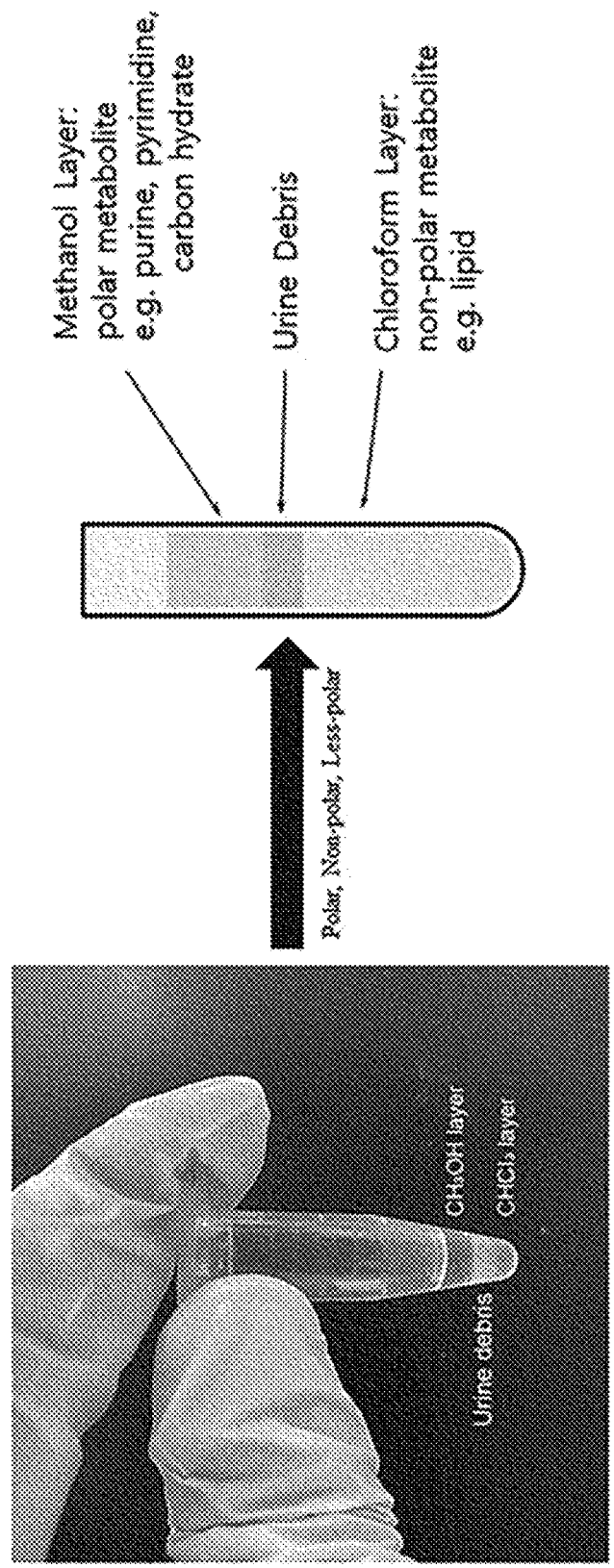
FIG. 1b is a view showing a procedure of pretreating a urine specimen with methanol according to an embodiment of the present disclosure.

Then, the urine supernatant, chloroform (Sigma-Aldrich 132950, St. Louis, USA, CHCl3), and methanol (Avantor J. T. Baker 9093-03, Pa, USA, CH3OH) were each mixed in an amount of 50 μL at a ratio of 1:1:1. The mixture was vortexed for 30 minutes to form two separate layers including a chloroform layer and a methanol-urine layer. The chloroform layer contained non-polar metabolites such as lipids, etc. while polar metabolites such as purines, pyrimidines, etc. were found in the methanol layer. It was reported that this organic solvent system was extensively used in metabolomics because it is of good suitability for analysis instruments and metal nanostructures after metabolite extraction. In the subsequent experiments, 10 μL of the methanol-urine layer containing polar metabolites was used (FIG. 1b).

EXAMPLE 2

Fabrication of Surface-Enhanced Raman Scattering Substrate

Figure 2A:
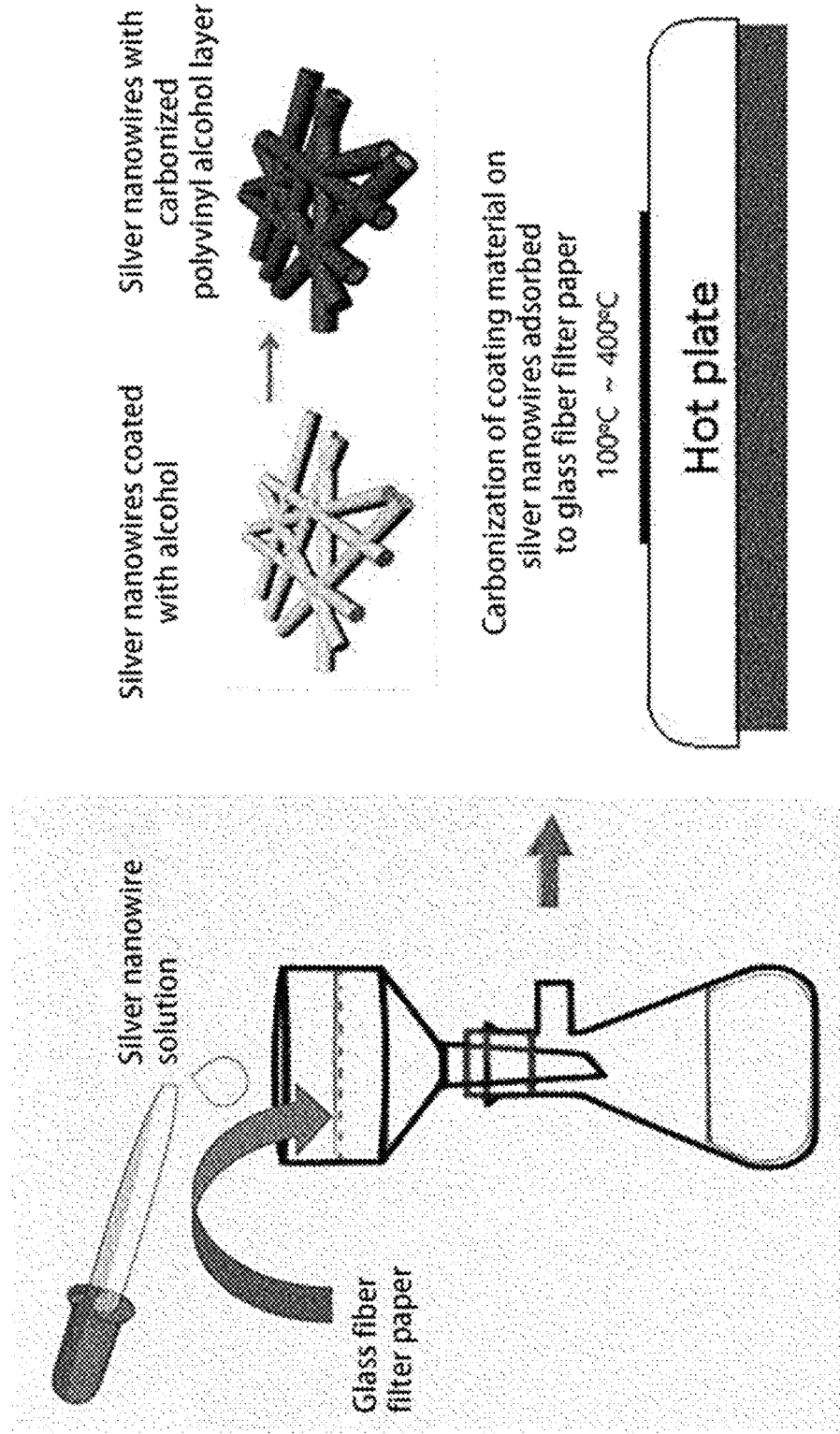
FIG. 2a is a scheme of a method for fabrication of a surface-enhanced Raman scattering substrate according to an embodiment of the present disclosure.

As illustrated in FIG. 2a, a 3D metal nanostructure substrate was prepared by applying 0.5 wt % silver nanowires (AgNWs, Advanced Nano-Surface Department, Korea) to glass fiber filter paper with a diameter of 47 mm (GE healthcare life science Whatman, UK) in a vacuum environment.

Figure 2B:
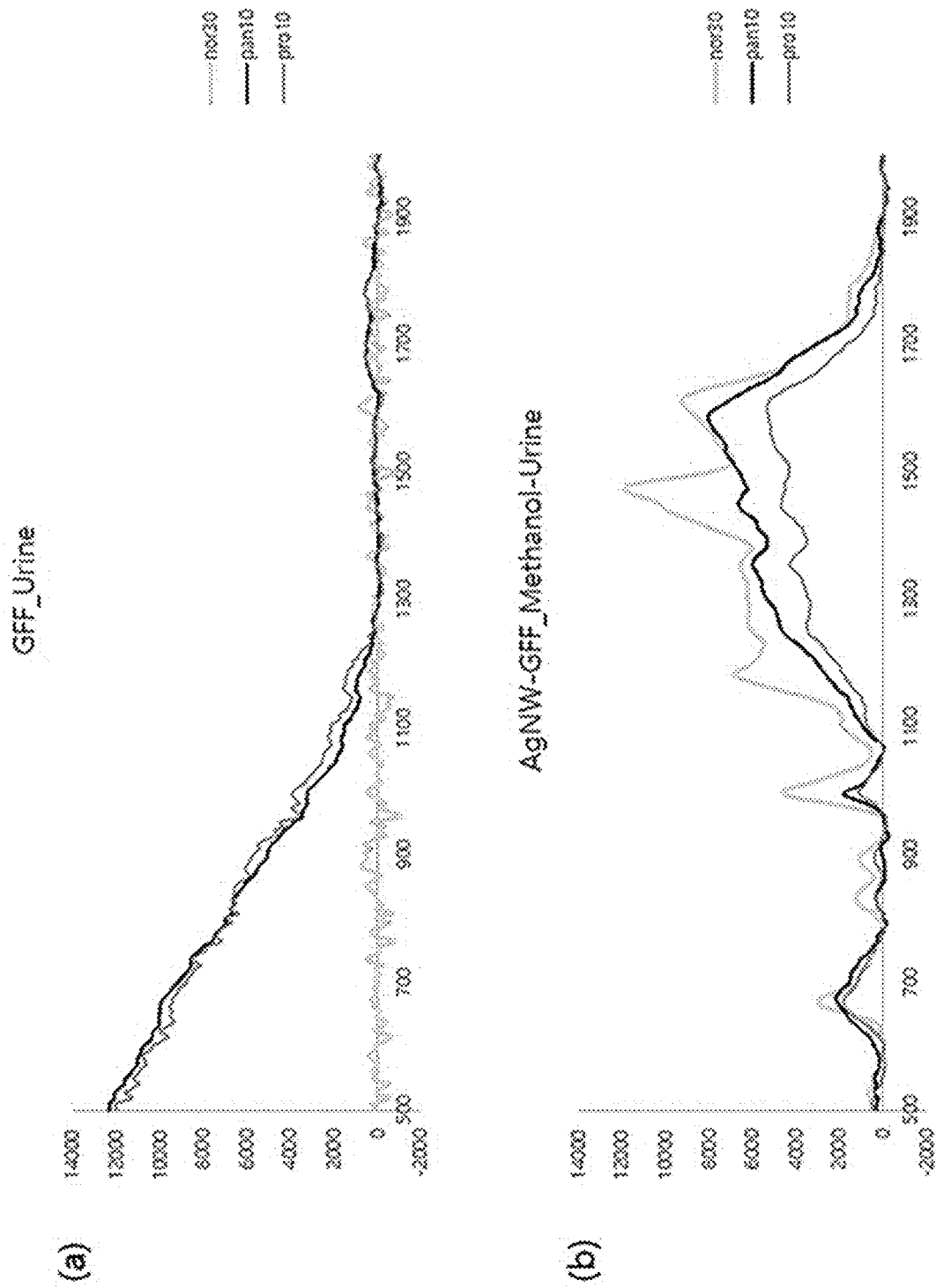
FIG. 2b shows graphs in which comparison is made between GFF and AgNW-GFF substrates according to an embodiment of the present disclosure.

After vacuum filtration, the silver nanowires (average diameter of ca. 40 nm, average length of ca. 8 μm) were densely deposited on the GFF (average pore size of ca. 700 nm) to form a network and nanopores among the silver nanowires. Compared to 2D platforms, the 3D organization could provide a porous structure and a large surface area on the AgNW-GFF substrate, contributing to high adsorption of water and analytes from urine. The structure of the crossing silver nanowires could serve as a hot spot through the nanogaps and nanoconjunctions thereof. An additional carbonization process for the silver nanowires could effectively catch the hot spot and analytes, thereby greatly improving the SERS effect. As can be seen in FIG. 2b, a great difference in the result when the signals were measured on the simple GFF substrate (a) and the AgNW-GFF substrate fabricated above (b).

The substrate thus obtained was dried and then uniformly cut into a size of 5 mm length×5 mm width. Next, the organic substance polyvinylpyrrolidone (PVP, (C6H9NO)n) coated on the surface of the silver nanowires was carbonized by thermal treatment at high temperature on a hot plate (Thermo Fisher Scientific, MA, USA). The carbonization formed a carbon layer on the surface of the silver nanowire, leading to an increase in the adsorption rate of urine metabolites to the substrate.

Figure 2C:
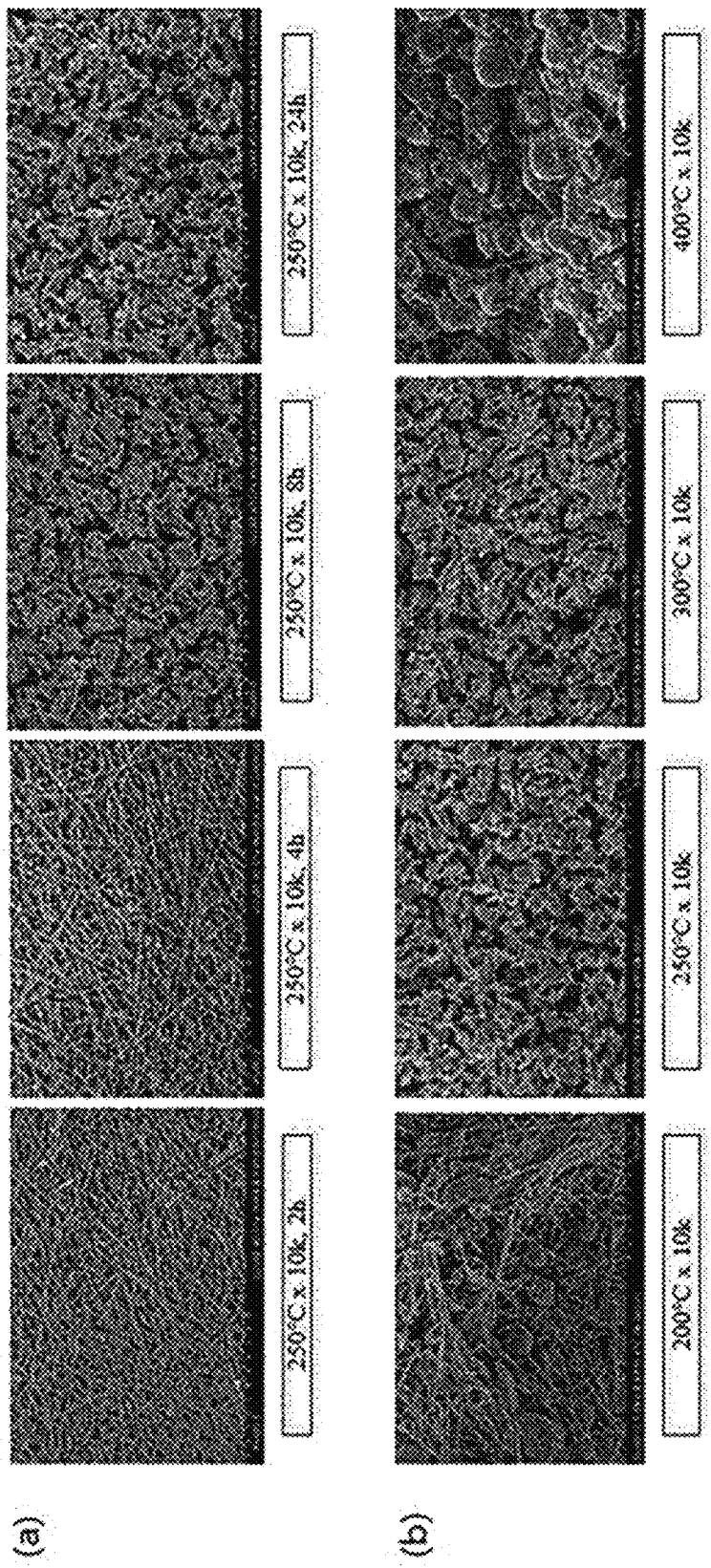
FIG. 2c shows scanning electron microscope images of surface-enhanced Raman scattering substrates by temperature of thermal treatment and degree of carbonization according to an embodiment of the present disclosure.

As can be seen in the scanning electron microscope (SEM) images of FIG. 2c, the silver nanowires were deposited at high densities on GFF and the substrate states and the SERS measurements varied depending on the temperature and duration of carbonization. FIG. 2c shows SEM images of substrates carbonized at the same temperature (250° C.) for various periods of carbonization (a) and at various temperatures for the same period of carbonization time (24 hours) (b). As the duration of thermal treatment was lengthened, the PVP layer around the silver nanowires became further carbonized. Silver melts at 961.8° C. far higher than that of the organic substance. However, the melting point is lowered for silver nanoparticles. Thus, an increased period of carbonization time was observed to bring about a morphological change in the silver nanowires.

Figure 2D:
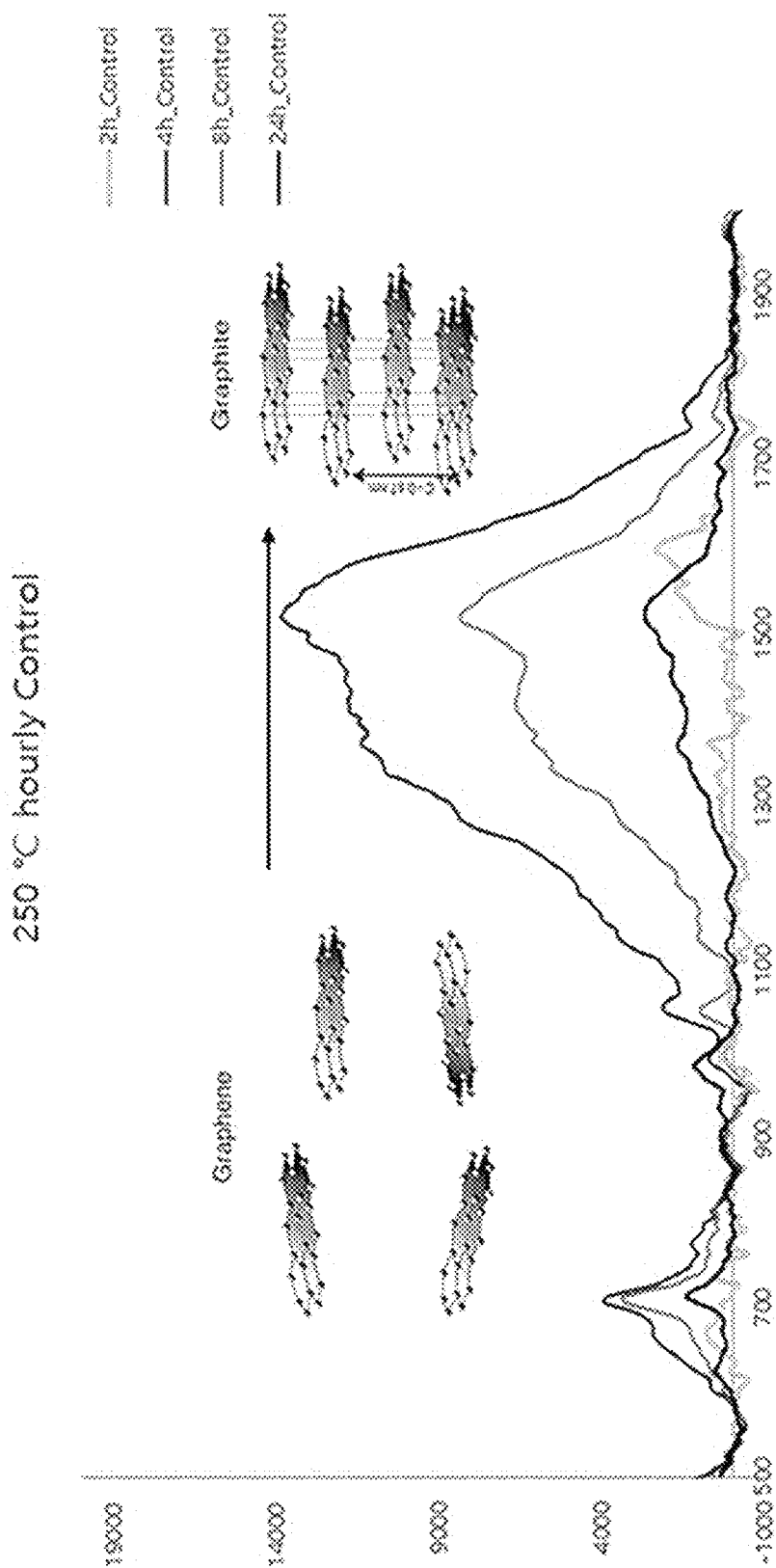
FIG. 2d is a graph of degrees of carbonization in surface-enhanced Raman scattering substrates thermally treated at the same temperature over time according to an embodiment of the present disclosure.
Figure 3A:
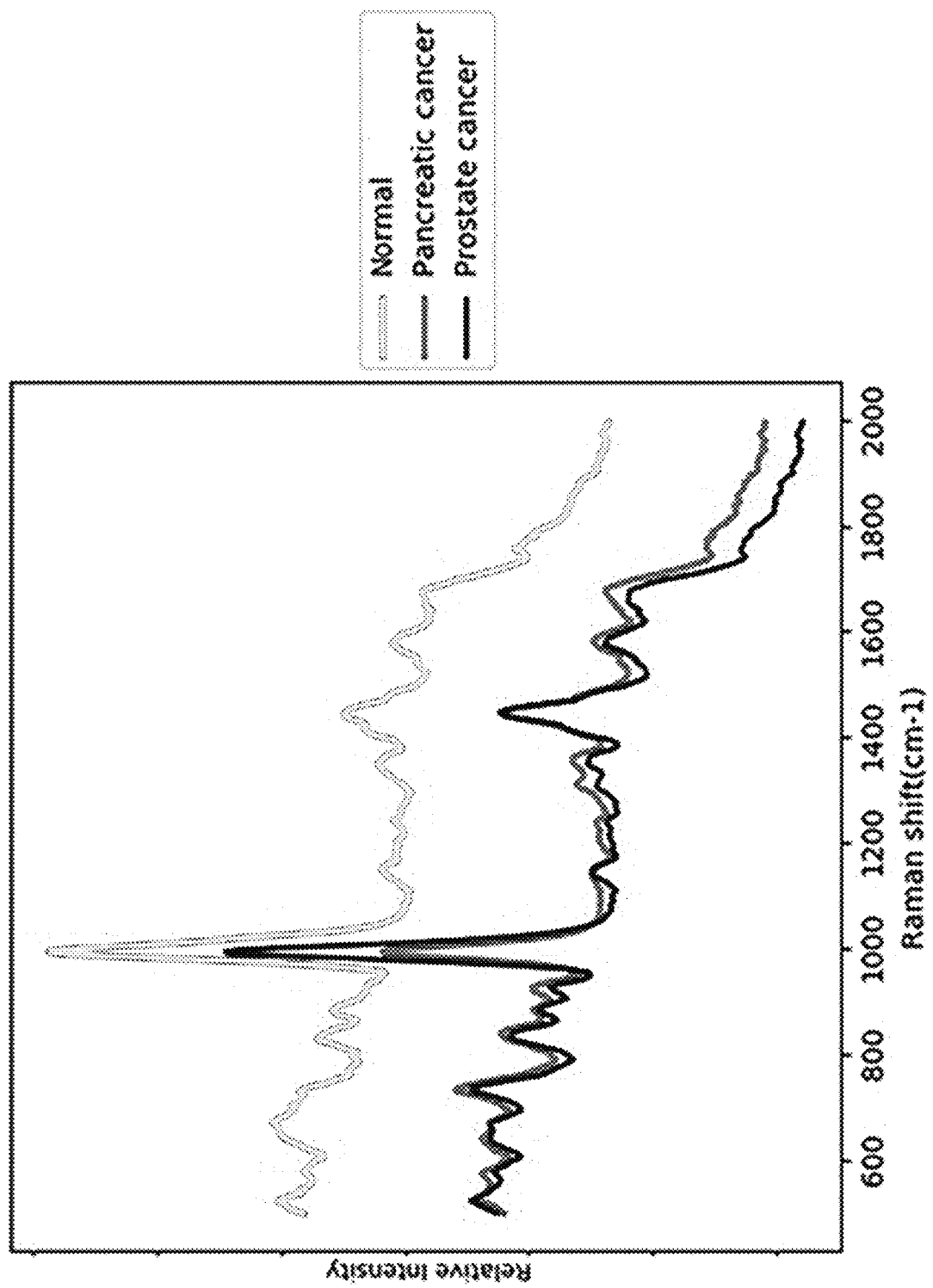
FIG. 3a shows spectra of averaged surface-enhanced Raman scattering signals of urine specimens in individual groups before removal of the baseline according to an embodiment of the present disclosure.
Figure 3B:
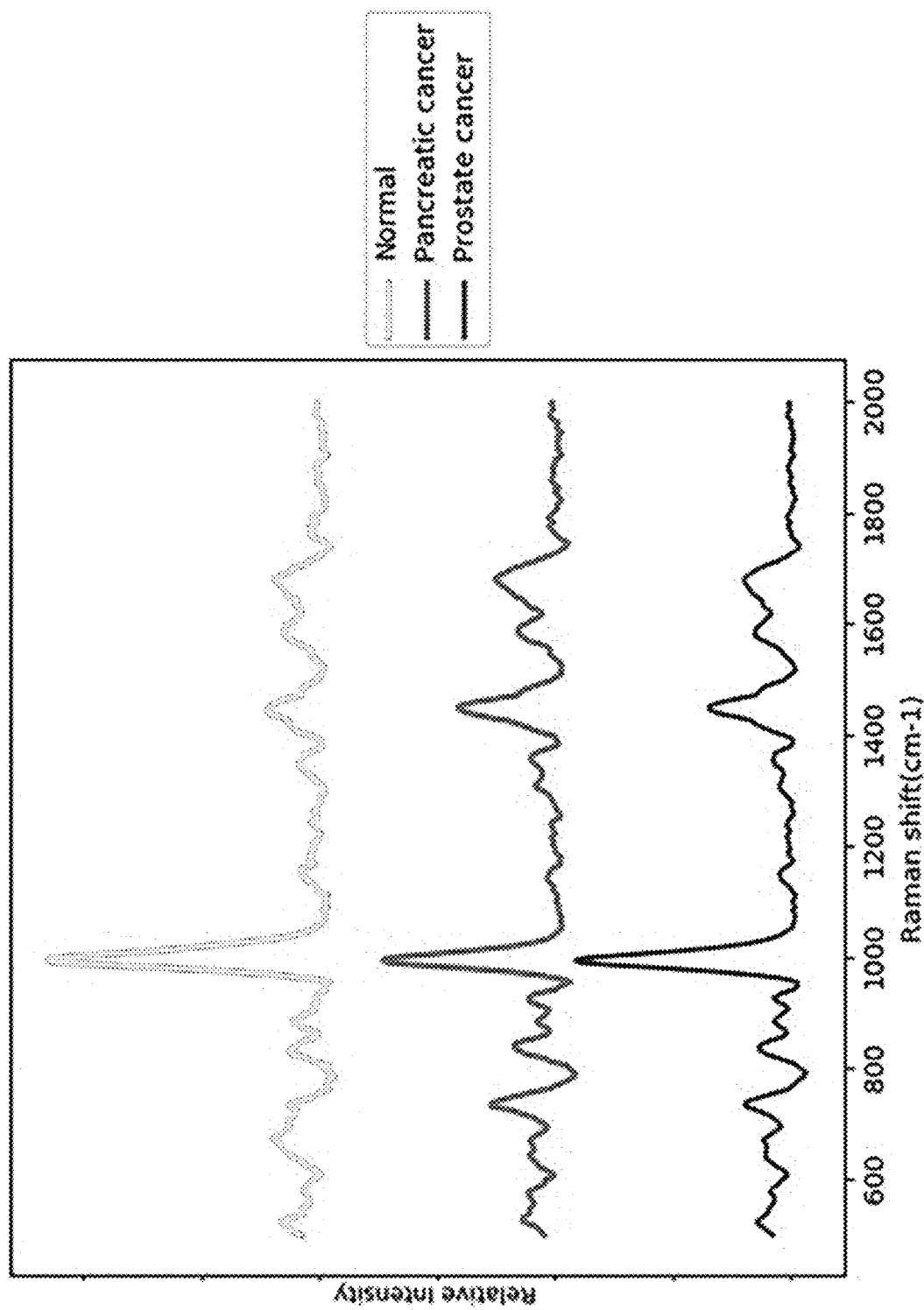
FIG. 3b shows spectra of averaged surface-enhanced Raman scattering signals of urine specimens in individual groups after removal of the baseline and adjustment of a sum of signals in the band of 502 to 1998 cm-1 into 1 according to an embodiment of the present disclosure.
Figure 4A:
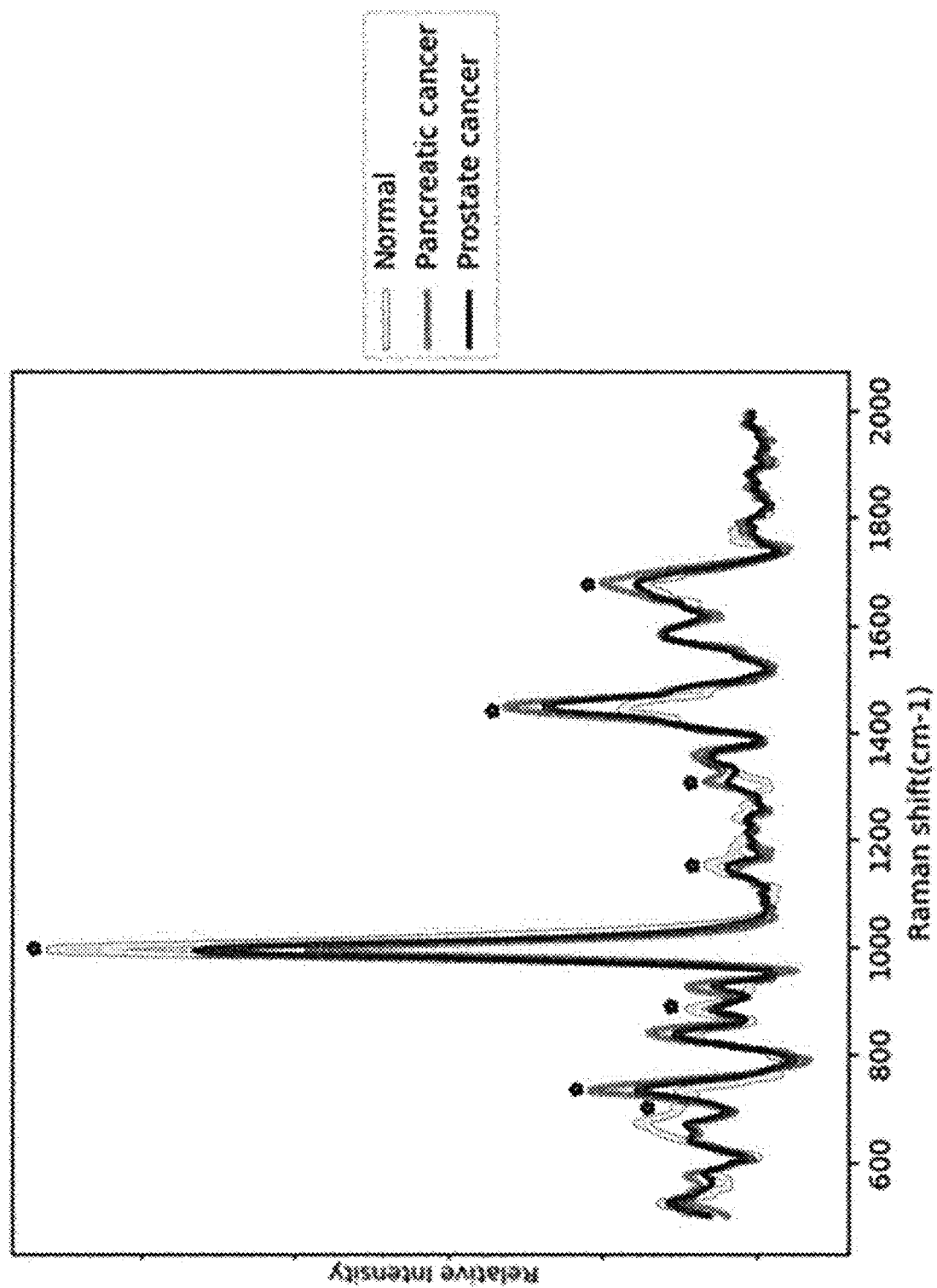
FIG. 4a is a graph showing differential peaks (*) of average surface-enhanced Raman spectra between individual groups according to an embodiment of the present disclosure.
Figure 4B:
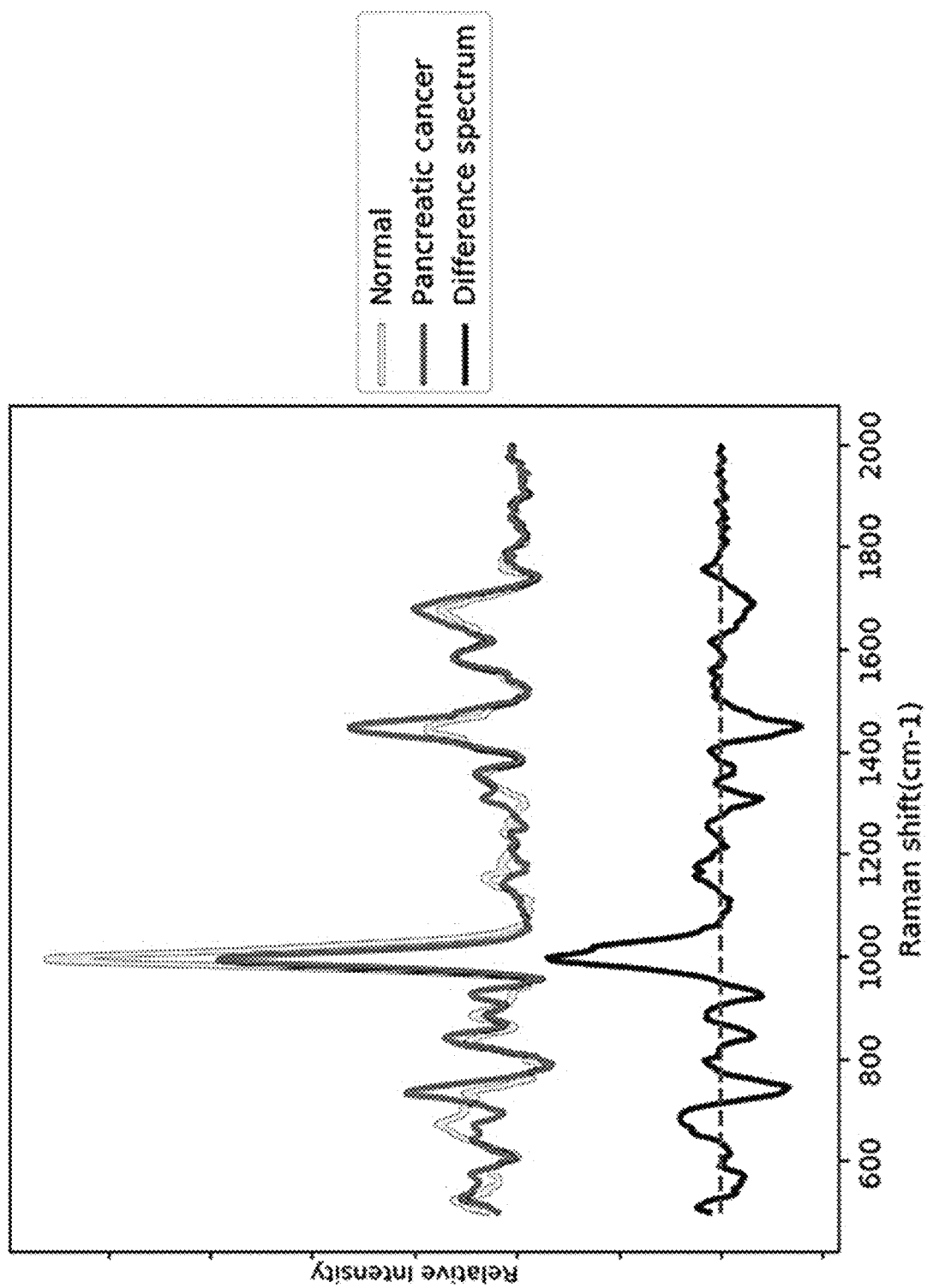
FIG. 4b is a graph showing a difference in average spectrum of surface-enhanced Raman scattering signals between a normal group and a pancreatic cancer patient group according to an embodiment of the present disclosure.
Figure 4C:
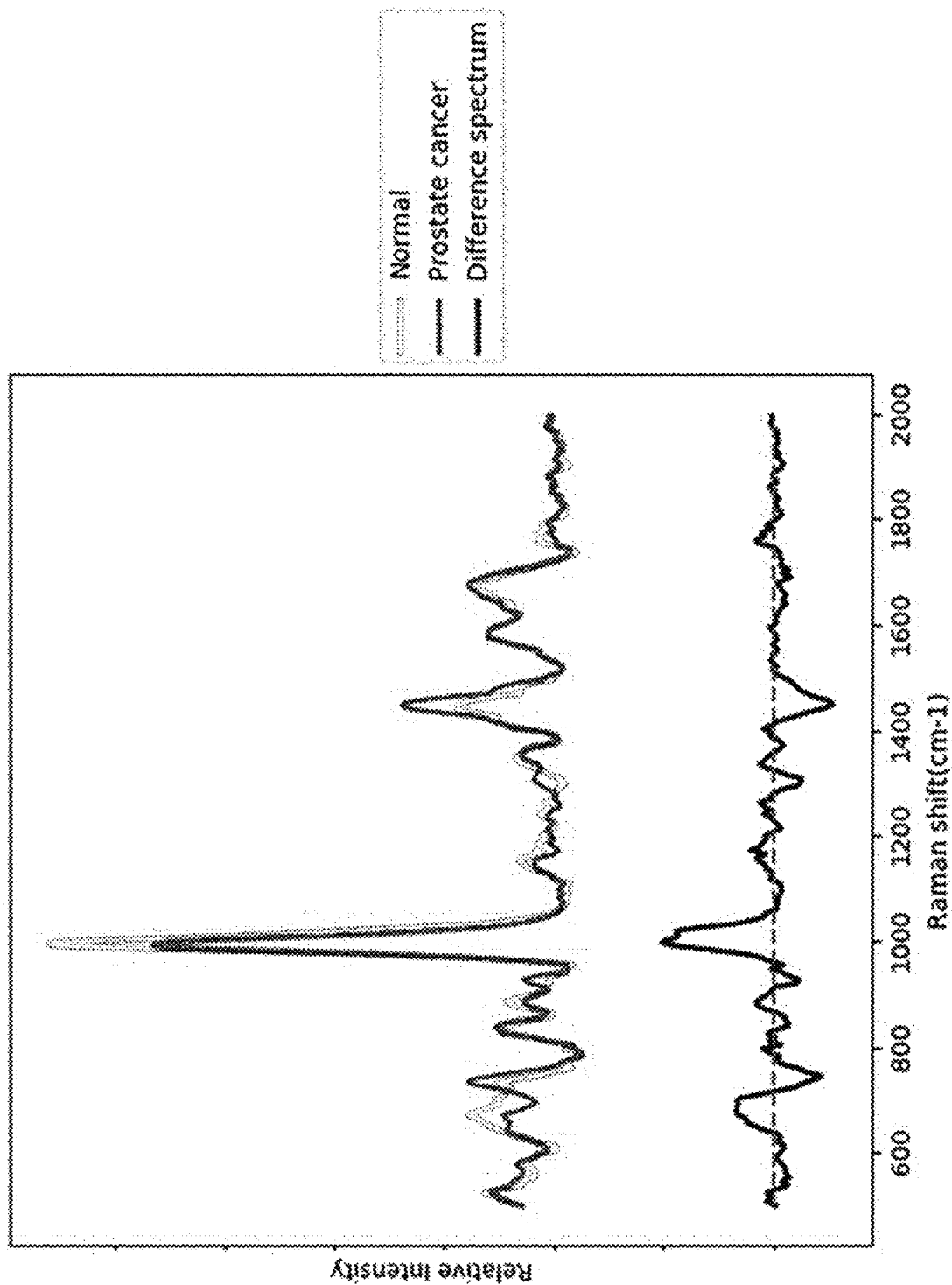
FIG. 4c is a graph showing a difference in average spectrum of surface-enhanced Raman scattering signals between a normal group and a prostate cancer patient group according to an embodiment of the present disclosure.

In addition, as shown in FIG. 2d, Raman signals on the carbonized substrates were also measured to increase and then decrease in carbon band signal as the thermal treatment progressed. This is considered to be attributed to the fact a graphene layer was formed in an early stage of thermal treatment and then gradually converted into a graphite layer. As a result of many trials in various experimental conditions, an optimal condition was set to be 250° C. for carbonization temperature, which is in the vicinity of 217° C., the boiling point of PVP, and 24 hours for carbonization time. The carbonized substrate was optimized according to the SERS measurements accounting for an increase in the adsorption rate of volatile organic compounds and aromatic organic compounds when organic substances were carbonized.

EXAMPLE 3

SERS-Based Analysis of Metabolites in Urine—Calcium Pretreatment

Surface-enhanced Raman scattering spectra were measured using NS220-Raman (Nanoscope systems, Daejeon, Korea). The laser used had a wavelength band of 633 nm±1 nm. The automatic function of motorized motion of CCD-Spectrometer switching was installed in the spectrometer which had a maximum laser output power of 40 mW when used to measure specimens. The laser is focused by the autofocus function. The exposure time can be set to range from 5 msec to up to 65 sec. In this experiment, the condition was set to be two for the average number and 3000 msec for the integration time. A total of three measurements was made at different positions in the substrate and averaged.

From the measured SERS spectra, intrinsic fluorescent signals were removed. In order to preserve SERS peak signals, baseline correction was made through the NS Raman ID software based on the asymmetric least square method. A band of 502 to 1998 cm-1 was utilized so as not to include signals unnecessary for analyzing the spectrum measurements. A total of individual signals in the band of 502 to 1998 cm-1 was set to be 1 to compare patterns of overall spectra.

As can be seen in FIG. 3b and FIGS. 4a to 4c, there are differences among the spectra of a normal group (Normal), a group of pancreatic cancer patients (Pancreatic cancer), and a group of prostate cancer patients (Prostate cancer).

EXAMPLE 4

Boxplot—Calcium Pretreatment

In order to intuitively compare differential spectra at a specific peak obtained from the Raman spectra, the results according to the center of distribution and the degree of scattering are presented as boxplots as shown in FIGS. 5 and 6.

In each boxplot, the lower portion accounts for the first quartile meaning that 25% of the data is below this value while the upper portion corresponds to the third quartile meaning that 75% of the data lies below this value. In the box, the orange color line means the median of a data set. The vertical line means a maximum value of the data at the highest point and a minimum value of the data at the lowest point. The green diamond patterns represent outliers, meaning values beyond a valuable range.

Figure 5A:
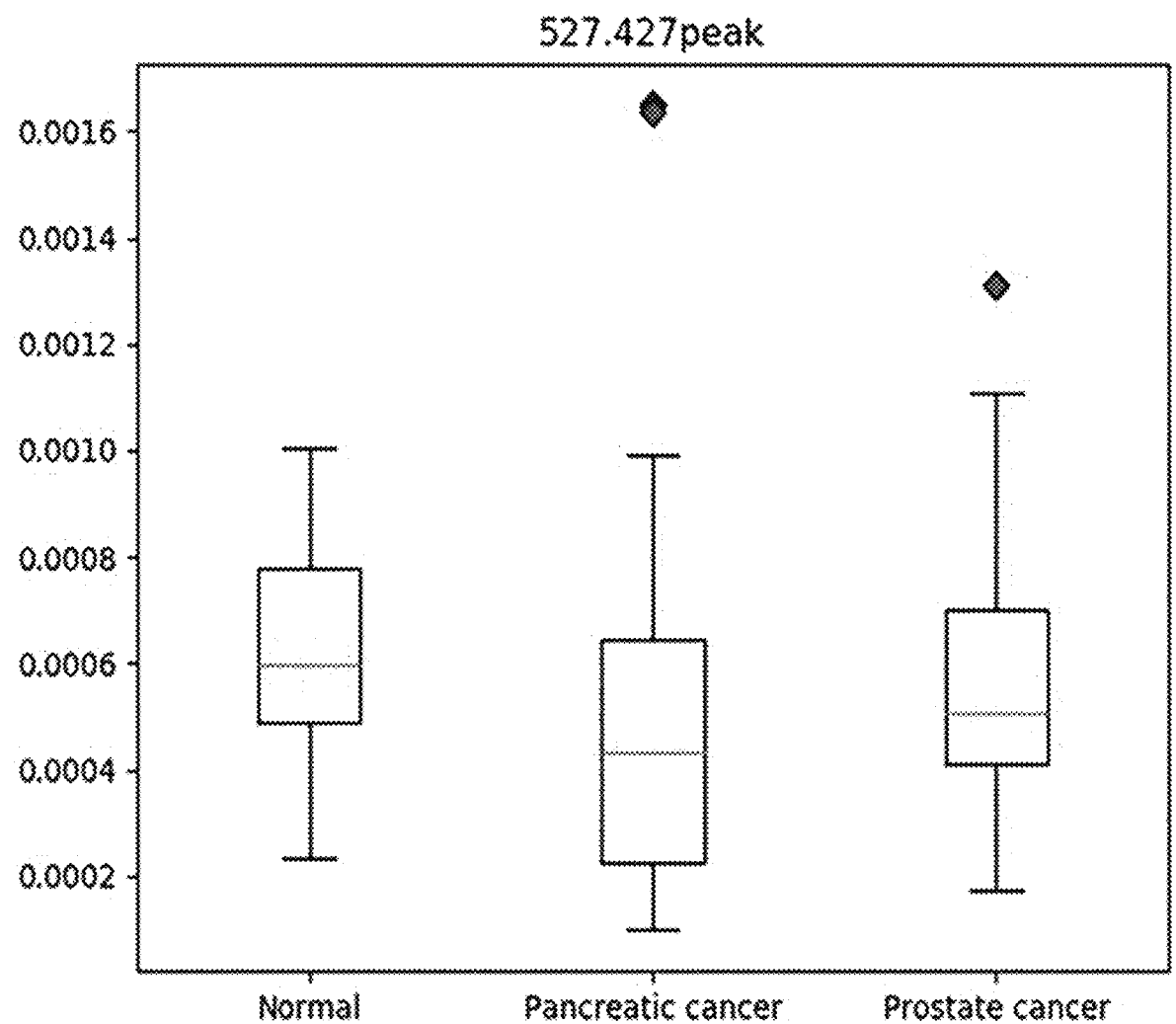
FIG. 5a is a box plot for sample distributions in each group at the 527.427 cm-1 peak according to an embodiment of the present disclosure.

FIG. 5a shows SERS signal distributions for a normal group, a group of pancreatic cancer patients, and a group of prostate cancer patients at the 527.4 cm-1 peak which seems to be attributed to five-membered ring deformation. The peak tended to be higher for the normal group than the cancer patient groups, with a higher pattern found in the prostate cancer group than the pancreatic cancer group.

Figure 5B:
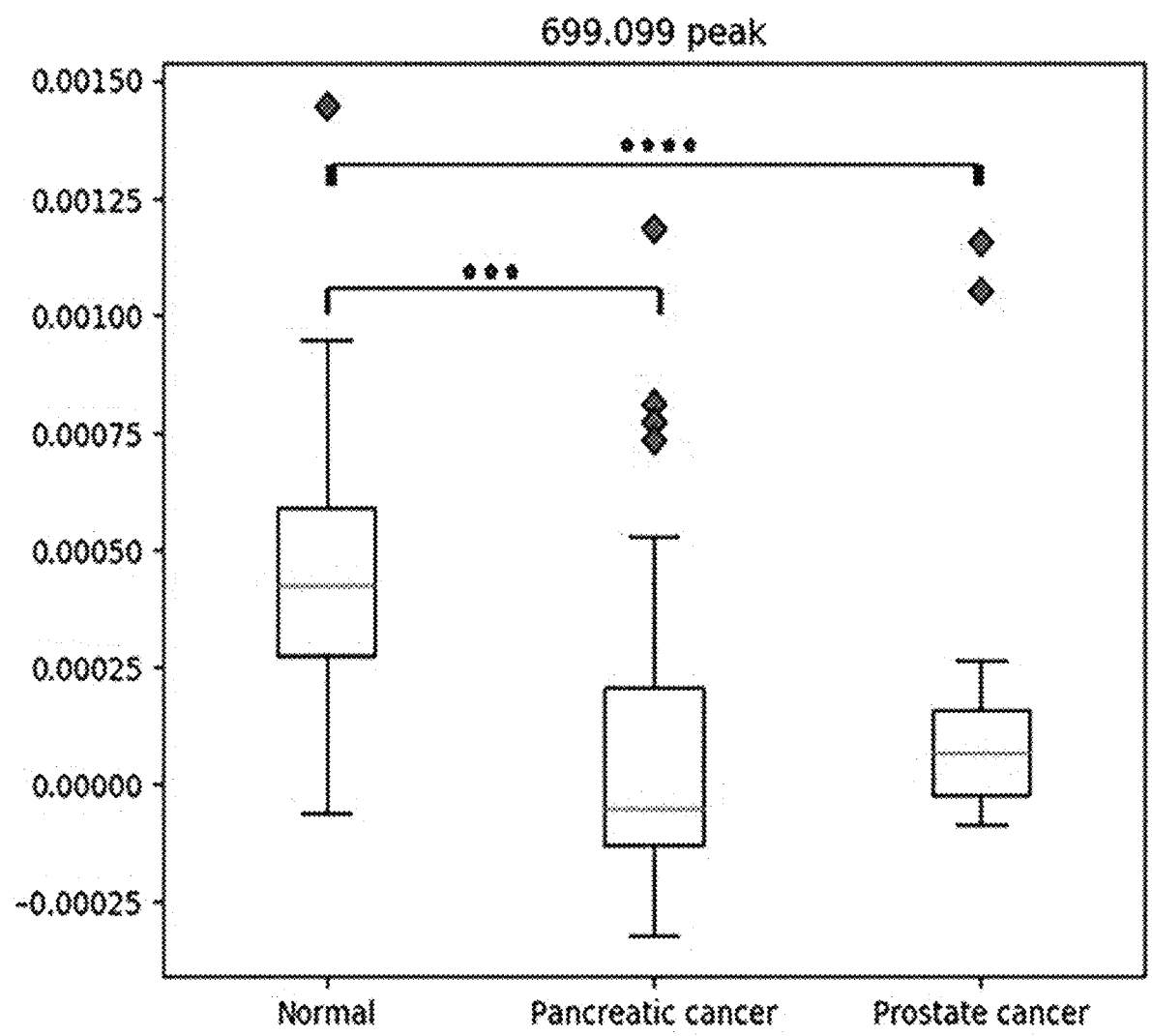
FIG. 5b is a box plot for sample distributions in each group at the 699.099 cm-1 peak according to an embodiment of the present disclosure.

FIG. 5b shows SERS signal distributions for a normal group, a group of pancreatic cancer patients, and a group of prostate cancer patients at the 699 cm-1 peak which seems to be attributed to five-membered ring deformation. The peak tended to be higher for the normal group than the cancer patient groups, with a higher pattern found in the prostate cancer group than the pancreatic cancer group.

Figure 5C:
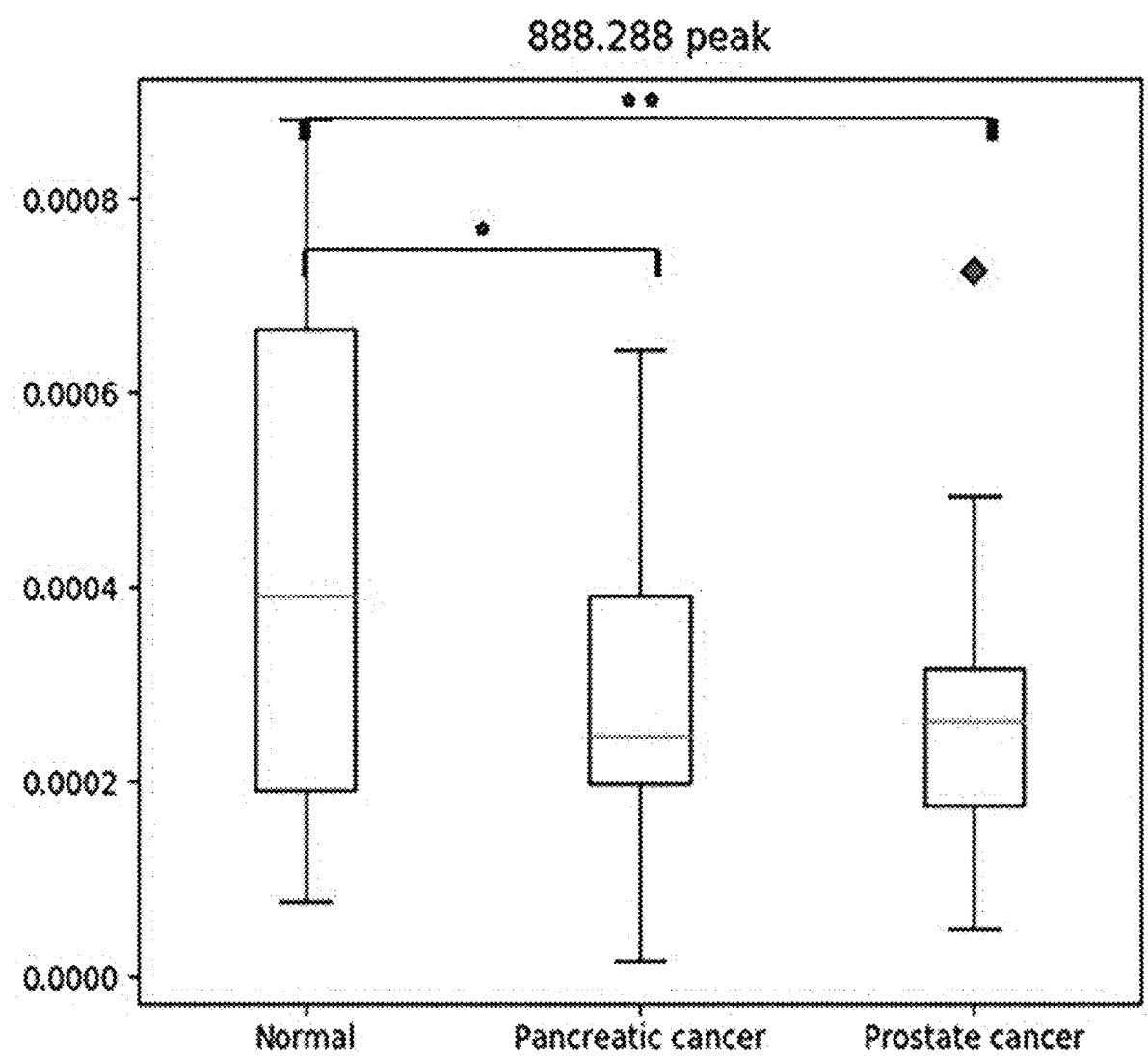
FIG. 5c is a box plot for sample distributions in each group at the 888.288 cm-1 peak according to an embodiment of the present disclosure.

FIG. 5c shows SERS signal distributions for a normal group, a group of pancreatic cancer patients, and a group of prostate cancer patients at the 888.2 cm-1 peak which seems to be attributed to the bending between nitrogen and carbon (N=H bending). The peak tended to be higher for the normal group than the cancer patient groups, with a higher pattern found in the prostate cancer group than the pancreatic cancer group.

Figure 5D:
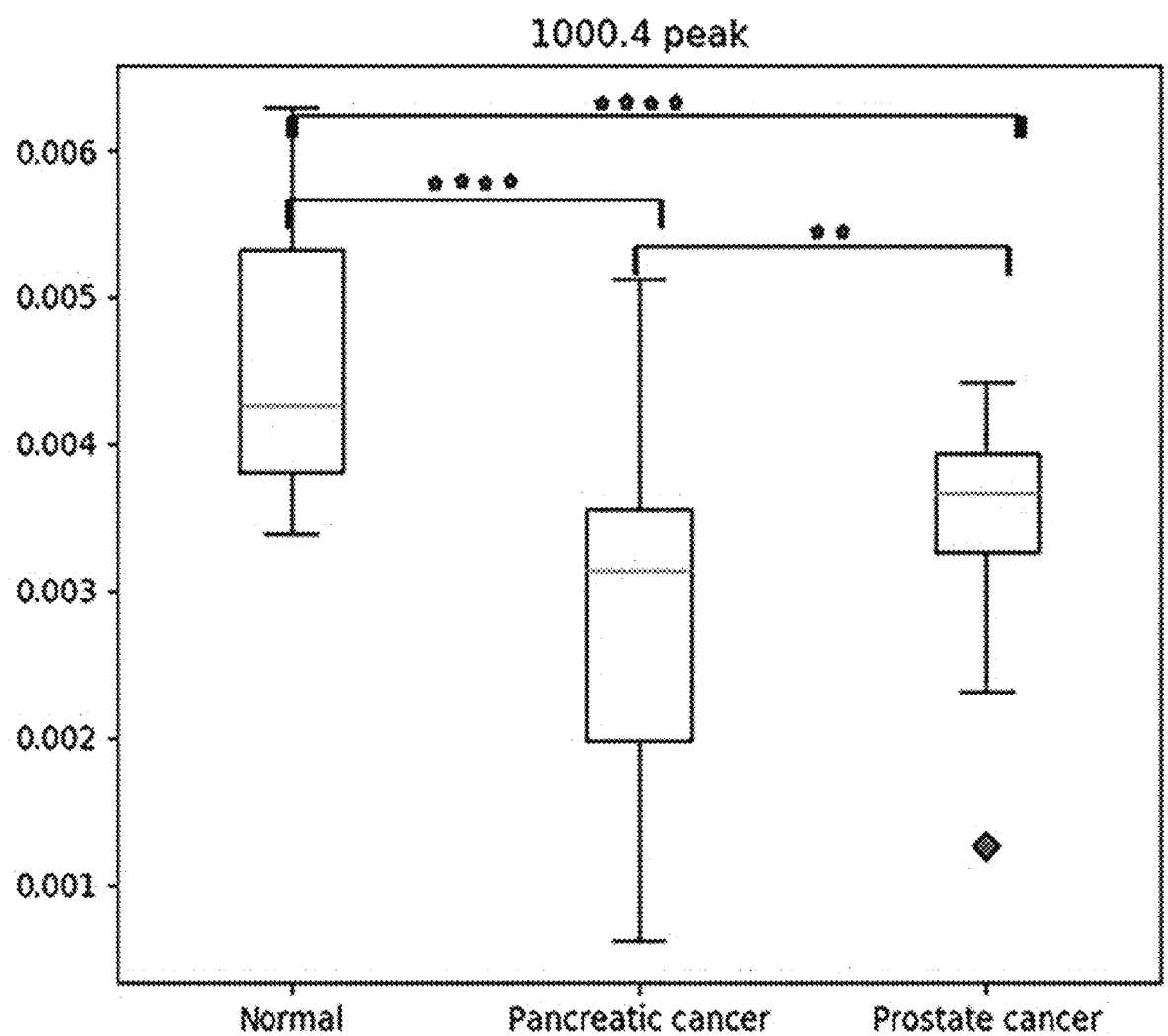
FIG. 5d is a box plot for sample distributions in each group at the 1000.4 cm-1 peak according to an embodiment of the present disclosure.
Figure 5E:
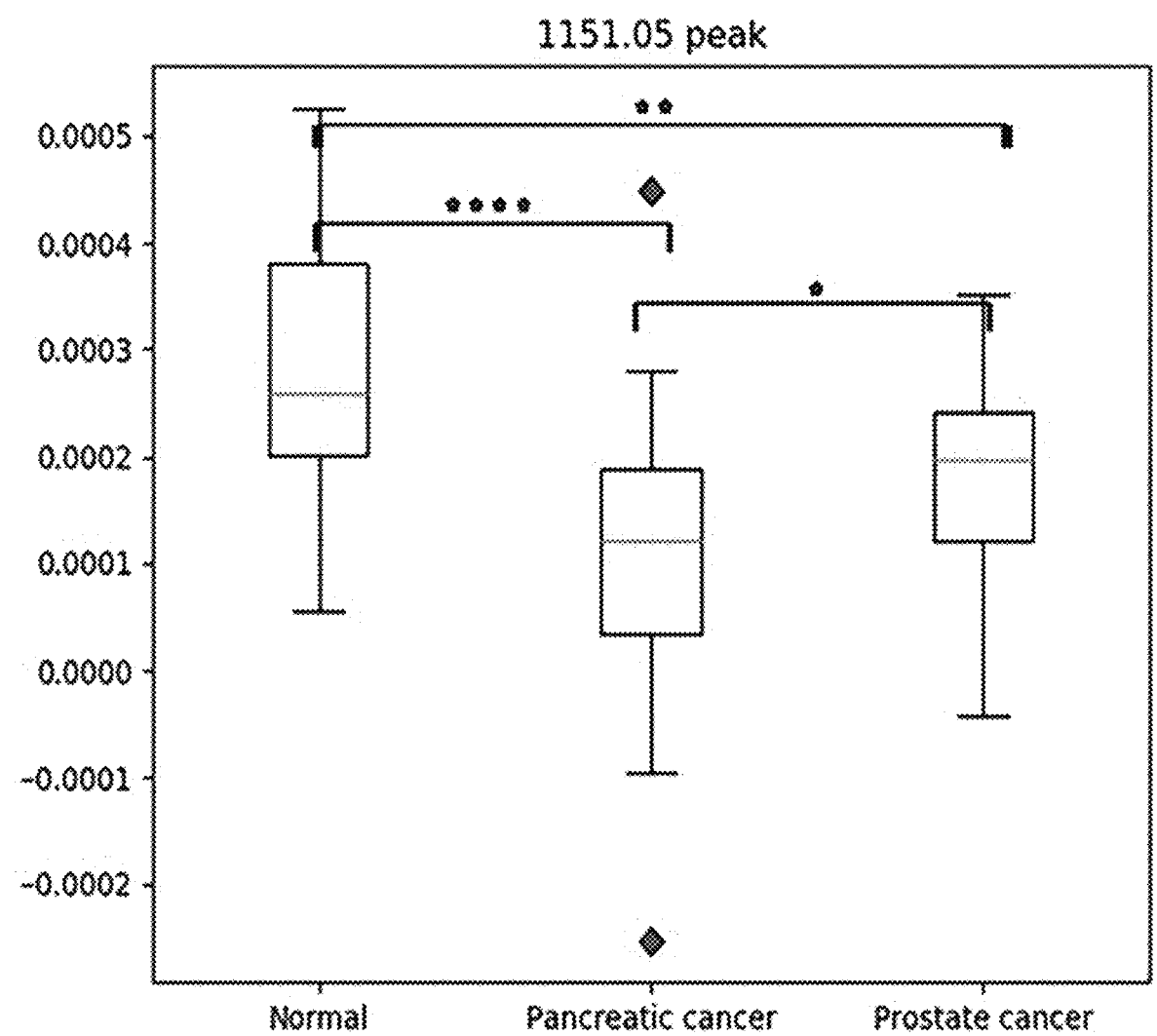
FIG. 5e is a box plot for sample distributions in each group at the 1151.05 cm-1 peak according to an embodiment of the present disclosure.

FIGS. 5d and 5e show SERS signal distributions for a normal group, a group of pancreatic cancer patients, and a group of prostate cancer patients at the 1000.4 and 1151 cm-1 peaks which seem to be attributed to the double bound vibration between carbon and oxygen (C=O vibration) in urea. The peak tended to be higher for the normal group than the cancer patient groups, with a higher pattern found in the prostate cancer group than the pancreatic cancer group. This is consistent with the previous research reporting that the release of urea is decreased due to a urea cycle disorder in cancer patients.

Figure 5F:
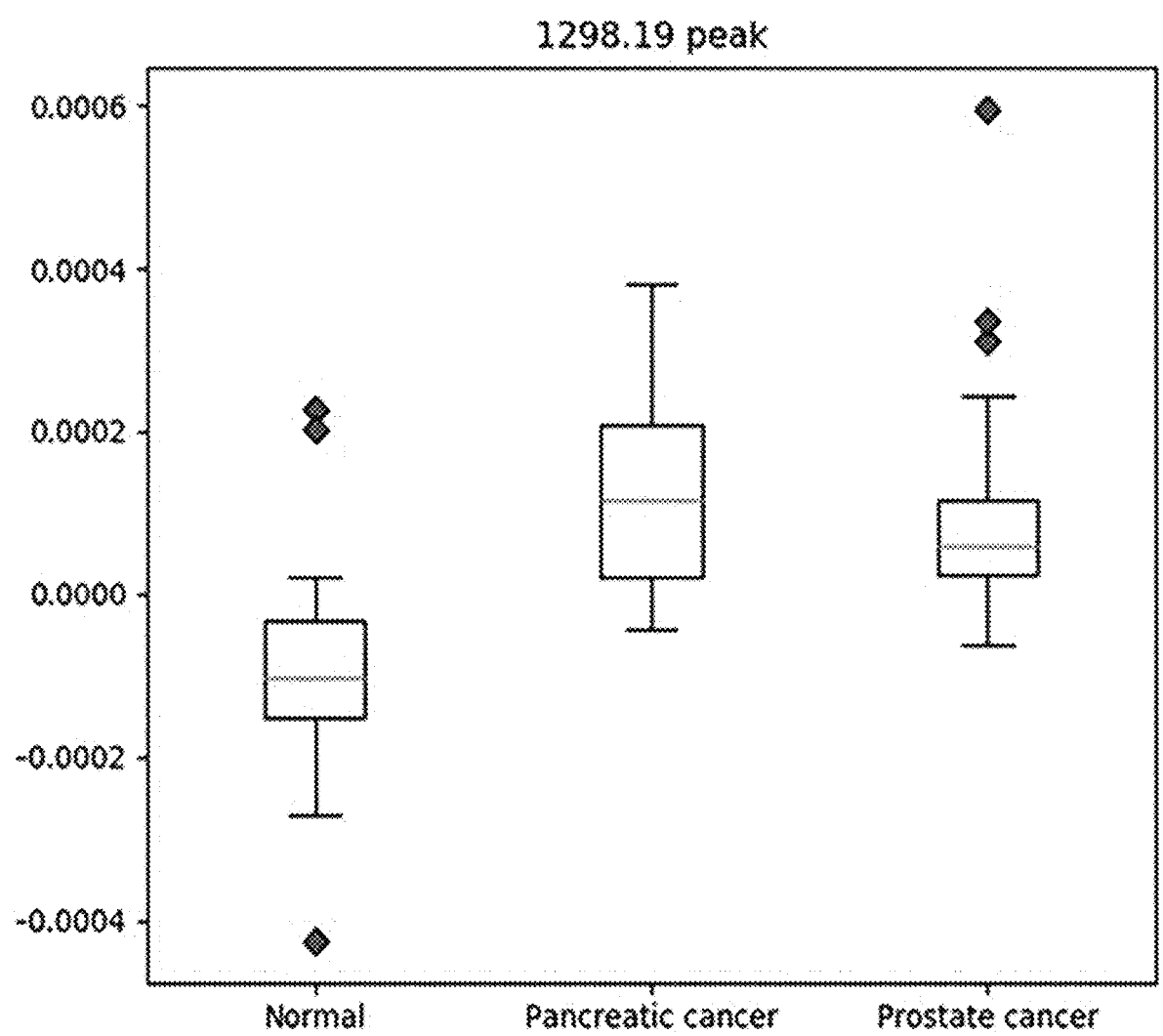
FIG. 5f is a box plot for sample distributions in each group at the 51298.19 cm-1 peak according to an embodiment of the present disclosure.

FIG. 5f shows SERS signal distributions for a normal group, a group of pancreatic cancer patients, and a group of prostate cancer patients at the 1298.1 cm-1 peak which seems to be attributed to twisting or wagging of bending mode in methyl group ($CH_2$). The peak tended to be higher for the normal group than the cancer patient groups, with a higher pattern found in the pancreatic cancer group than the prostate cancer group.

Figure 5G:
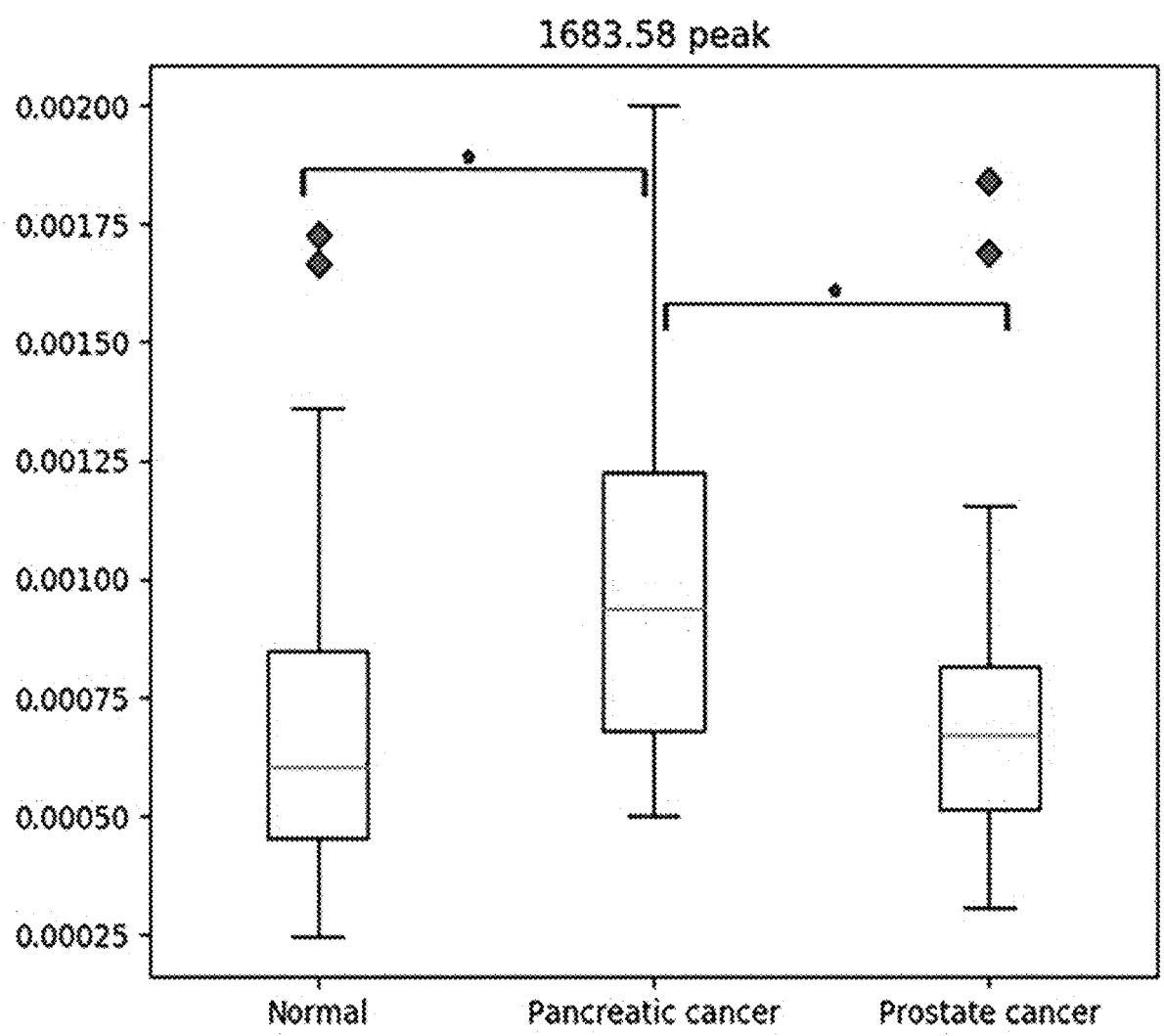
FIG. 5g is a box plot for sample distributions in each group at the 1683.58 cm-1 peak according to an embodiment of the present disclosure.
Figure 6A:
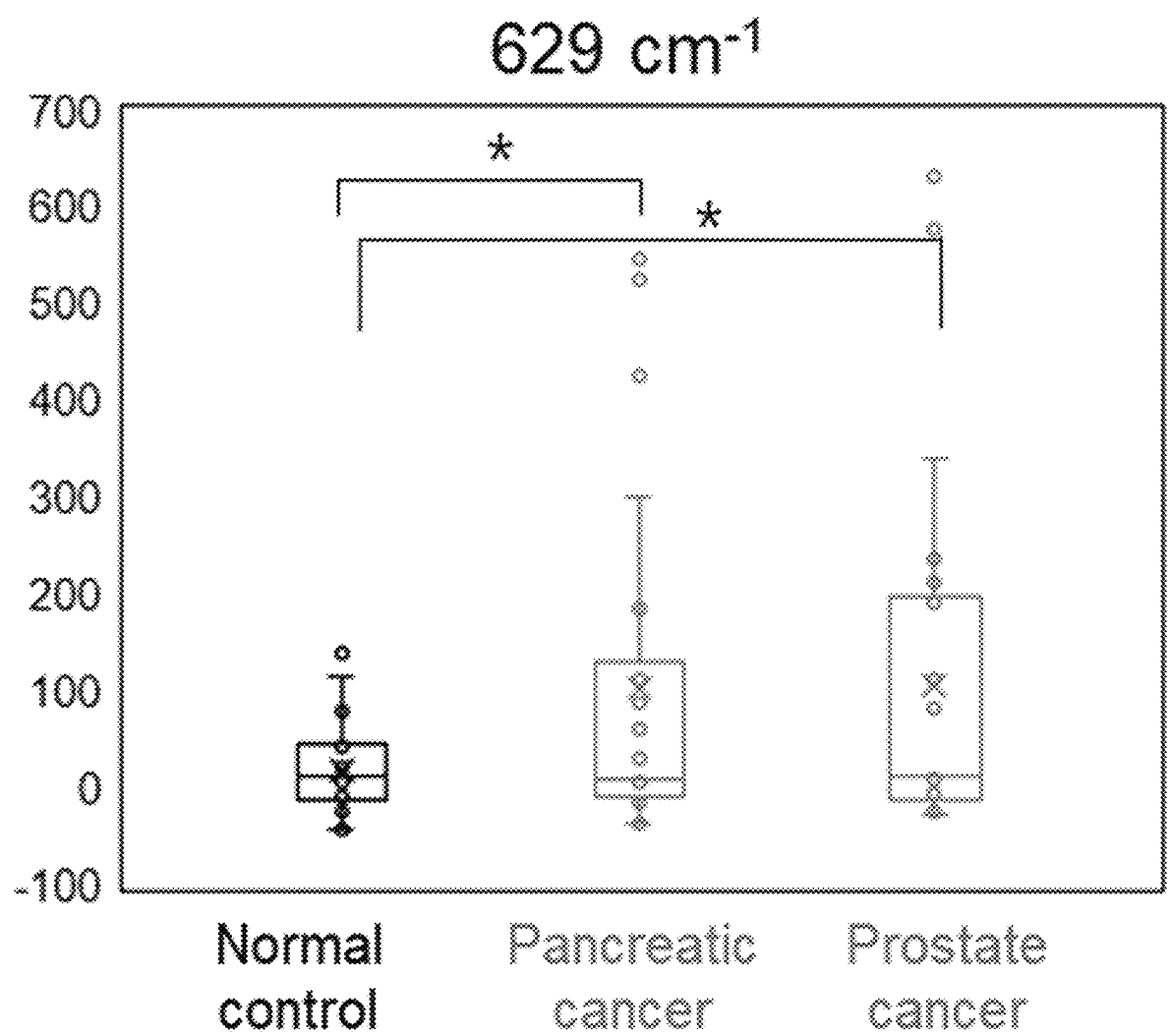
FIGS. 6a, 6b, 6c, 6d, 6e, 6f, 6g, 6h, 6i, 6j and 6k are box plots for distributions of methanol-pretreated samples in each group according to an embodiment of the present disclosure.
Figure 6B:
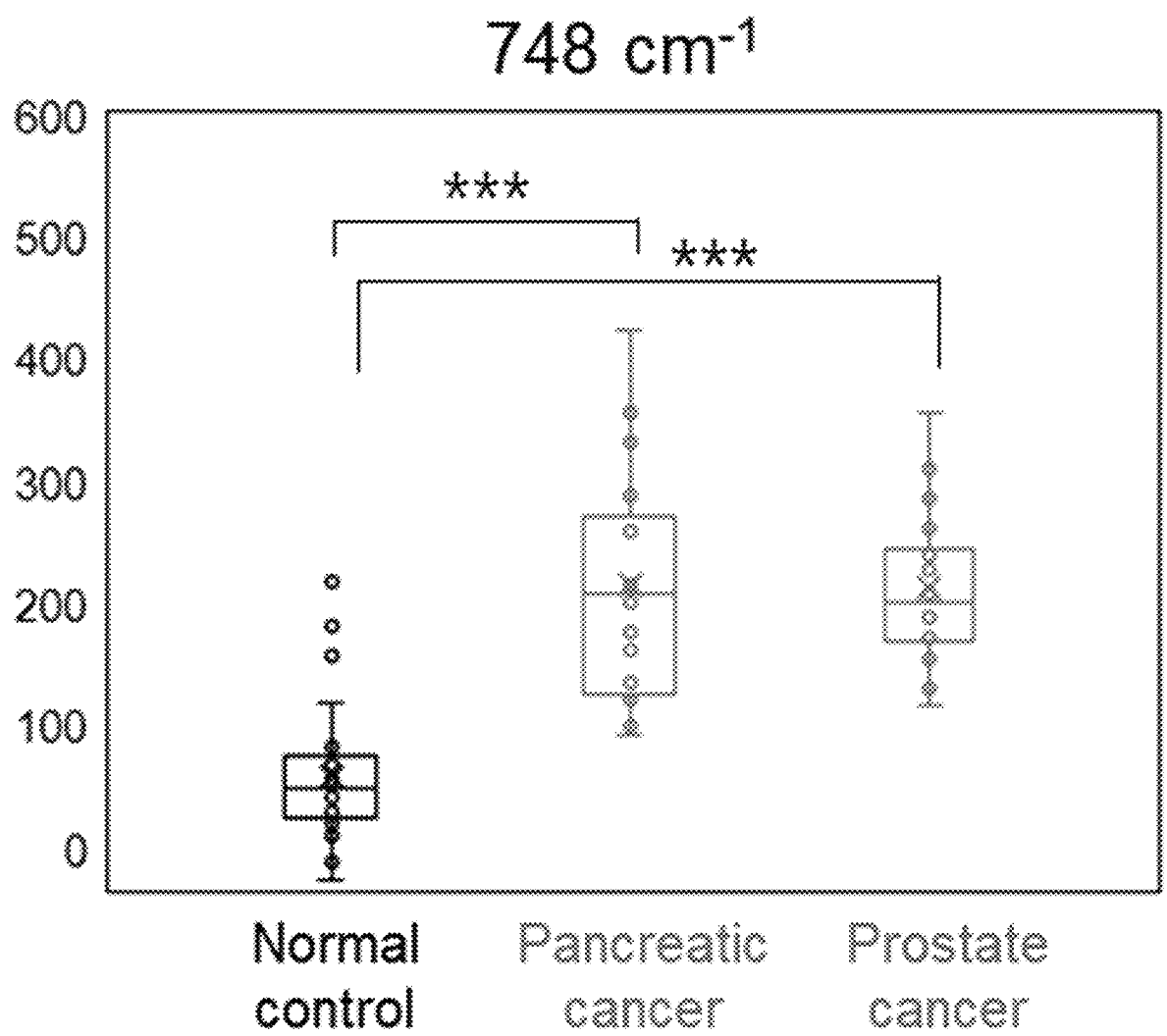
Figure 6C:
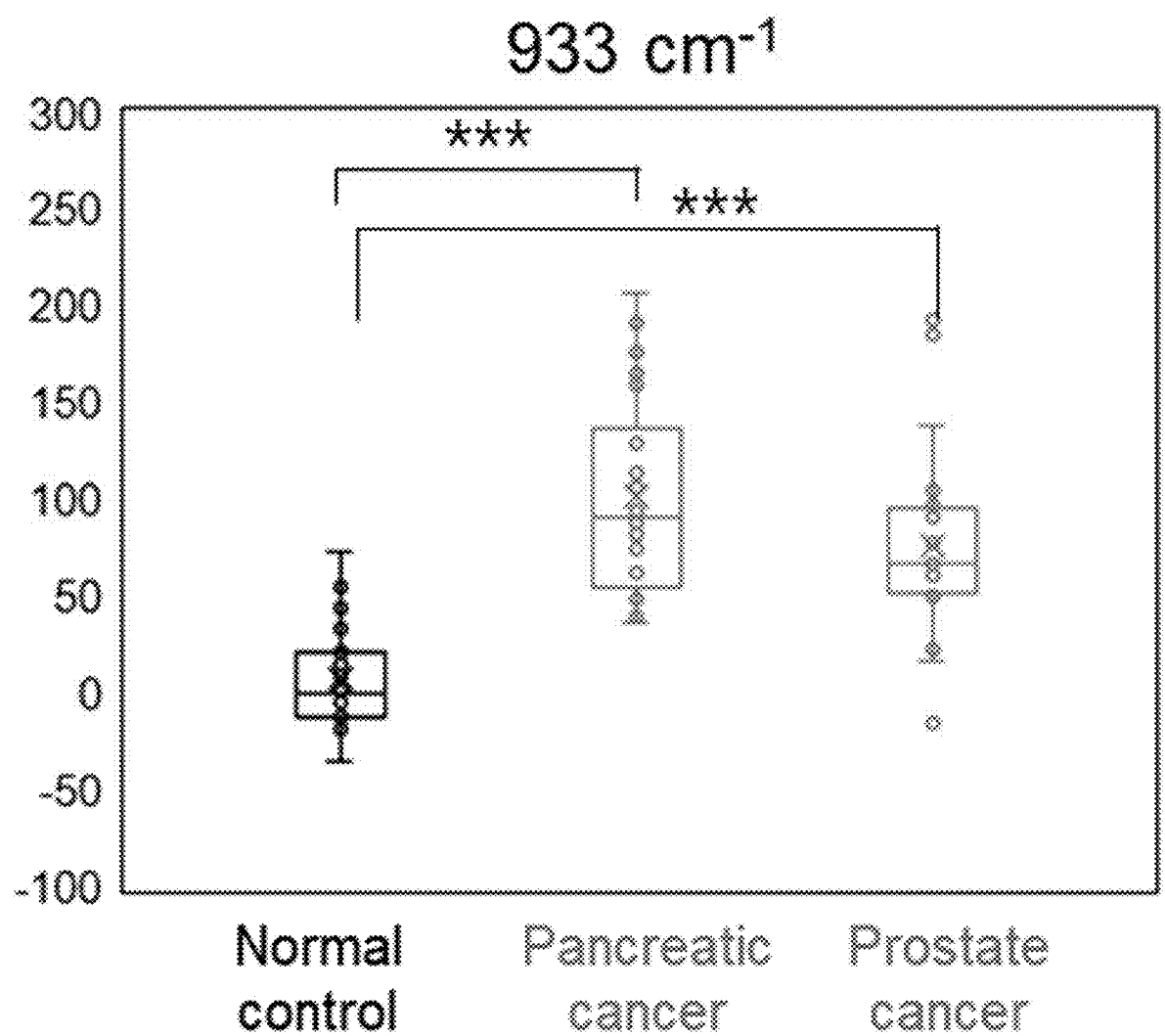
Figure 6D:
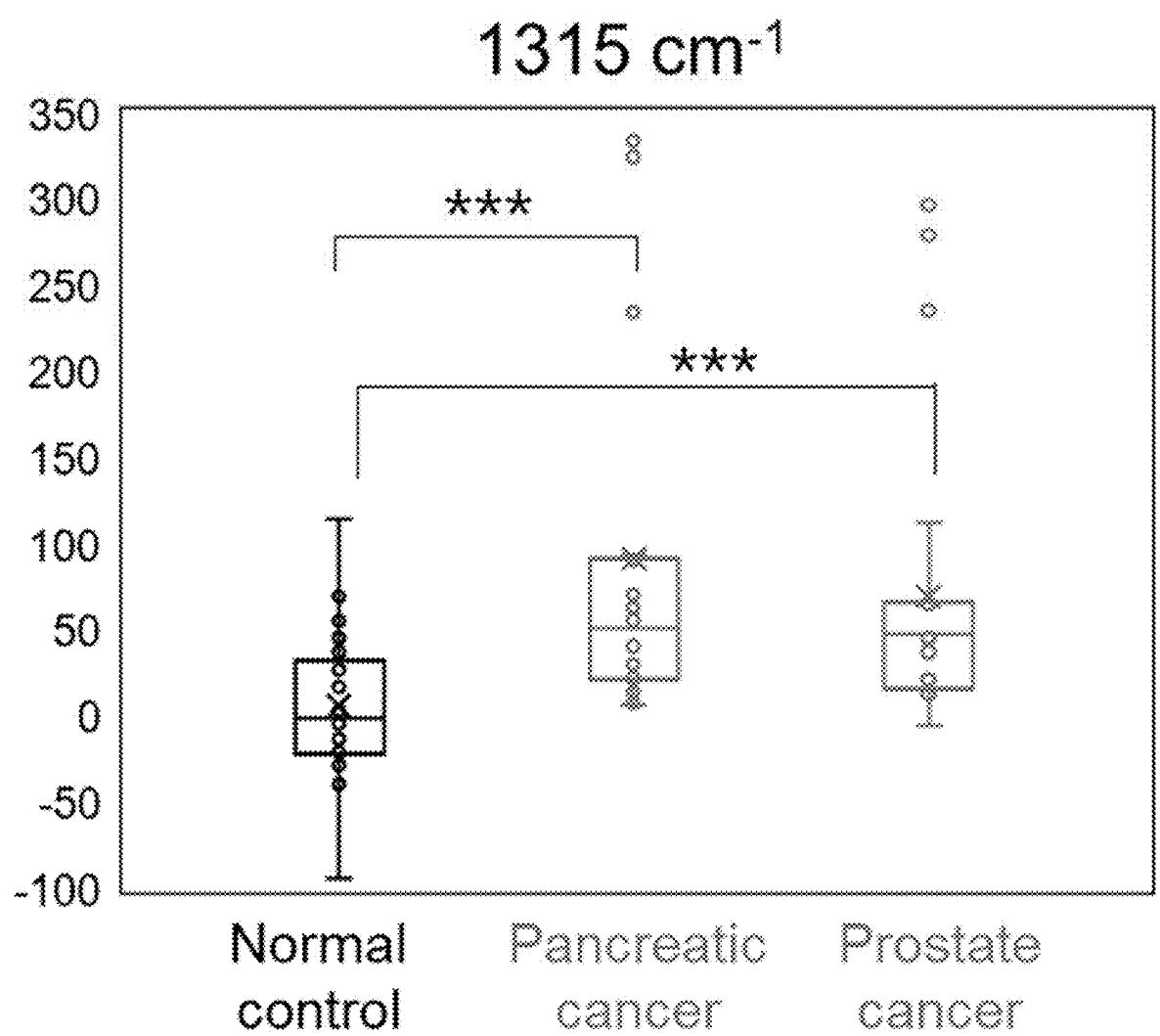
Figure 6E:
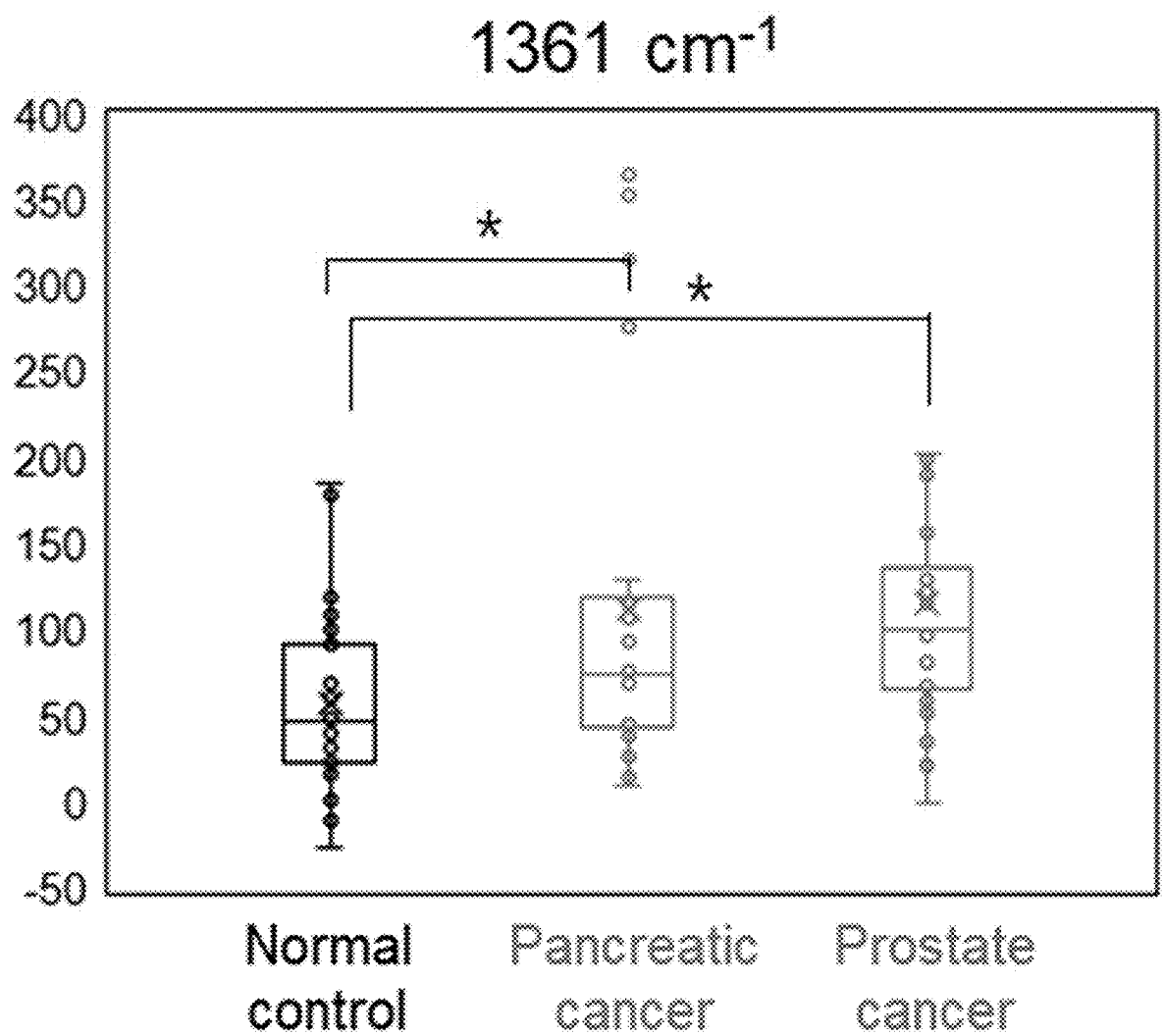
Figure 6F:
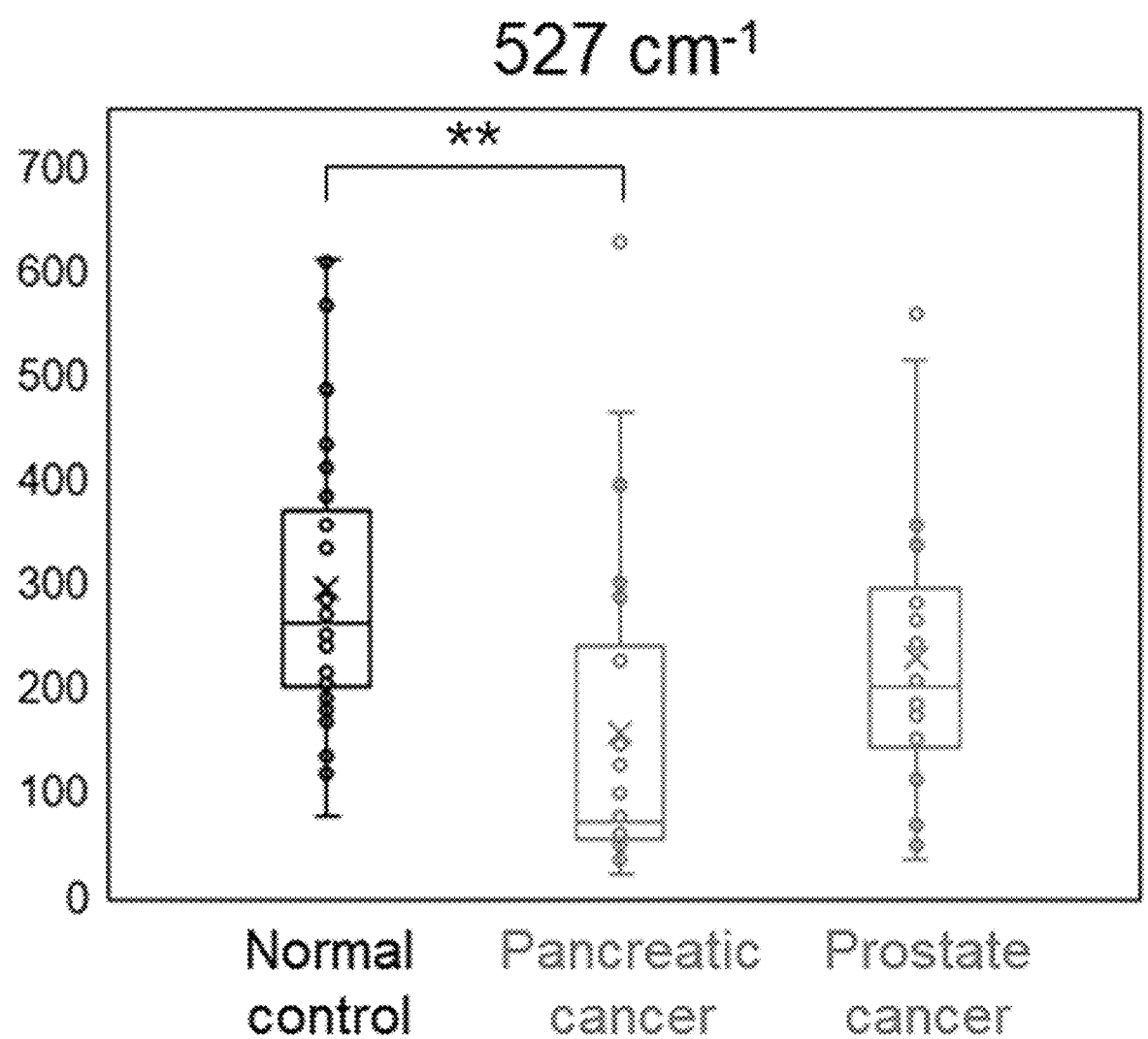
Figure 6G:
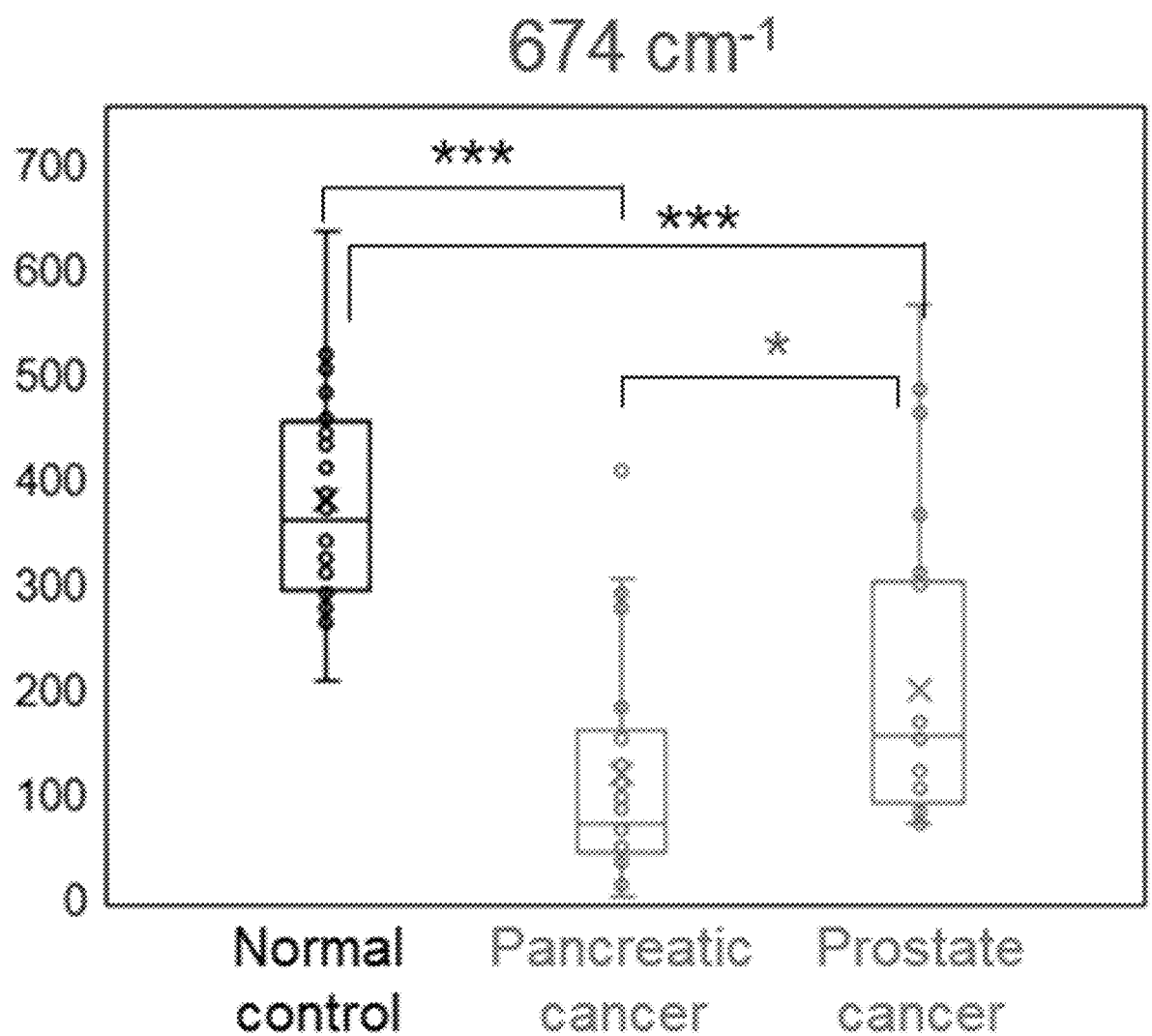
Figure 6H:
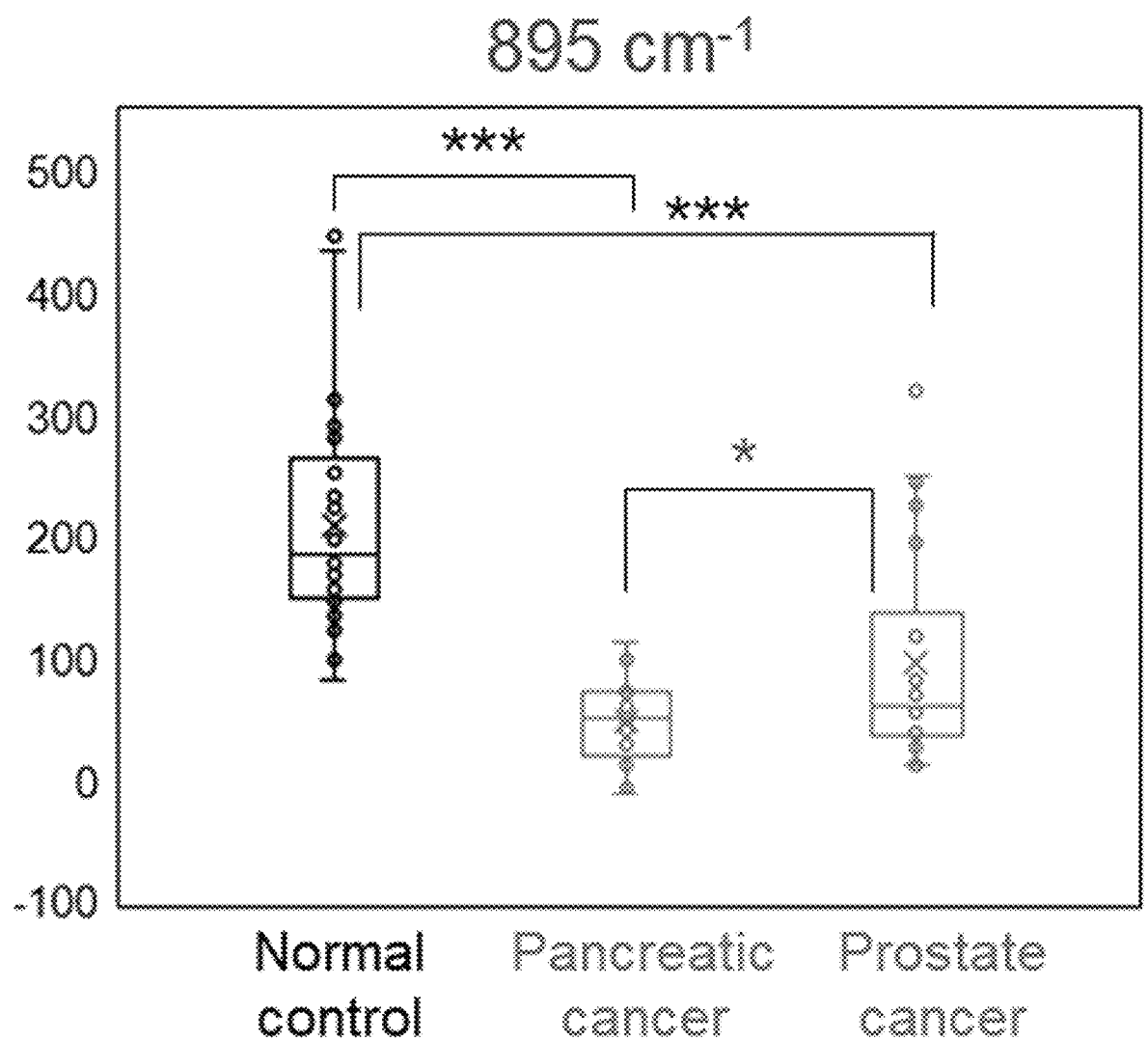
Figure 6I:
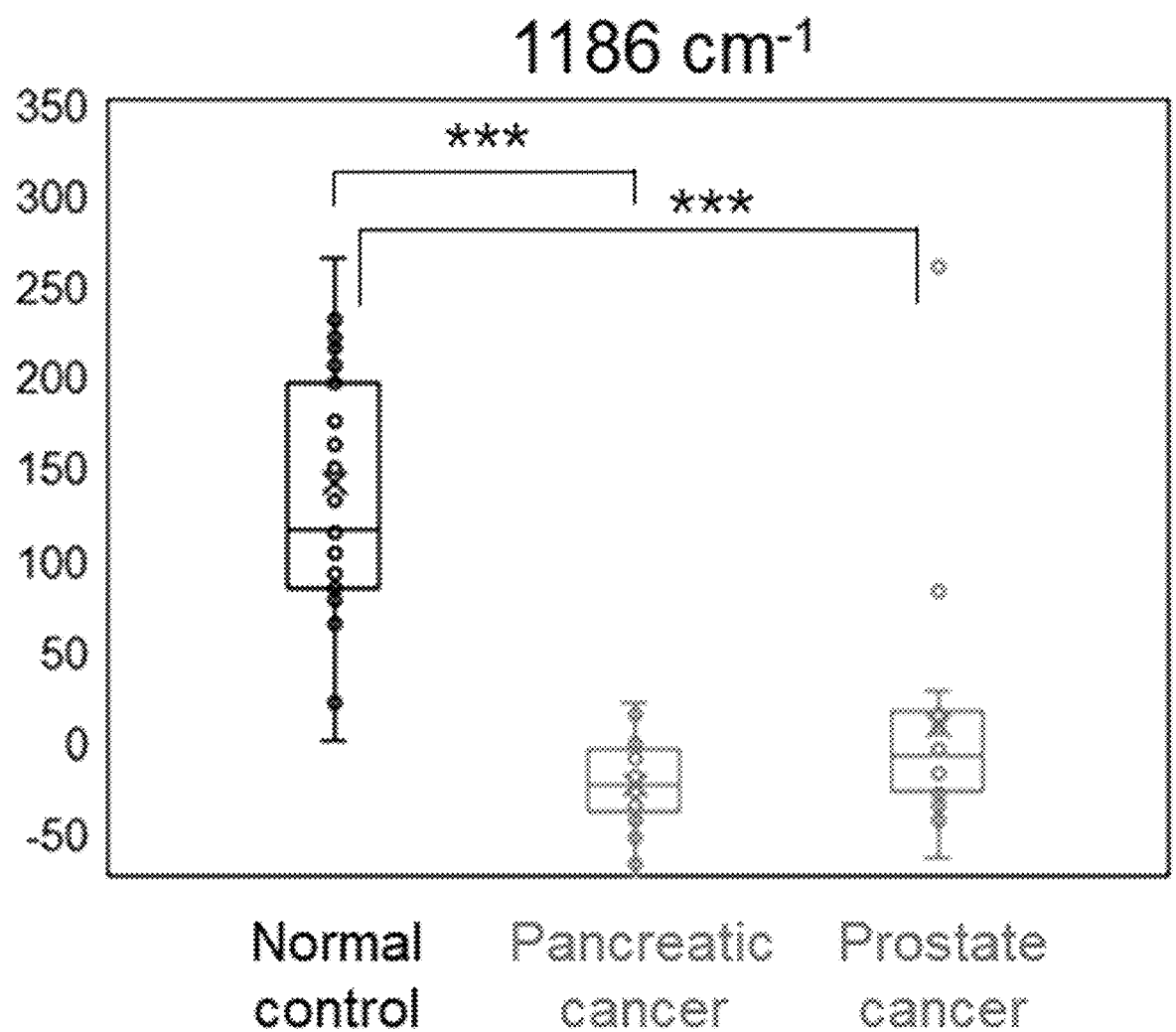
Figure 6J:
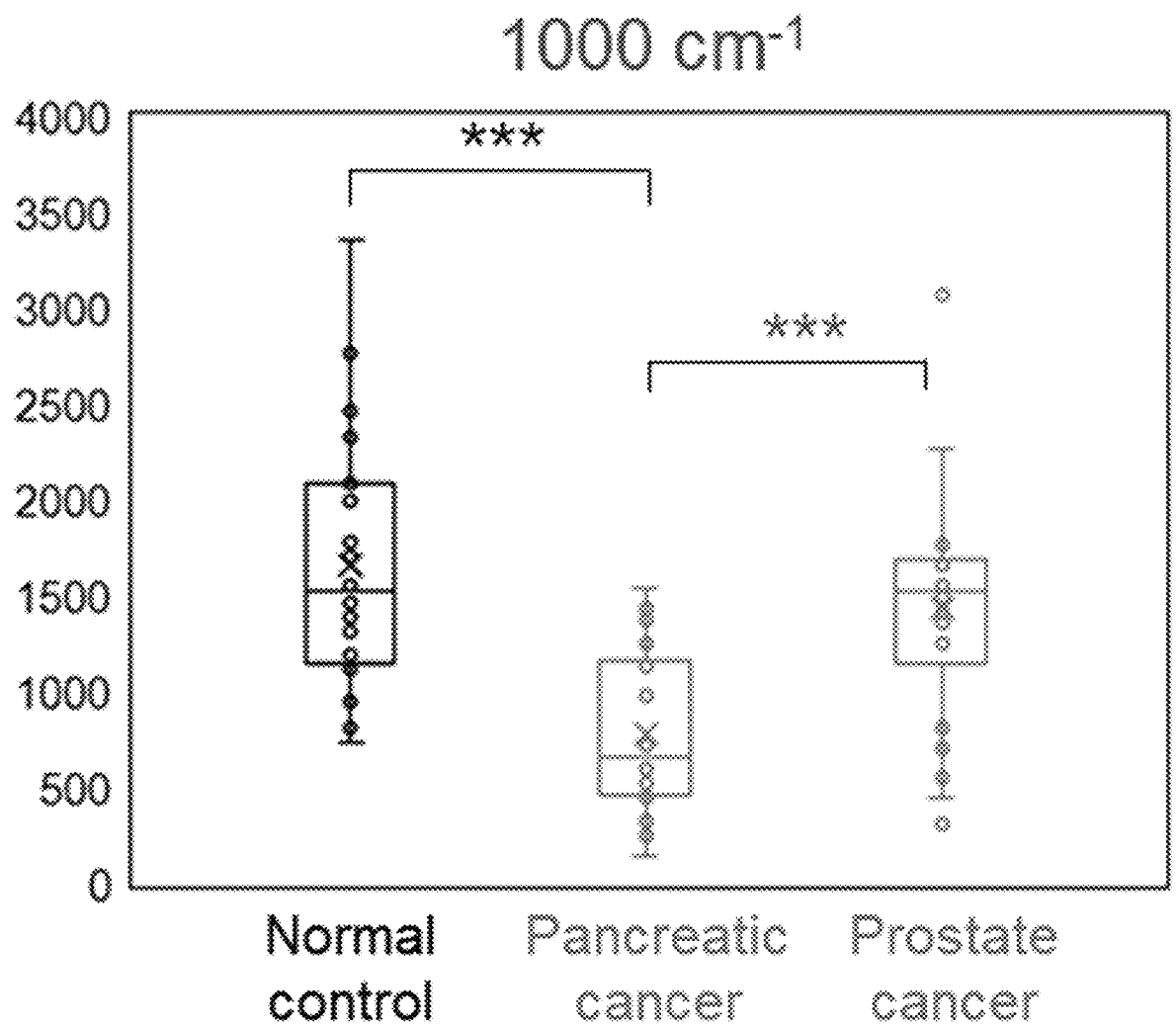
Figure 6K:
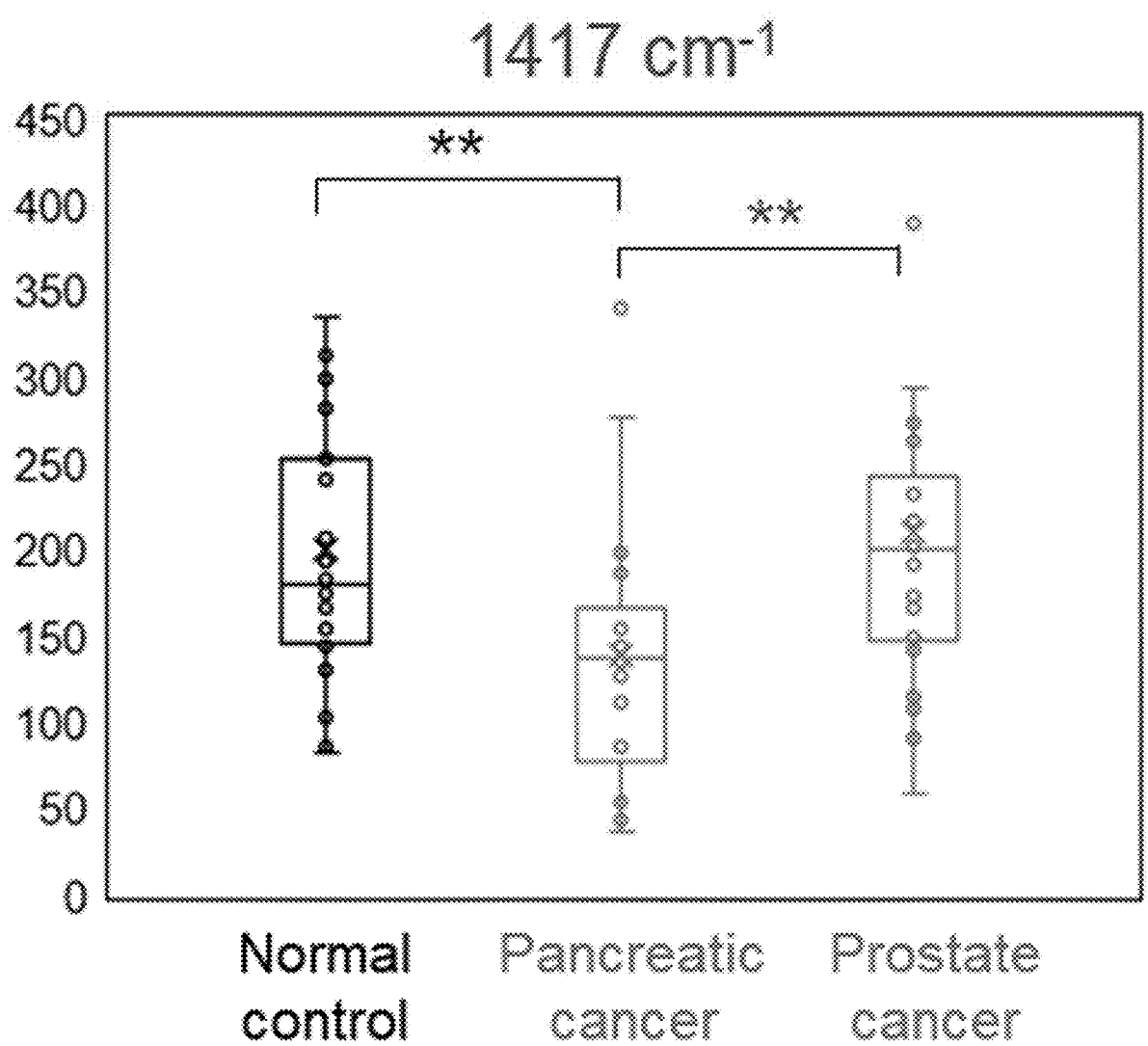

FIG. 5g shows SERS signal distributions for a normal group, a group of pancreatic cancer patients, and a group of prostate cancer patients at the 1683.5 cm-1 peak which seems to be attributed to the stretching of carbon and oxygen (C=O vibration). The peak tended to be higher for the normal group than the cancer patient groups, with a higher pattern found in the pancreatic cancer group than the prostate cancer group.

P values determined statistical significance between two groups and are expressed in the figures (* $0.05<p<0.1$,  $0.01<p<0.05$, * $0.005<p<0.01$, ** $0.001<p<0.005$, and *** $p<0.001$).

EXAMPLE 5

Application of Multivariate Analysis—Calcium Pretreatment

For multivariate analysis, principal component analysis (PCA) and orthogonal partial least squares discriminant analysis (OPLS-DA) were conducted using R program-installed functions.

Principal component analysis (PCA), one of metabolomics analysis methods, creates a small number of new variables independent of each other while maximizing the information of multivariate data. PCA is a statistical technique that reduces dimensionality by extracting multidimensional data with many variables, including unnecessary variables, into a two-dimensional or three-dimensional principal component space based on the principal component axis.

Orthogonal partial least squares discriminant analysis (OPLS-DA) is a statistical technique that maximizes the visualization of each data participating in the discrimination and helps find metabolites with differences between experimental groups by assigning a dependent variable called a set through classification. OPLS-DA is the most suitable method for variable search applied to the establishment and discrimination of predictive models.

A total of 428 variables in the wavelength band 502-1998 cm-1 were used for multivariate analysis. Principal component analysis (PCA) was used based on the principal components 1-axis and 2-axis, which are two-dimensional space. In the classification results of orthogonal partial least squares discriminant analysis (OPLS-DA), values of sensitivity, specificity, and accuracy were found in addition to classification between each group. Ultimately, statistical analysis in metabolomics aims to streamline the complex patterns exhibited by mixtures of metabolites, thus finding distinctions between observed populations or marker signals of specific populations.

5-1-1. Principal Component Analysis (PCA)

For spectra measured from surface-enhanced Raman scattering, 428 variables were selected within the 502 to 1998 cm-1 band. Principal component analysis was performed on these variables using a function built in program R. For further data analysis, the first principal component and the second principal component were taken. In this study, the first and the second principal component were used as tools for classification between a normal group (Control) and a group of cancer patients (Cancer), between a normal group (Control) and a group of pancreatic cancer patients (Pancreatic Cancer), between a normal group (Control) and a group of prostate cancer patients, and between a group of pancreatic cancer patients (Pancreatic Cancer) and a group of prostate cancer patients (Prostate Cancer).

Figure 7A:
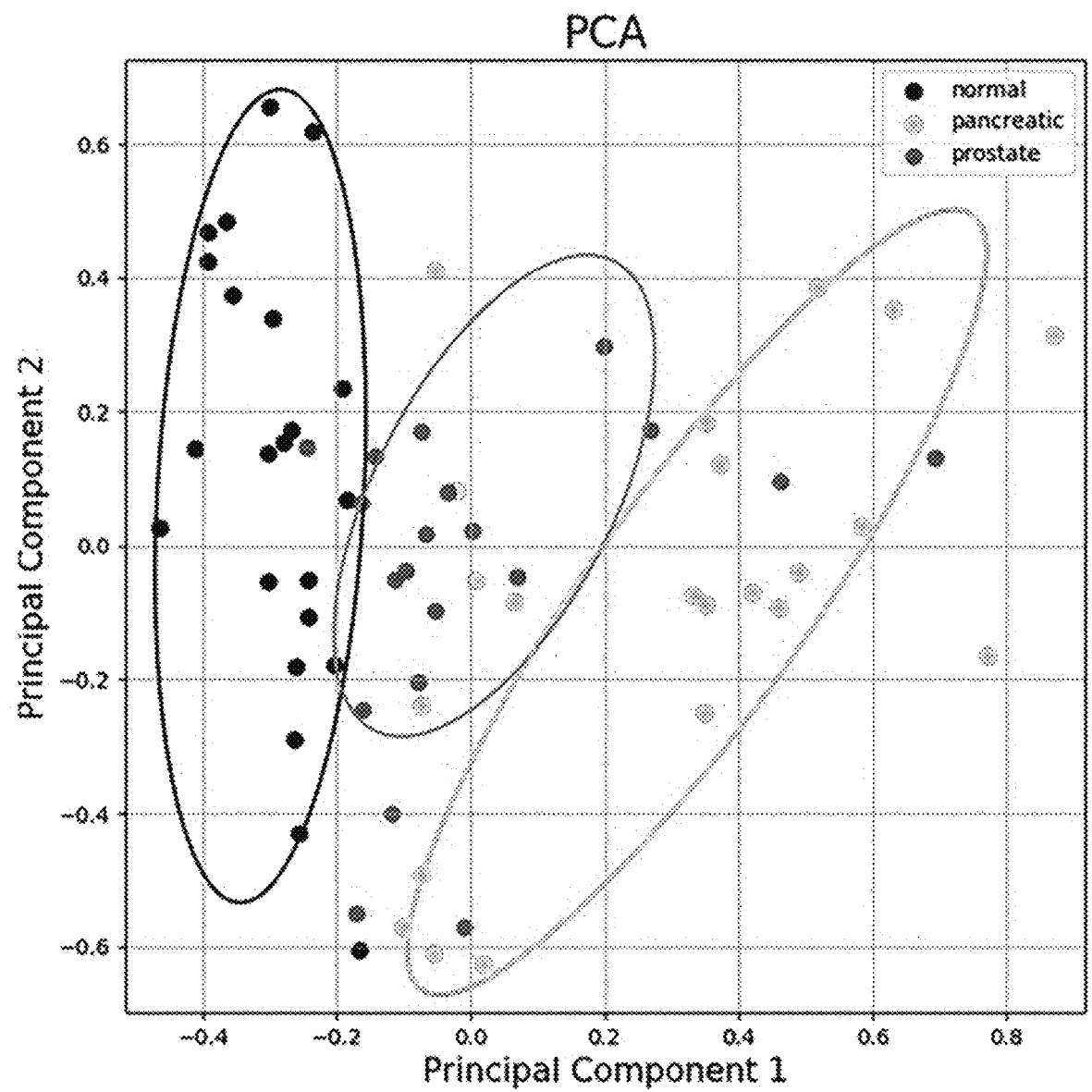
FIG. 7a shows results of principal component analysis of surface-enhanced Raman spectra in a normal group, a pancreatic cancer patient group, and a prostate cancer patient group according to an embodiment of the present disclosure.

As a result of trying to cluster the normal group, the group of pancreatic cancer patients, and the group of prostate cancer patients based on the principal components 1-axis and 2-axis, the three groups were relatively well distinguished as shown in FIG. 7a. The groups were distributed at 27% on the principal component 1-axis and at 24% on the principal component 2-axis, which accounted for a total of about 51% of the variation. For 10 principal component axes, about 90% of the groups could be explained.

Figure 7B:
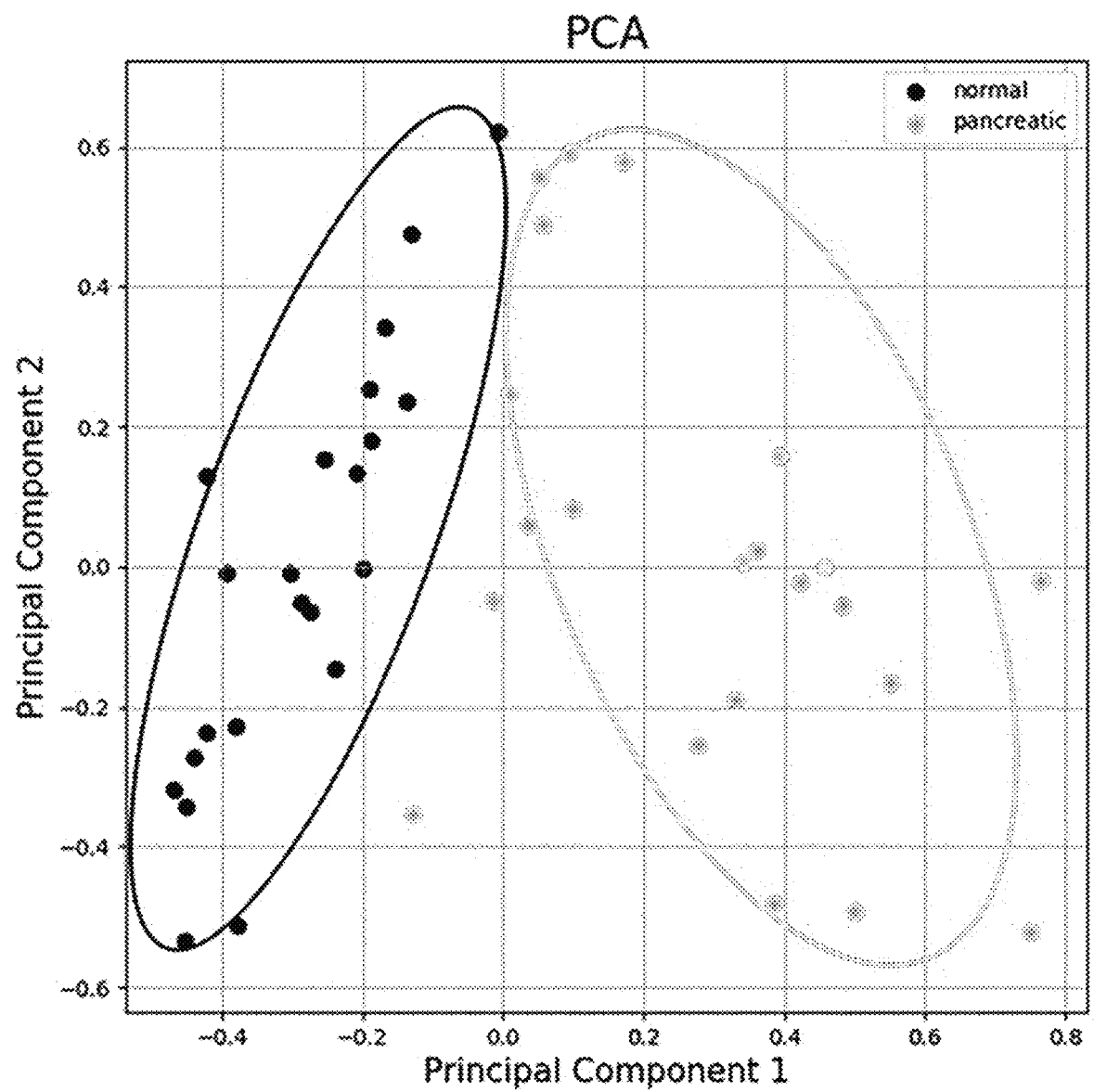
FIG. 7b shows results of principal component analysis of surface-enhanced Raman spectra in a normal group and a prostate cancer patient group according to an embodiment of the present disclosure.

FIG. 7b shows results of principal component analysis conducted for a normal group and a group of pancreatic cancer patients. As can be seen, the two groups were distributed at 30% on the principal component 1-axis and at 24% on the principal component 2-axis, which accounted for a total of 54% of the variation, showing good discrimination therebetween. For 9 principal component axes, about 90% of the groups could be explained.

Figure 7C:
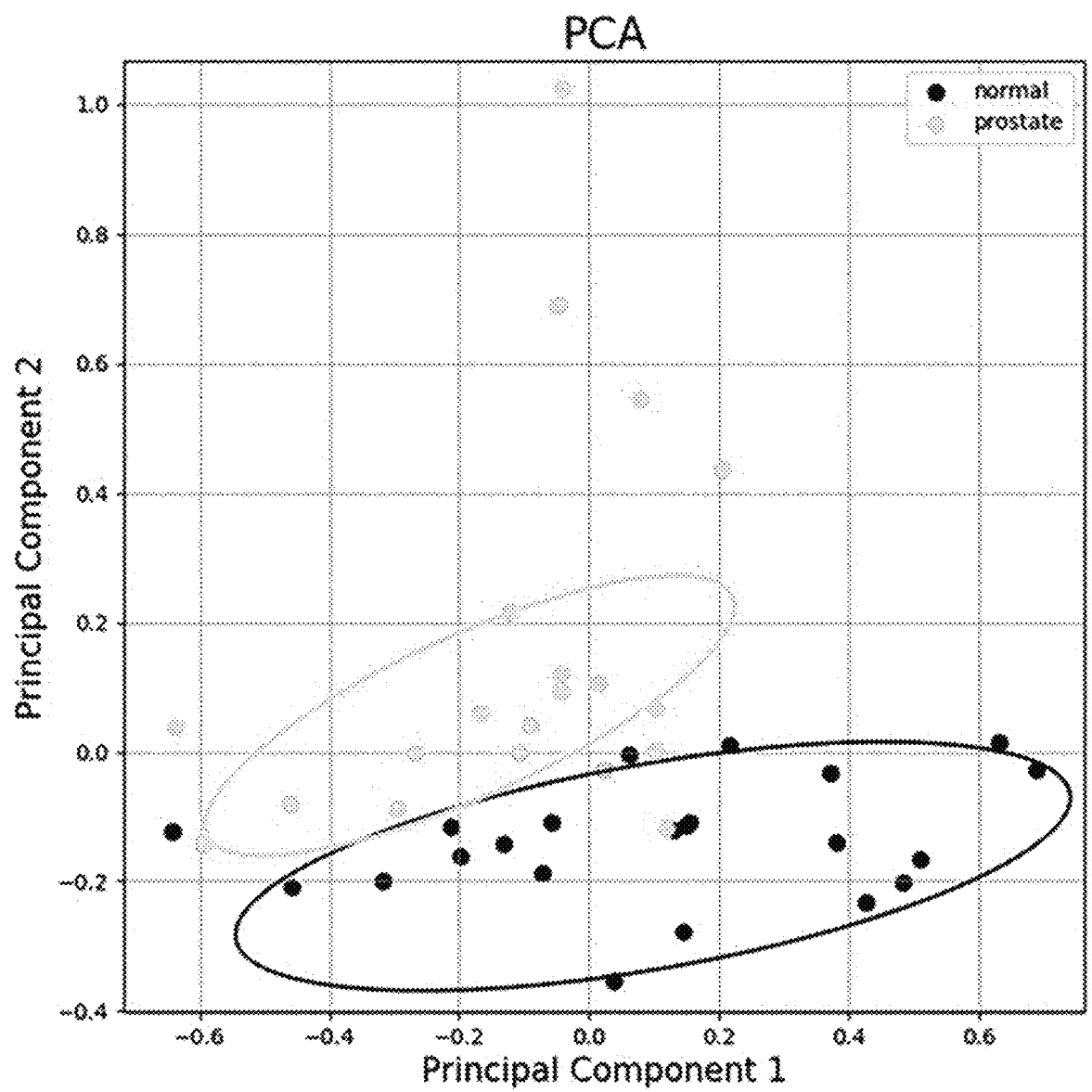
FIG. 7c shows results of principal component analysis of surface-enhanced Raman spectra in a normal group and a pancreatic cancer patient group according to an embodiment of the present disclosure.

FIG. 7c shows results of principal component analysis conducted for a normal group and a group of prostate cancer patients. As can be seen, the two groups were distributed at 29% on the principal component 1-axis and at 20% on the principal component 2-axis, which accounted for a total of 49% of the variation, showing good discrimination therebetween. For 9 principal component axes, about 90% of the groups could be explained.

Figure 7D:
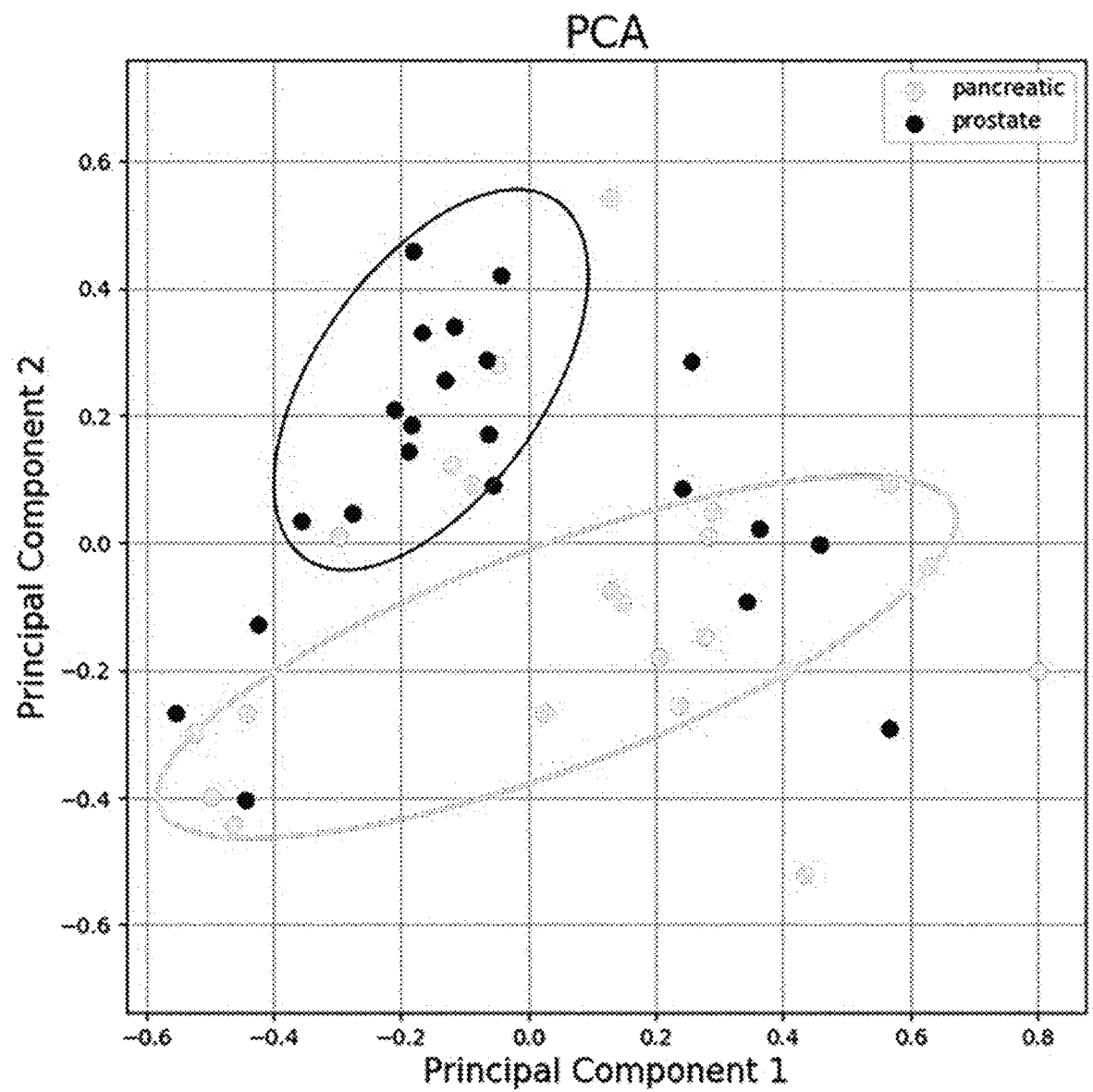
FIG. 7d shows results of principal component analysis of surface-enhanced Raman spectra in a pancreatic cancer patient group and a prostate cancer patient group according to an embodiment of the present disclosure.

FIG. 7d shows results of principal component analysis conducted for a group of pancreatic cancer patients and a group of prostate cancer patients. As can be seen, the two groups were distributed at 32% on the principal component 1-axis and at 19% on the principal component 2-axis, which accounted for a total of 51% of the variation. For 9 principal component axes, about 90% of the groups could be explained. Although the explanations of the principal component 1-axis and 2-axis were relatively low, there was a distinctive difference in the degree of classification of each group.

5-1-2. Orthogonal Partial Least Squares Discriminant Analysis, Sensitivity, Specificity, and Accuracy Orthogonal partial least squares discriminant analysis (OPLS-DA) was performed using program R.

Figure 8A:
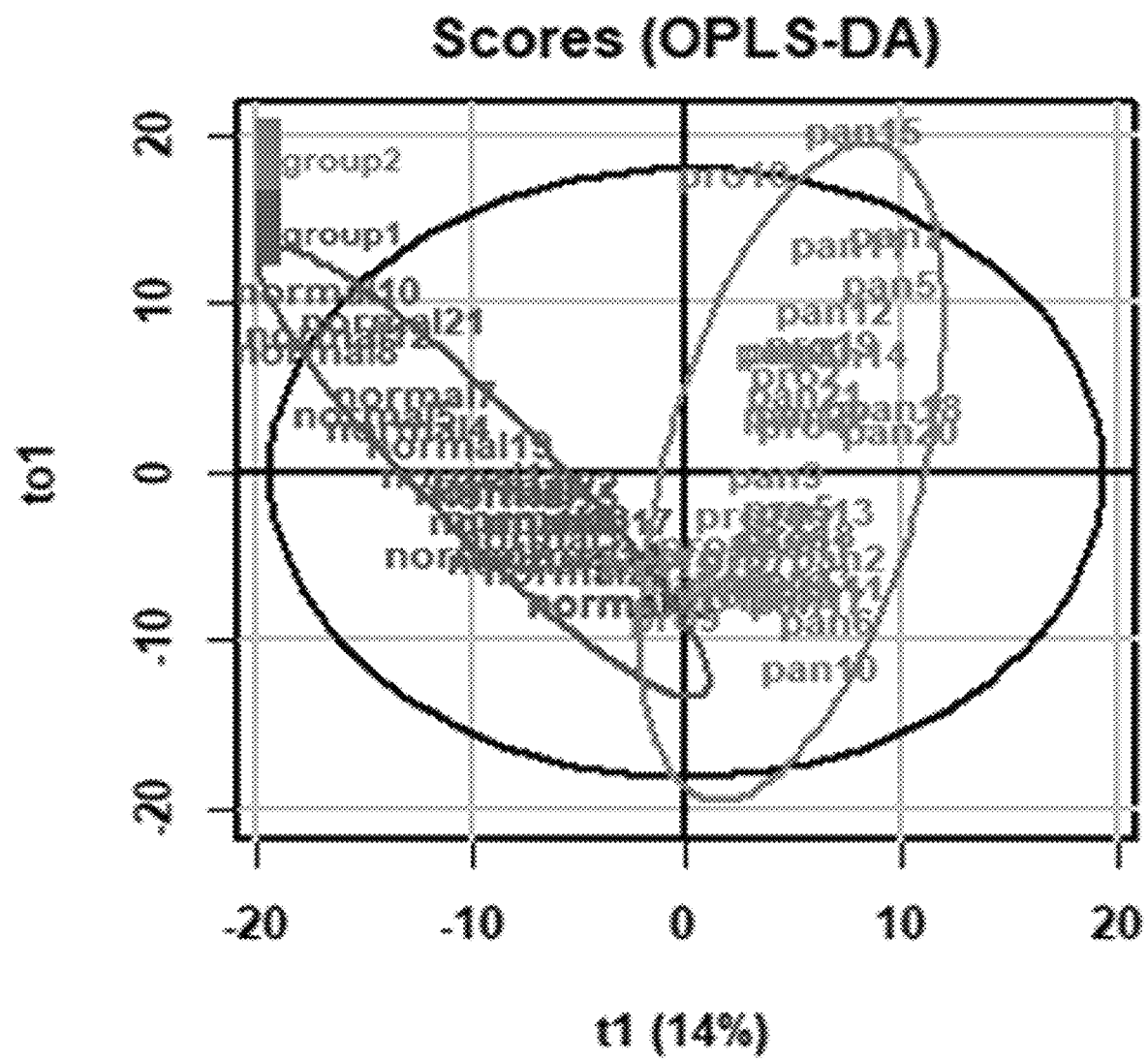
FIG. 8a shows results of orthogonal partial least squares discriminant analysis of surface-enhanced Raman spectra in a normal group and a cancer patient group (pancreatic cancer and prostate cancer patients) according to an embodiment of the present disclosure.

FIG. 8a shows results of clustering a normal group and a group of cancer patients, with $R^2Y=0.804$ and $Q^2Y=0.68$. The results indicated 90.9% for sensitivity, 95.2% for specificity, and 93.7% for accuracy.

TABLE 1

| Predict | Reference | |
| --- | --- | --- |
|  | Control | Cancer |
| Control | 20 | 2 |
| Cancer | 2 | 40 |

Figure 8B:
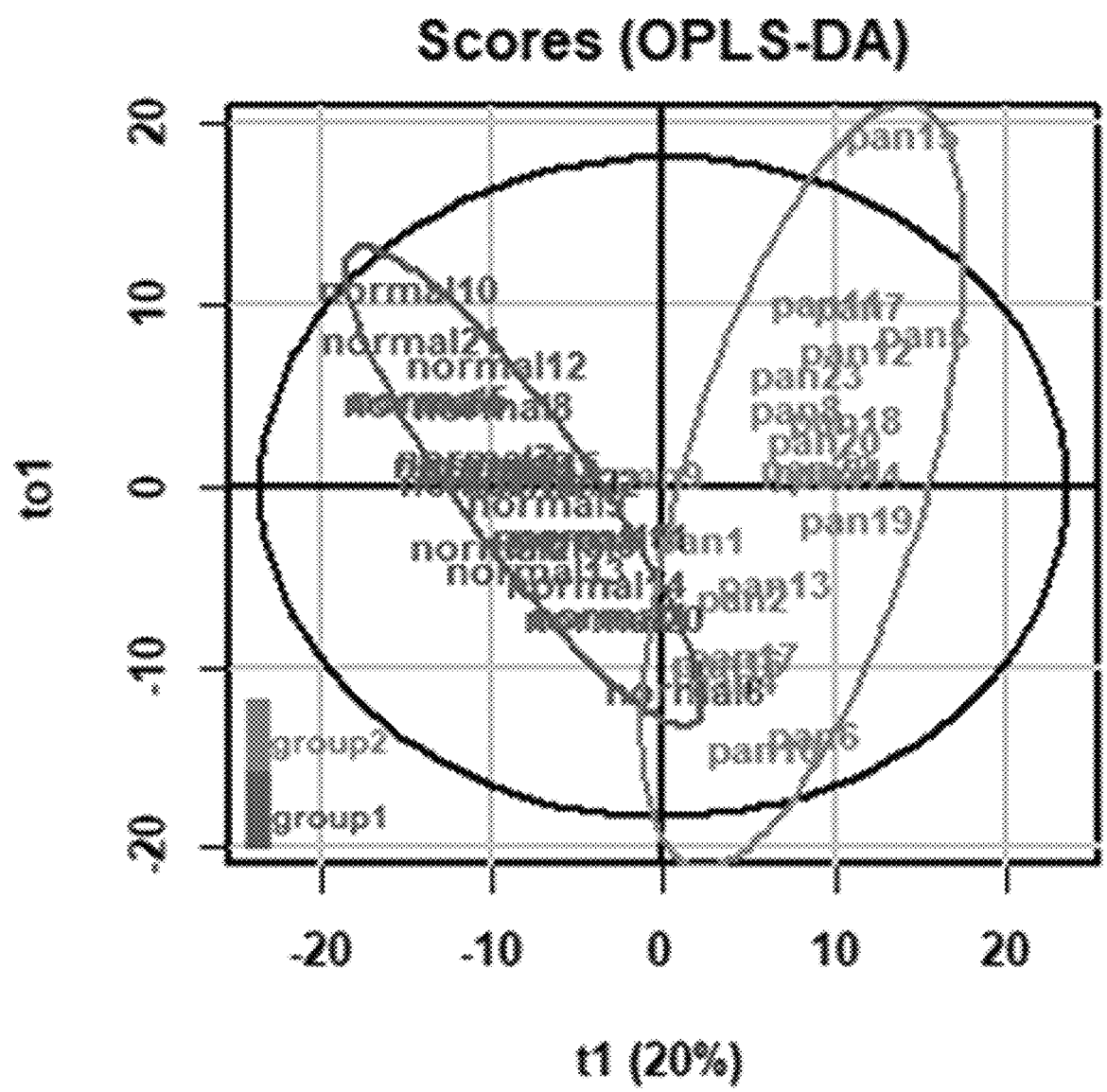
FIG. 8b shows results of orthogonal partial least squares discriminant analysis of surface-enhanced Raman spectra in a normal group and a pancreatic cancer patient group according to an embodiment of the present disclosure.

FIG. 8b shows results of clustering a normal group and a group of pancreatic cancer patients, with $R^2Y=0.809$ and $Q^2Y=0.741$. The results indicated 90.9% for sensitivity, 90.9% for specificity, and 90% for accuracy.

TABLE 2

| Predict | Reference | |
|---|---|---|
|  | Control | Cancer |
| Control | 20 | 2 |
| Cancer | 2 | 20 |

Figure 8C:
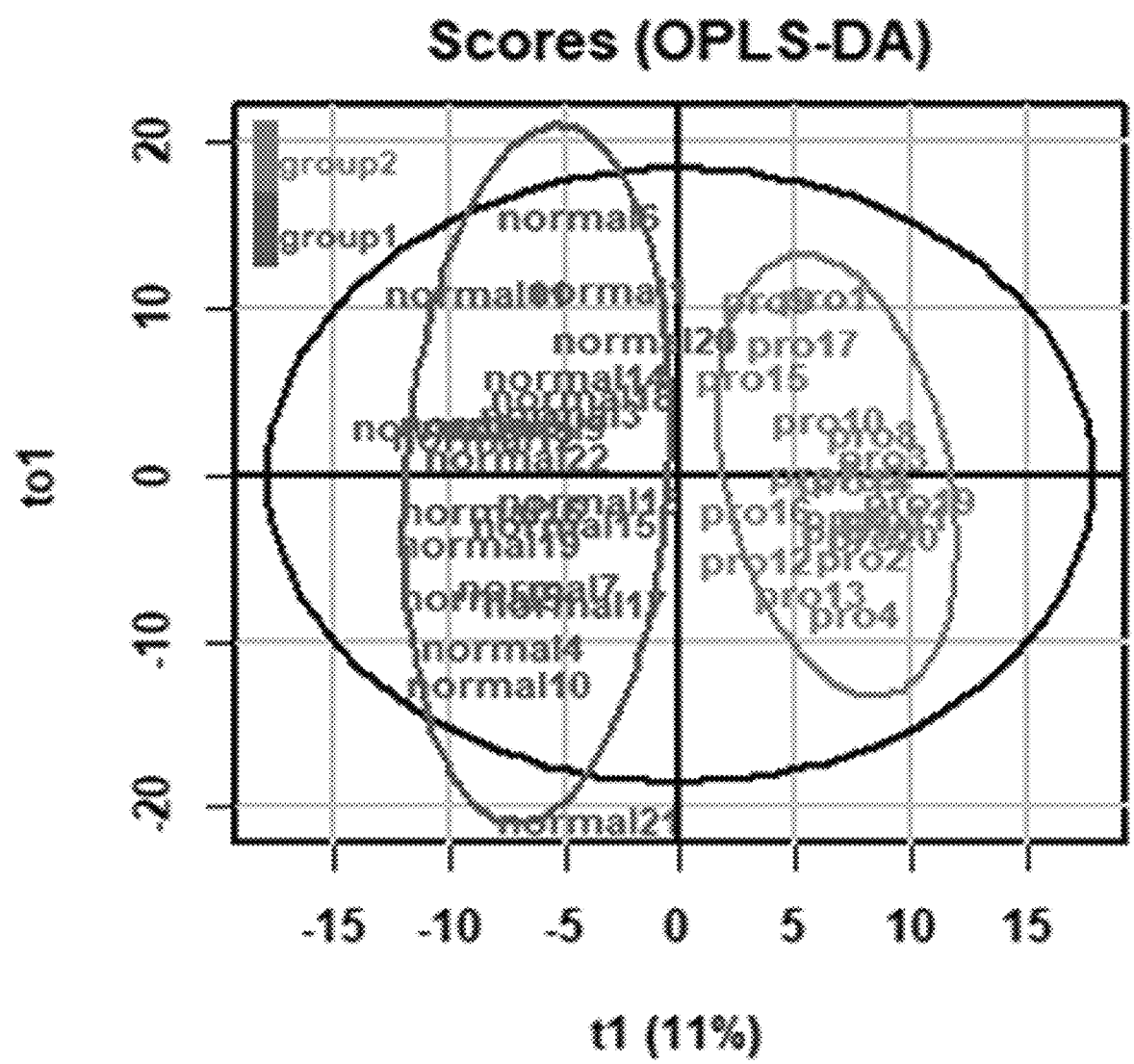
FIG. 8c shows results of orthogonal partial least squares discriminant analysis of surface-enhanced Raman spectra in a normal group and a prostate cancer patient group according to an embodiment of the present disclosure.

FIG. 8c shows results of clustering a normal group and a group of prostate cancer patients, with $R^2Y=0.898$ and $Q^2Y=0.793$. The results indicated 90.9% for sensitivity, 90% for specificity, and 90.4% for accuracy.

TABLE 3

| Predict | Reference | |
|---|---|---|
|  | Control | Cancer |
| Control | 20 | 2 |
| Cancer | 2 | 18 |

Figure 8D:
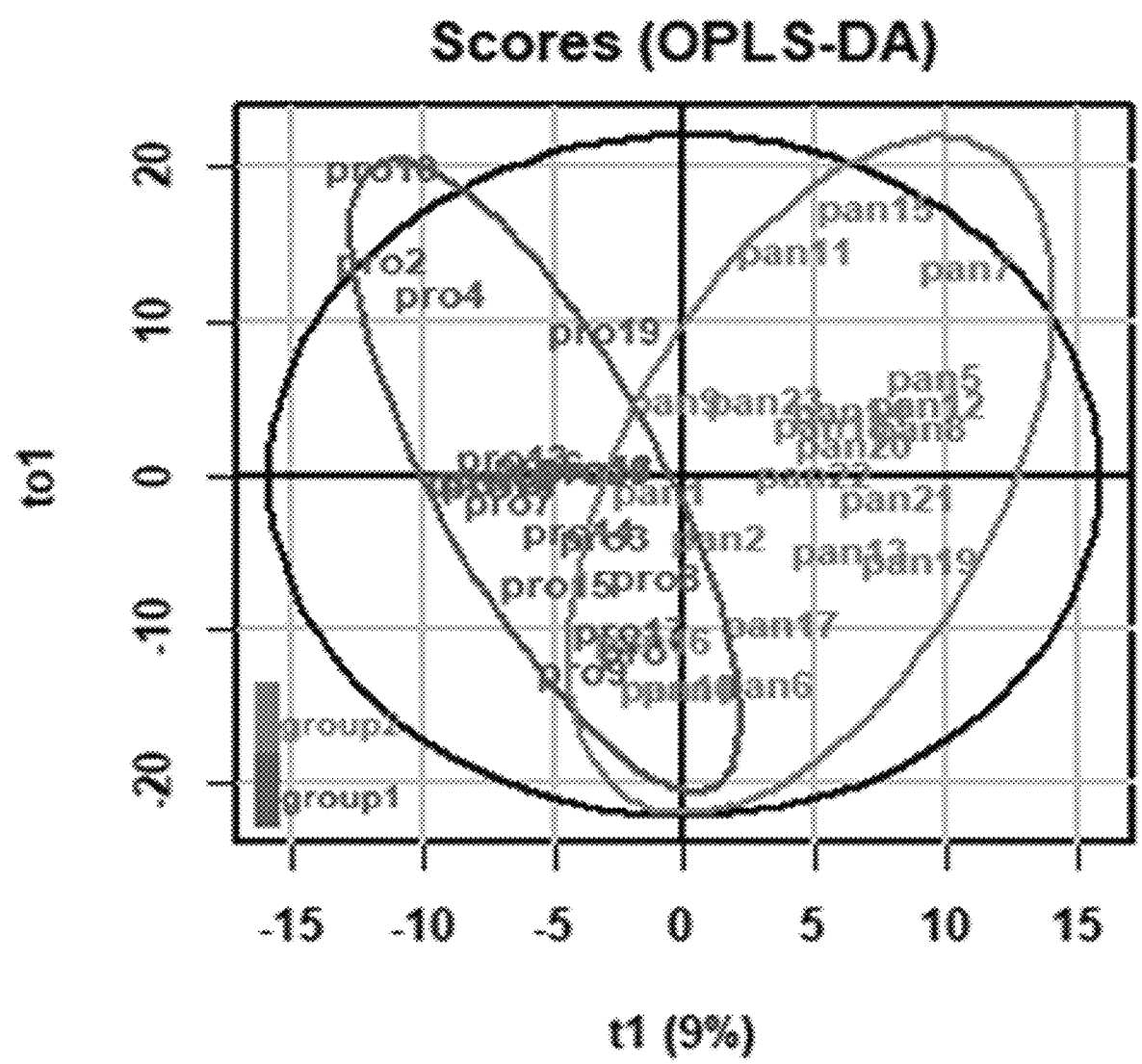
FIG. 8d shows results of orthogonal partial least squares discriminant analysis of surface-enhanced Raman spectra in a pancreatic cancer patient group and a prostate cancer patient group according to an embodiment of the present disclosure.

FIG. 8d shows results of clustering a group of pancreatic cancer patients and a group of prostate cancer patients, with $R^2Y=0.694$ and $Q^2Y=0.355$. The results indicated 75% for sensitivity, 88% for specificity, and 80.9% for accuracy.

TABLE 4

| Predict | Reference | |
|---|---|---|
|  | Control | Cancer |
| Control | 18 | 2 |
| Cancer | 6 | 16 |

Therefore, the SERS spectra of metabolites in urine can not only distinguish between normal people and cancer patients, but also between pancreatic cancer patients and prostate cancer patients.

EXAMPLE 6

SERS-Based Analysis of Metabolites in Urine—Methanol Pretreatment

Ten microliters of a methanol-pretreated urine sample supernatant were loaded on the surface-carbonized AgNW-GFF substrate and dried overnight at room temperature (24° C.). A sufficient SERS signal was obtained even with a very small amount of a urine sample. SERS spectra of urine samples were obtained using a portable Raman spectrometer NS220-Raman spectroscopy (Nanoscope Systems, Daejeon, Korea) which had a laser wavelength of 633±1 nm, with a maximum output power of 40 mW. In this experiment, the condition was set to be two for the average number and 3000 msec for the integration time.

6-1. Tyrosine Assay

In order to compare SERS signals according to the carbonization of the substrate, tyrosine, which is relatively low in polarity, was evaluated before urine measurement. DMSO (dimethyl sulfoxide, Sigma-Aldrich, St. Louis, USA) and methanol were used as solvents to increase the solubility of tyrosine.

Figure 9A:
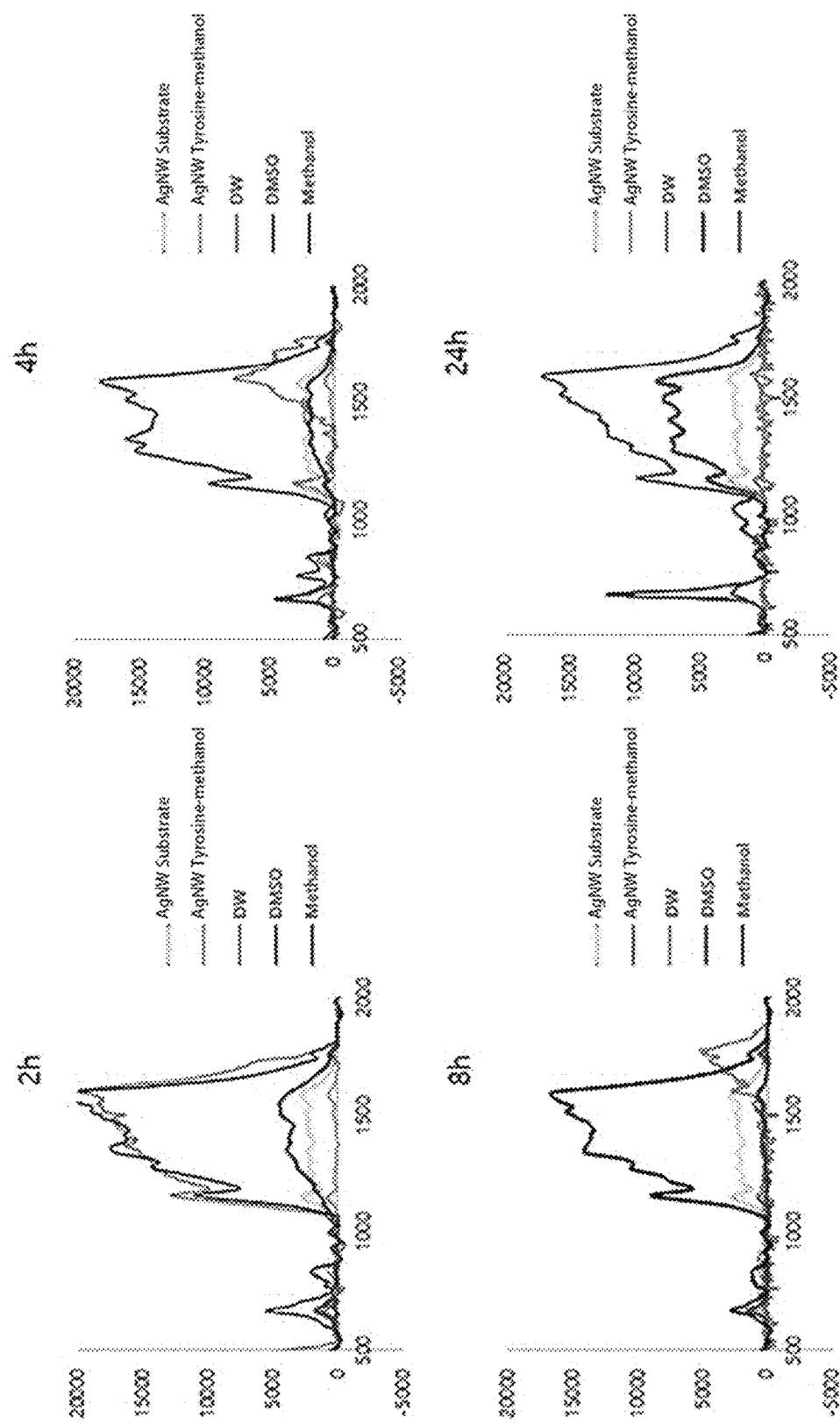
FIG. 9a shows SERS spectra of tyrosine carbonized at 250° C. over time according to an embodiment of the present disclosure.

As shown in FIG. 9a, in the case of tyrosine mixed with water, the SERS signal decreased as the degree of carbonization increased whereas when DMSO was added, the SERS signal increased as the degree of carbonization increased. Upon addition of methanol, the SERS signal was increased in all substrates regardless of the degree of carbonization. On the other hand, the SERS signal of tyrosine was very low in the non-carbonized substrate (AgNW substrate) despite the addition of methanol.

6-2. Experiments for Initial Optimization

Figure 9B:
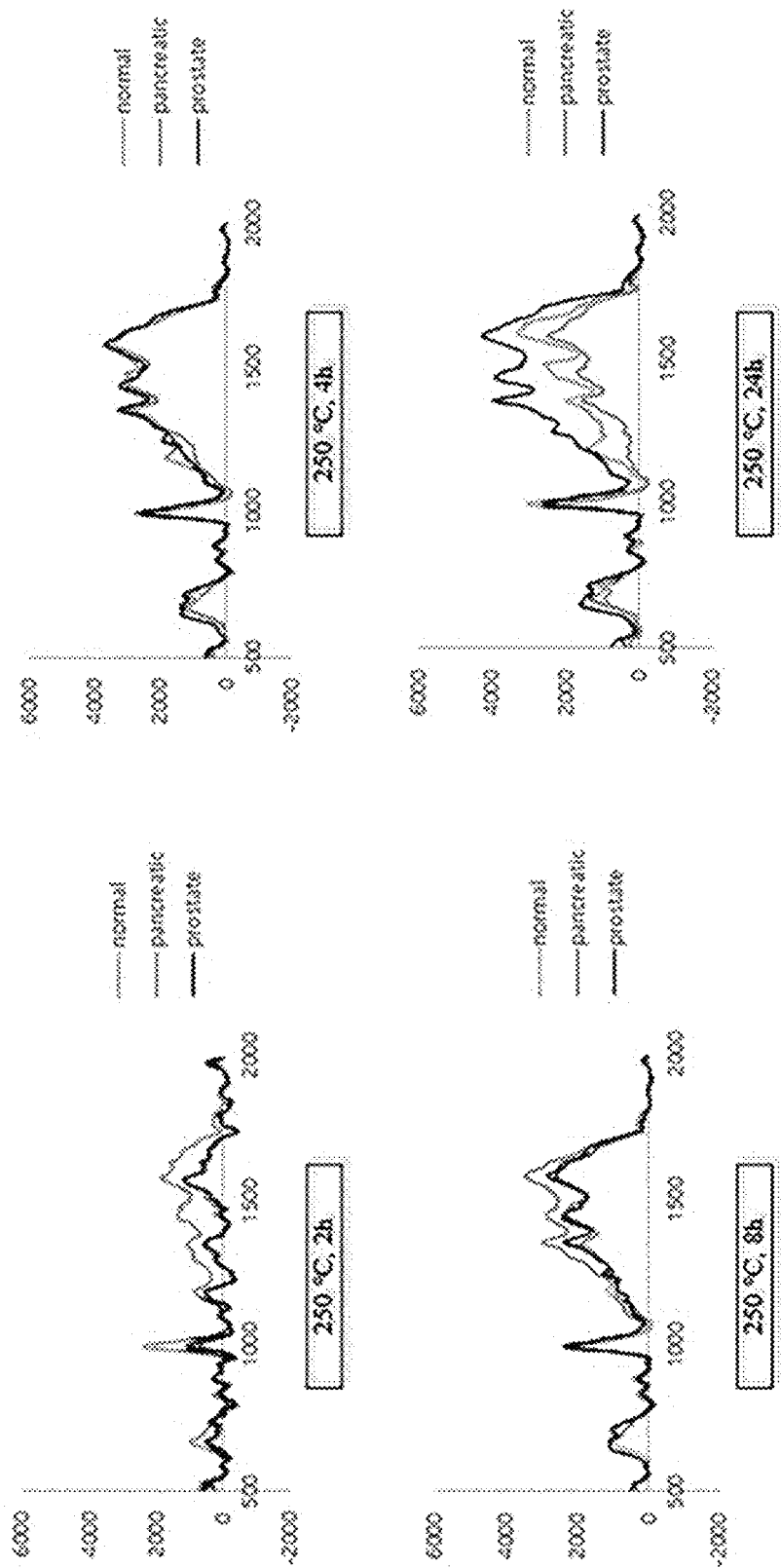
FIG. 9b shows SERS spectra measured for only urine loaded onto the substrates according to embodiment of the present disclosure.

Before an experiment for initial optimization was performed on all of the collected urine samples, five reference samples were randomly assigned to each group. First, comparison was made of SERS signals of urine according to the degree of carbonization. As can be seen in FIG. 9b, the urine SERS signal seemed to increase with the increase of the degree of carbonization, but the difference between the cancer and the control group was not evident.

Figure 9C:
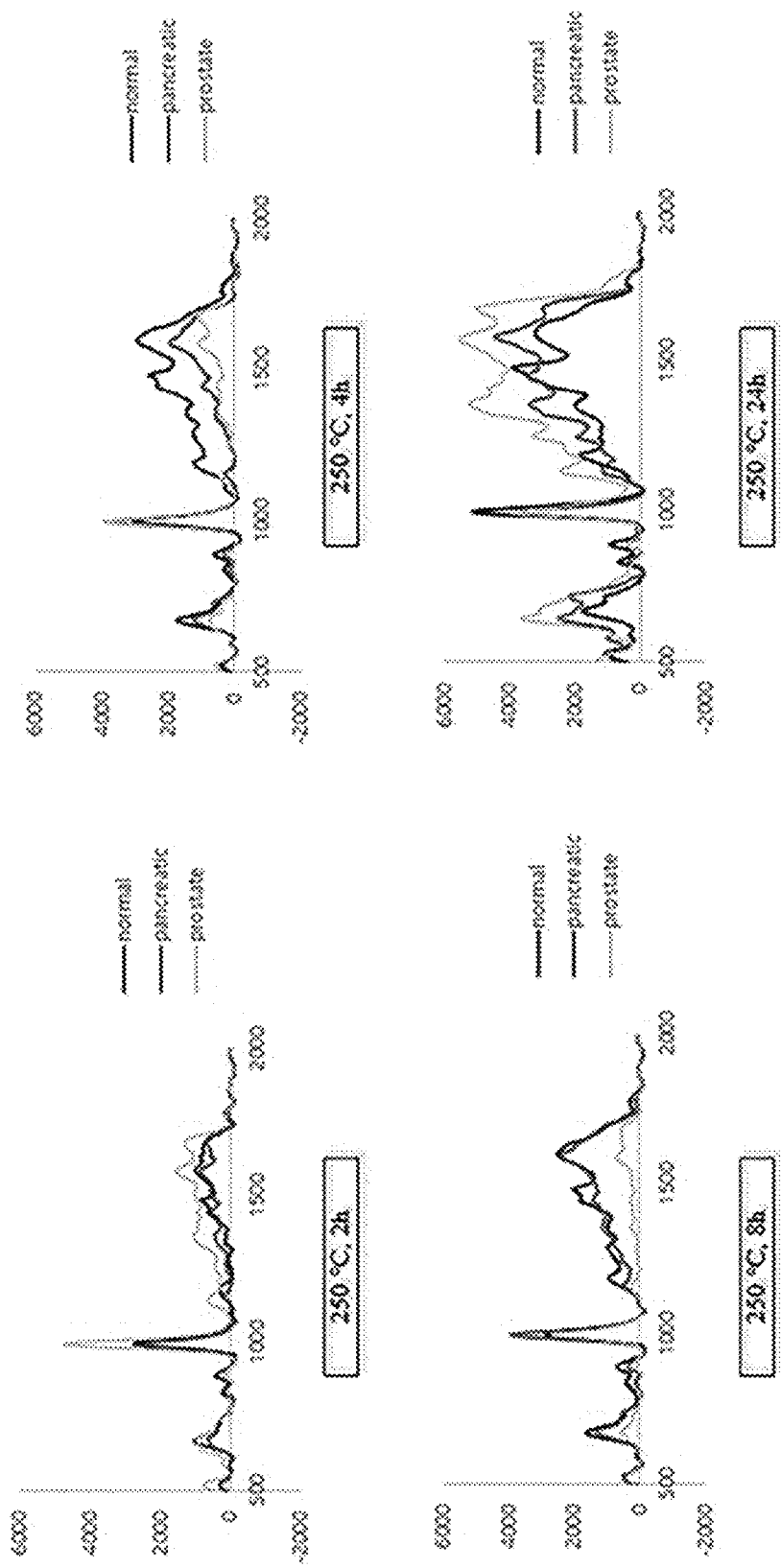
FIG. 9c shows SERS spectra measured for urine and methanol loaded onto the substrates according to embodiment of the present disclosure.

Then, SERS signals was measured by adding methanol to the urine in the same way. As can be seen in FIG. 9c, the SERS signals of urine also seemed to increase with the increase of the degree of carbonization. The peak patterns indicating the difference between the cancer and the control group were clearly visible. In particular, it was confirmed that the most distinct SERS signal was shown on the substrate that had been carbonized at 250° C. for 24 hours.

6-3. Measurement of All Urine Samples

Based on the above results, an experiment was performed on all urine samples. Average values of the measurements at two or three points per substrate were expressed as a graph.

Figure 9D:
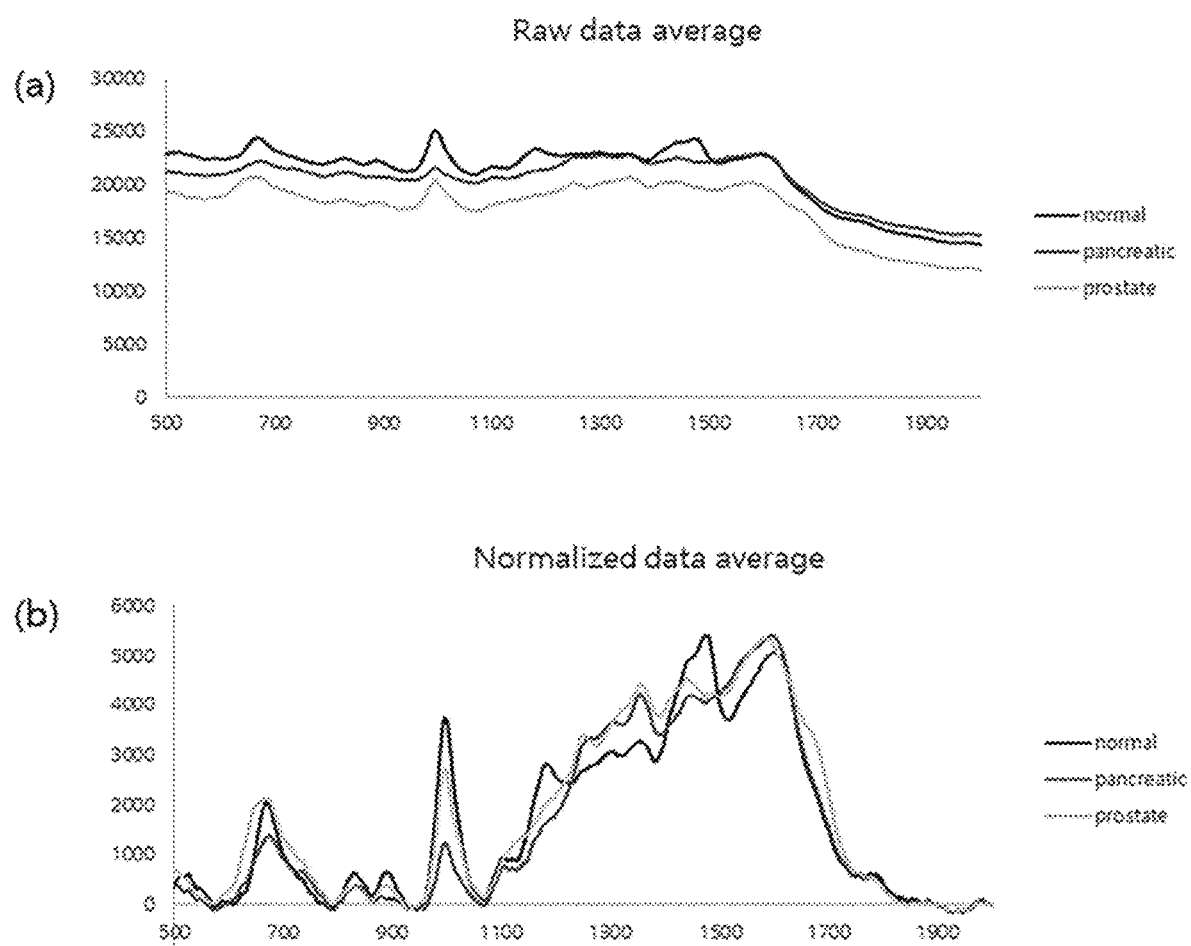
FIG. 9d shows comparison between raw data and normalized data according to an embodiment of the present disclosure.
Figure 10A:
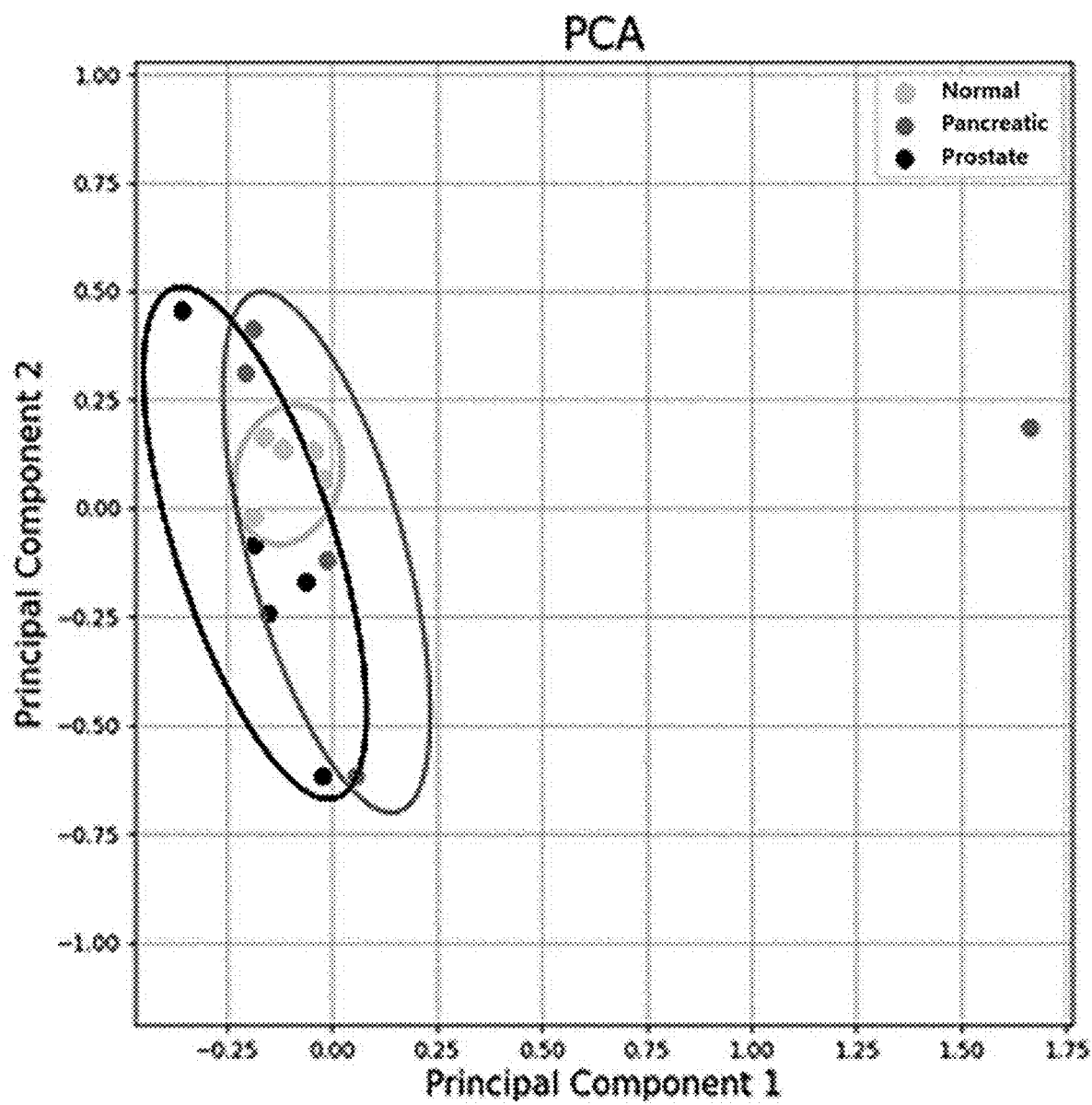
FIGS. 10a, 10b, 10c and 10d show results of principal component analysis for methanol-pretreated samples according to an embodiment of the present disclosure.
Figure 10B:
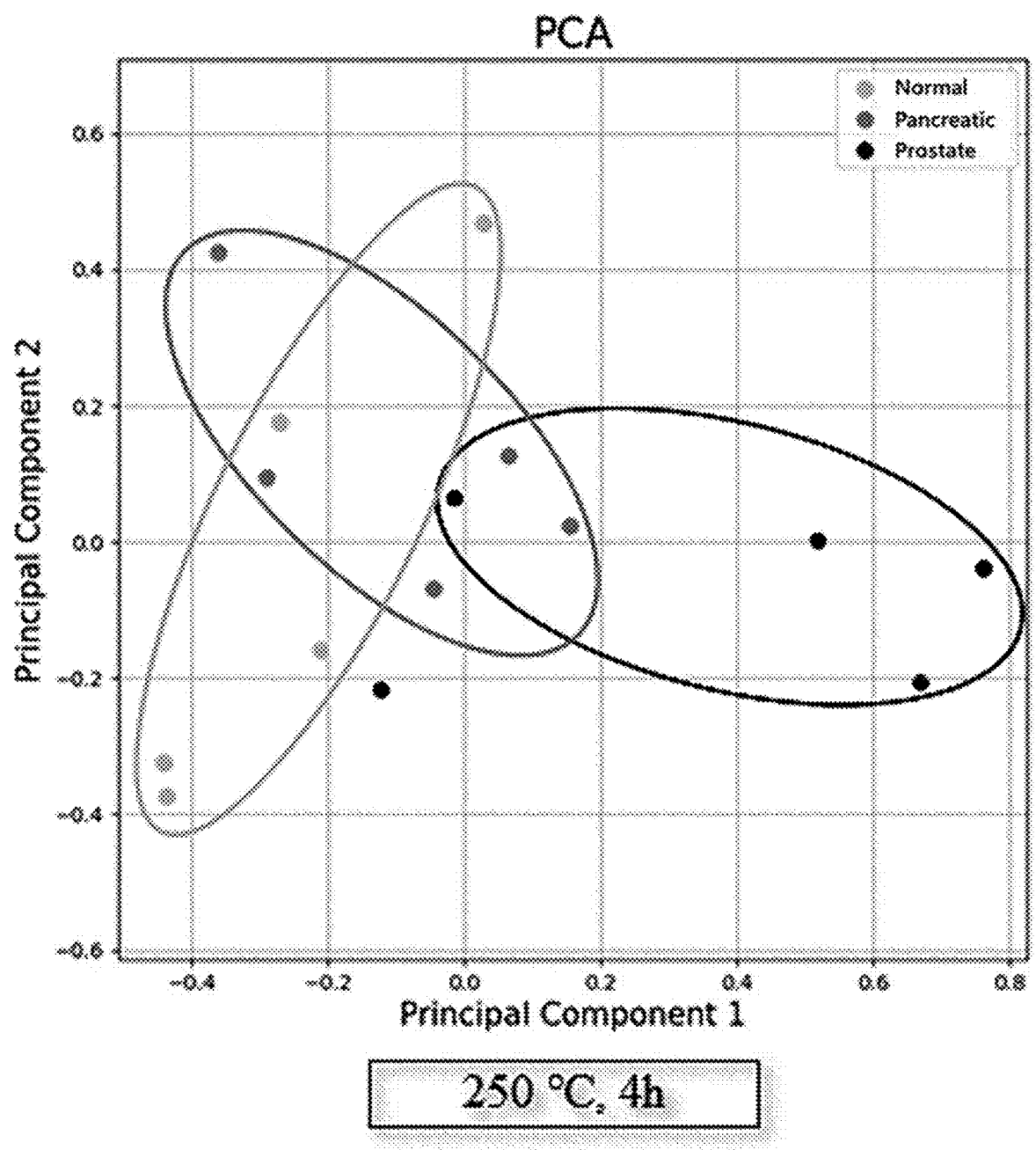
Figure 10C:
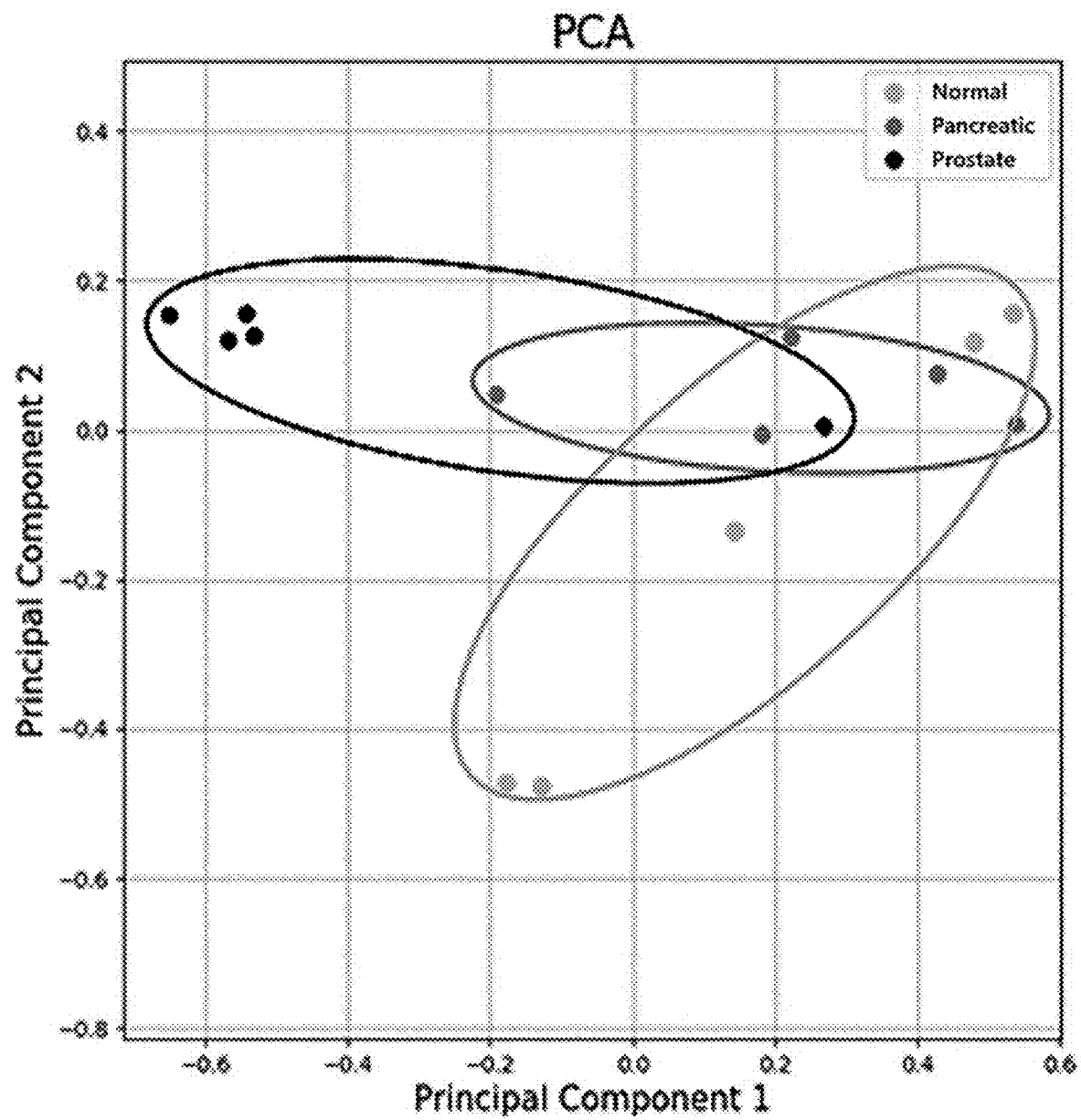
Figure 10D:
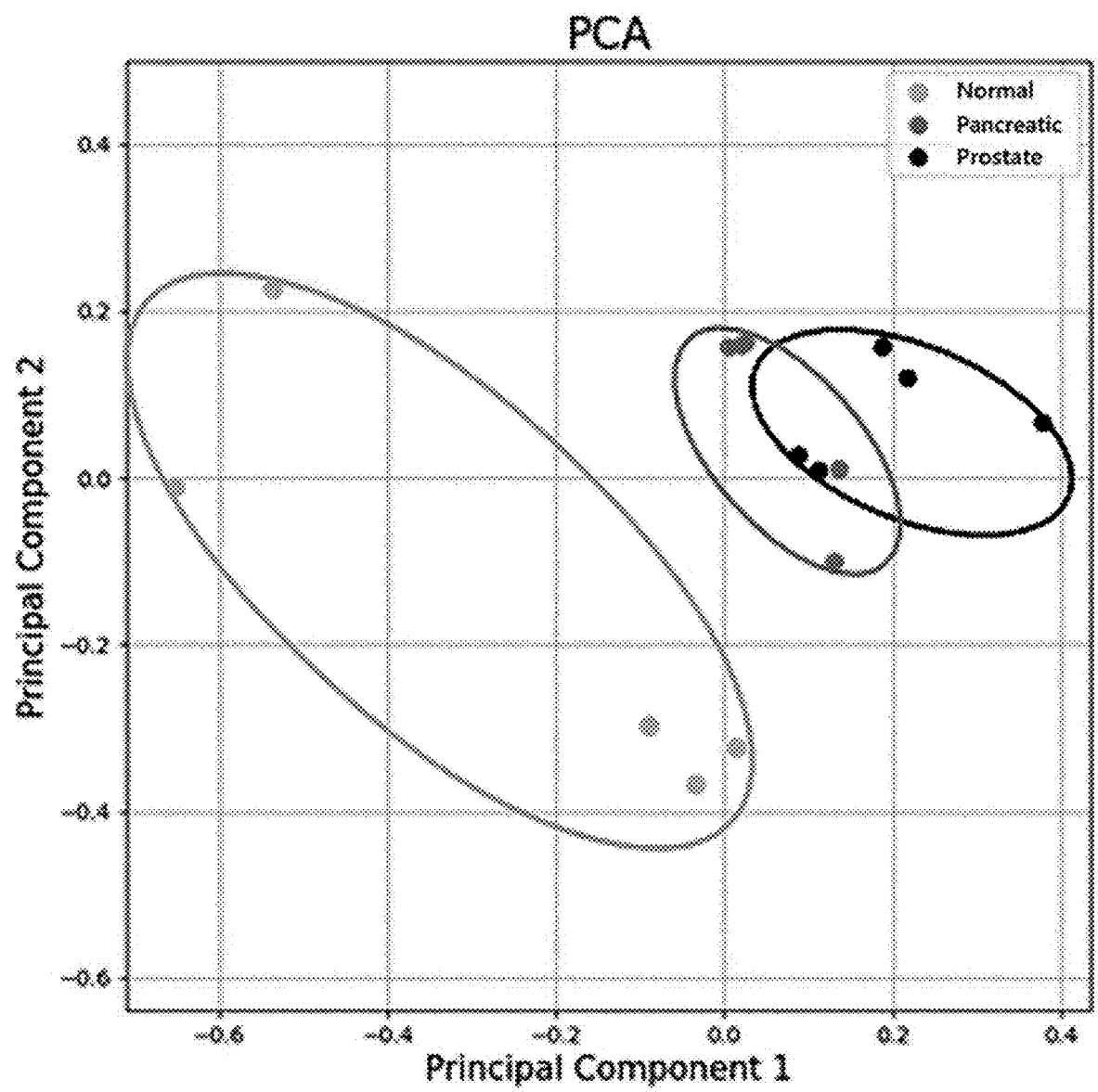
Figure 11A:
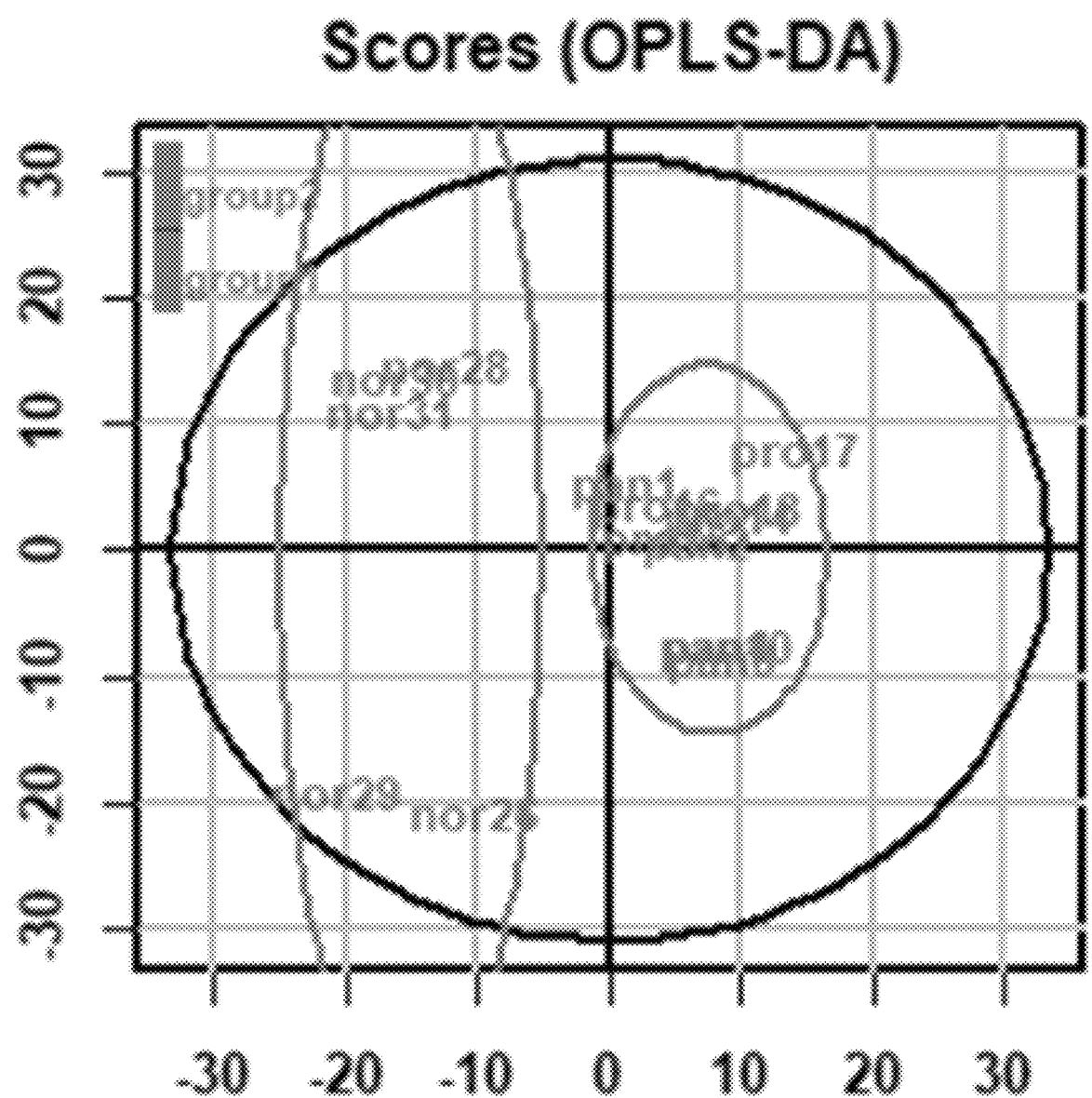
FIGS. 11a, 11b, 11c and 11d show plots of OPLS-DA results for reference samples among methanol-pretreated samples according to an embodiment of the present disclosure.
Figure 11B:
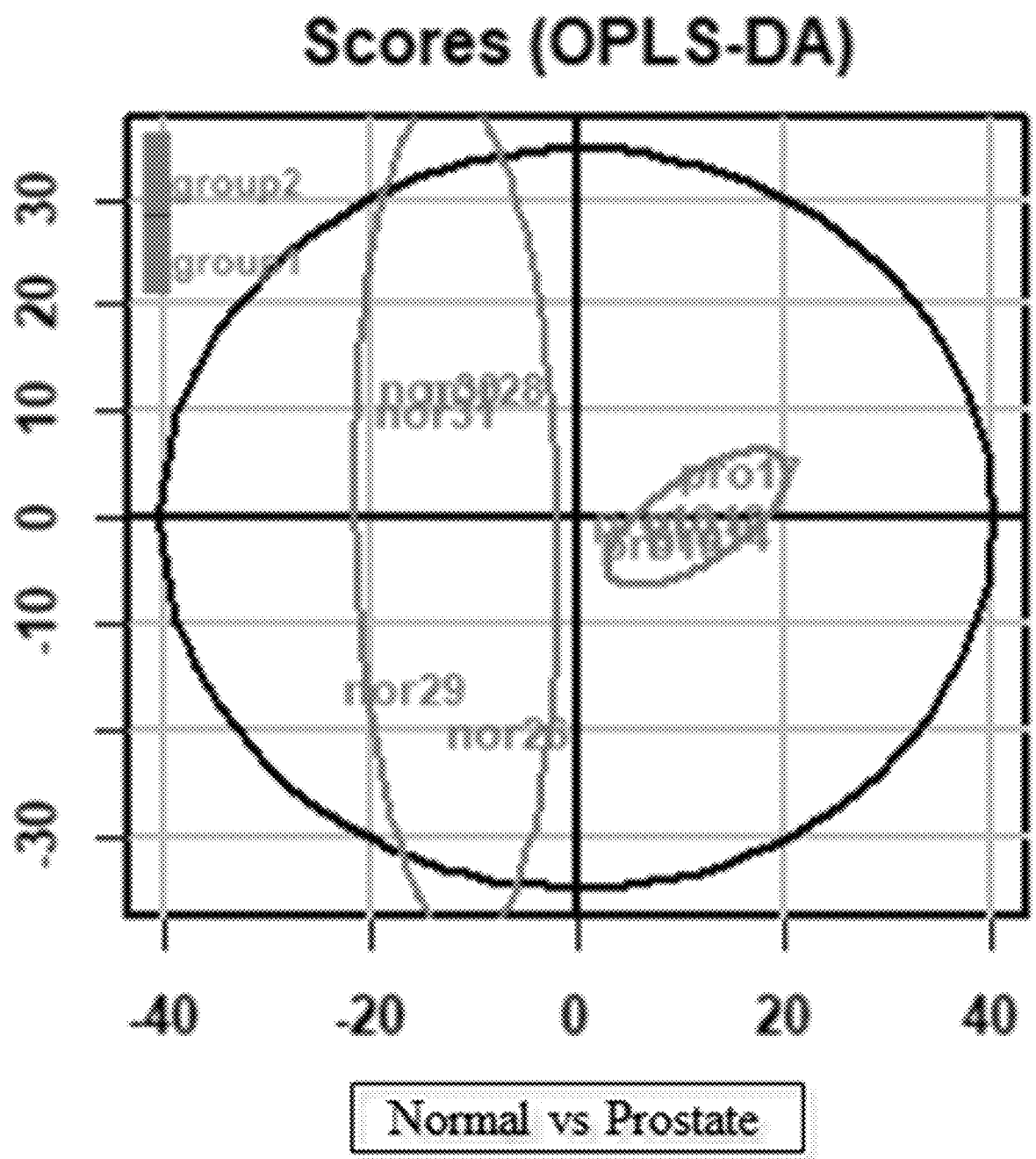
Figure 11C:
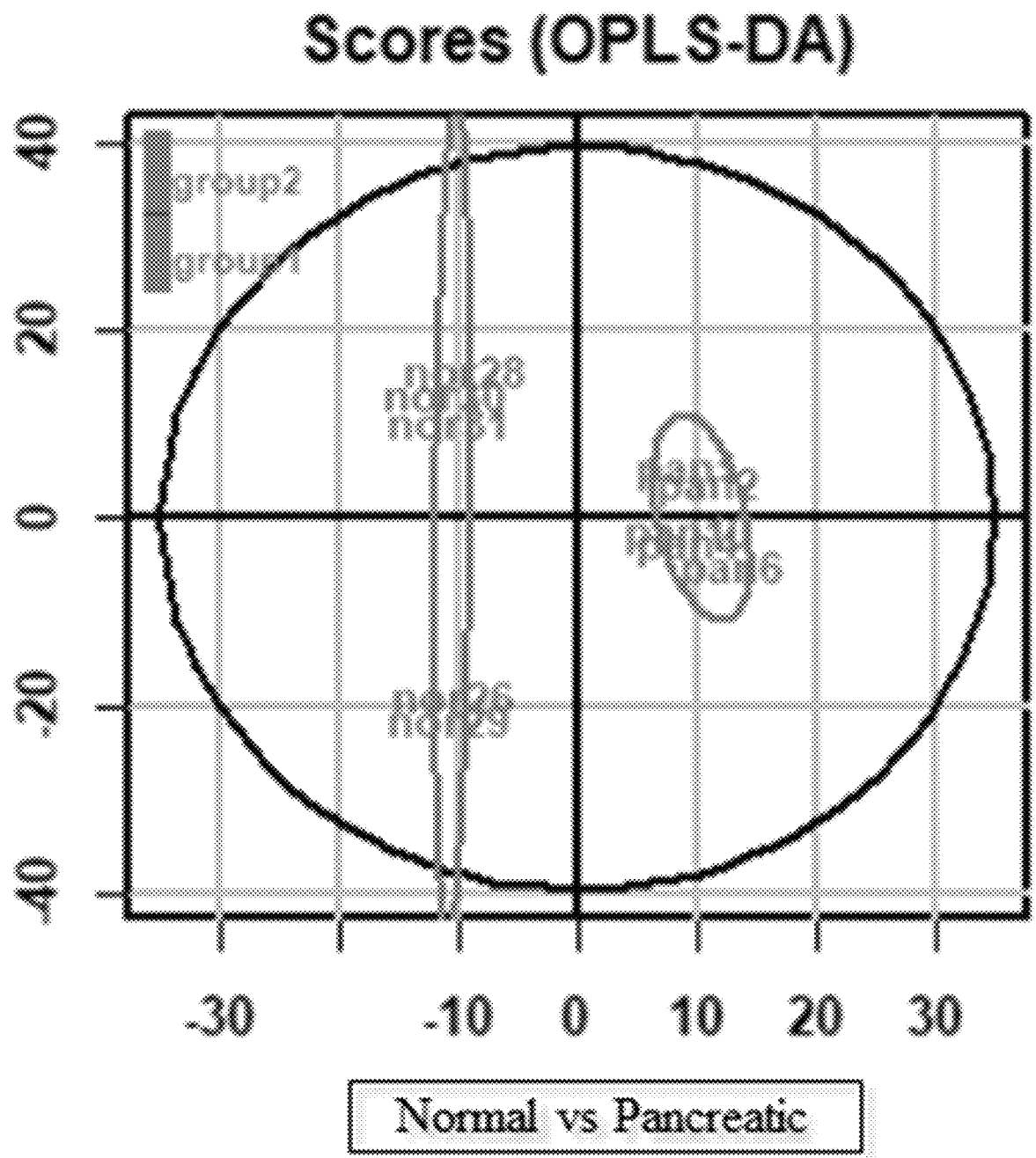
Figure 11D:
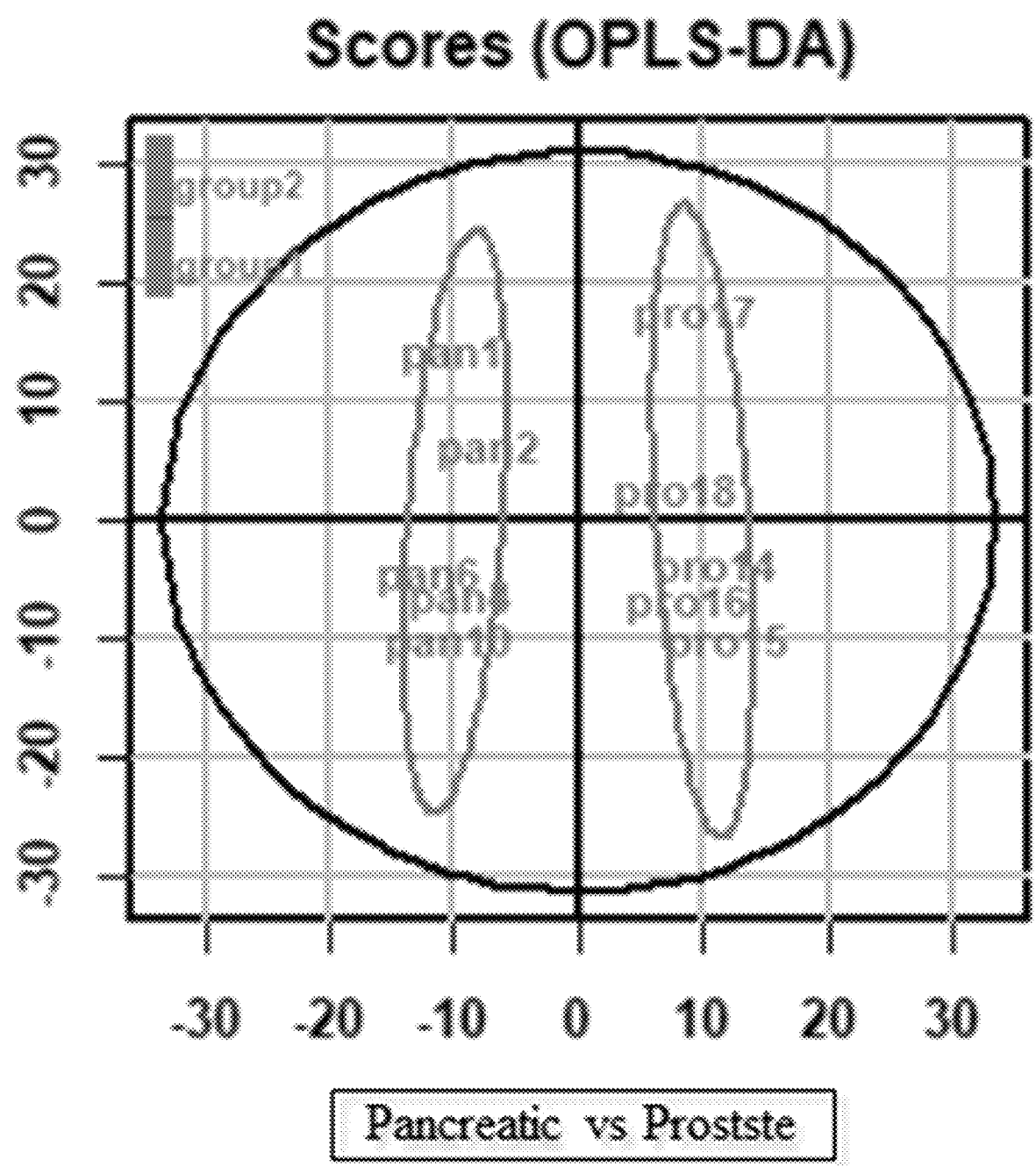

FIG. 9d (a) shows plots of raw data before removal of the baseline. For removal of substance-intrinsic fluorescent signals and preservation of SERS peaks, background signals were subjected to baseline correction using NS Raman ID software based on asymmetric least square estimation. The results are depicted in FIG. 9d(b). The graph waveform appeared clearly compared to the raw data. In addition, a wavelength band of 502-1998 cm-1 was set in order to remove unnecessary signals for spectrum analysis and to check the entire spectrum.

EXAMPLE 7

Application of Multivariate Analysis—Methanol Pretreatment 7-1. Principal Component Analysis (PCA)

PCA is also fundamental to multivariate analysis in other fields, and is very useful for finding specific patterns between data or deriving exceptional data (outliers). Singular value decomposition (SVD) is used to find singular vectors and singular values by rotating the matrix representing the data space in a direction that maximizes the difference between individual observation groups. The resulting principal component reflects the differences between groups in the data already known. Principal component analysis was performed over time at 250° C. for more accurate spectral analysis of 5 reference samples in each group before being performed on all of the collected urine samples.

As is understood from the data of FIG. 10, PCA results, like the SERS spectrum, show that pancreatic cancer and prostate cancer were best separated by each group on the substrate carbonized at 250° C. for 24 hours although there is an overlap.

7-2. Orthogonal Partial Least Squares Discriminant Analysis, Sensitivity, Specificity, and Accuracy In general, metabolomics studies also use pattern analysis by PCA for known samples and regression multivariate analysis that can discriminate unknown samples. OPLS-DA, which has recently been reported, is one of the regression analysis methods that correlates spectroscopic data with a specific property of the data, that is, which group it belongs to. The main purpose of this method is to easily find out the observed values and the associated variance between different groups by rotating the data matrix so that the differences between groups appear in the first singular vector. Therefore, it can reflect the differences between groups more appropriately and accurately than PLS-DA, a regression analysis method that has been used so far.

FIG. 11 demonstrates that distinctively clear discrimination was made between a normal control and a cancer group, between a normal group and a group of pancreatic cancer patient, between a normal control and a group of prostate cancer patients, and between groups of pancreatic and prostate cancer patients as analyzed by OPLS-DA on the 250° C./24 hour carbonized substrate which also allowed for best group discrimination by SERS spectra and PCA. Based on this, the experiment of this study was carried out on the 250° C./24 hour carbonized AgNW-GFF substrate for all the collected samples.

EXAMPLE 8

Result Data Analysis 8-1. SERS Spectral Analysis

To analyze SERS signals other than the background signal, use the NSRamanID software using the asymmetric least squares method provided by the Raman instrument. baseline correction of each SERS spectrum was performed by the NS Raman ID software using asymmetric least squares provided by the Raman spectrometer. The baseline-corrected SERS spectra were averaged for each group, and the results are shown in Table 5 and FIGS. 12a and 12b.

TABLE 5

| Model | R2Y | Q2 | RMSEE |
|---|---|---|---|
| Normal controls vs. Cancers | 0.547 | 0.482 | 0.312 |
| Normal controls vs. Pancreatic Cancer | 0.629 | 0.518 | 0.311 |
| Normal controls vs. Prostate Cancer | 0.574 | 0.485 | 0.332 |
| Pancreatic Cancer vs. Prostate Cancer | 0.624 | 0.559 | 0.313 |

Figure 12A:
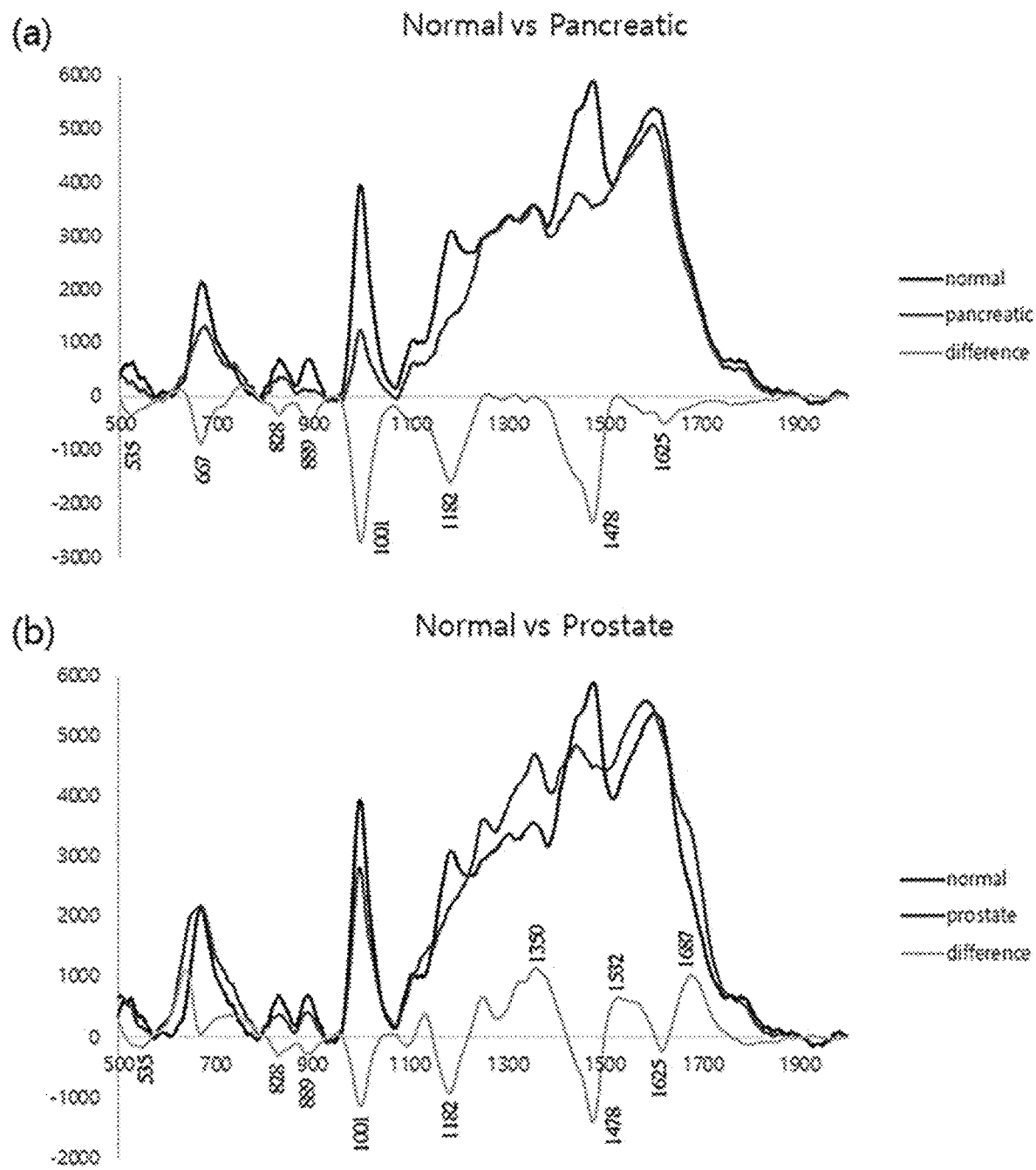
FIGS. 12a and 12b show differential spectra of methanol-pretreatred samples between SERS group according to an embodiment of the present disclosure.
Figure 12B:
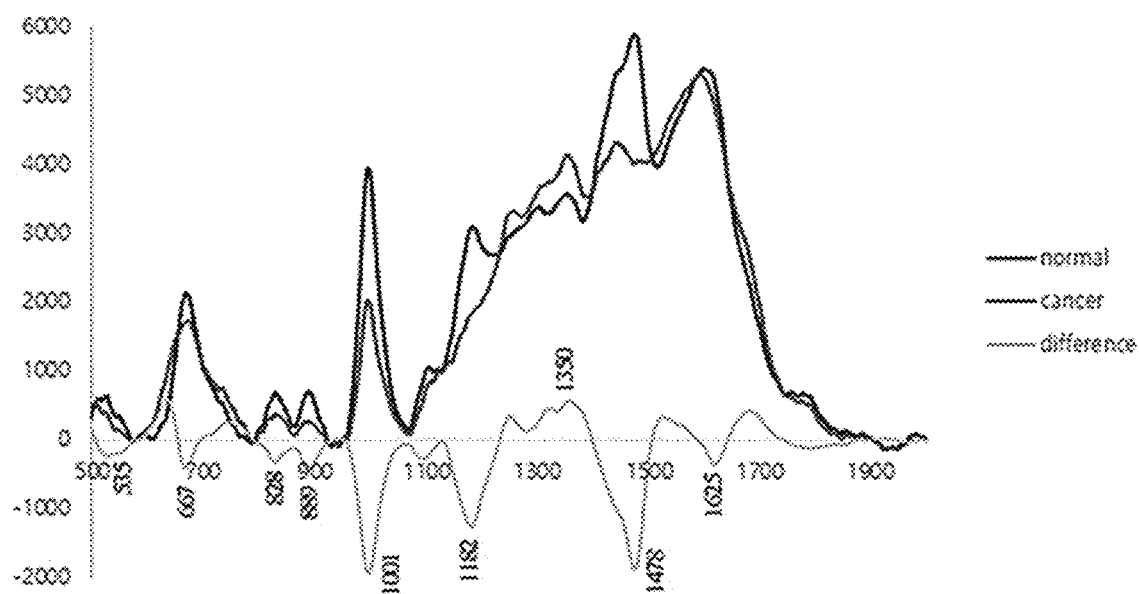
Figure 12B:
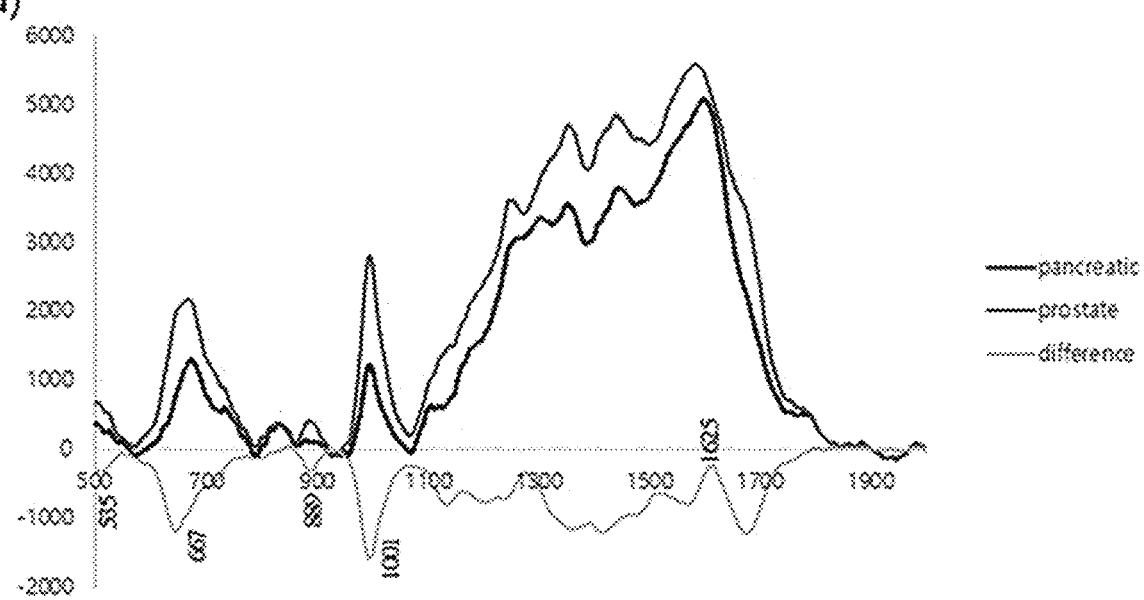

As can be seen in Table 5 and FIGS. 12a and 12b, the mean values of all of the collected samples for each group accounted for spectral differences among the normal control (Normal), the pancreatic cancer patient group (Pancreatic), and the prostate cancer patient group (Prostate). From these results, it was confirmed that the cancer patient group showed a different SERS spectrum pattern than the normal control group. However, since there were many overlapping distributions, it was difficult to find a cut-off value that could clearly distinguish the three groups.

9-2. PCA Result

In principal component analysis (PCA), 428 variables for the spectra measured from surface-enhanced Raman scattering (SERS) were selected within 502-1998 cm-1, with unnecessary wavelength bands removed. PCA was performed on these variables using the built-in functions of the R program. For visualization of each variable and data, it was expressed in two dimensions using the first principal component (PC1) and the second principal component (PC2). Grouping was performed based on the PCA score plot for each group and classification was made between the normal control group and the cancer patient group, between the normal control group and the pancreatic cancer patient group, between the normal control group and the prostate cancer patient group (Prostate cancer).

Figure 13A:
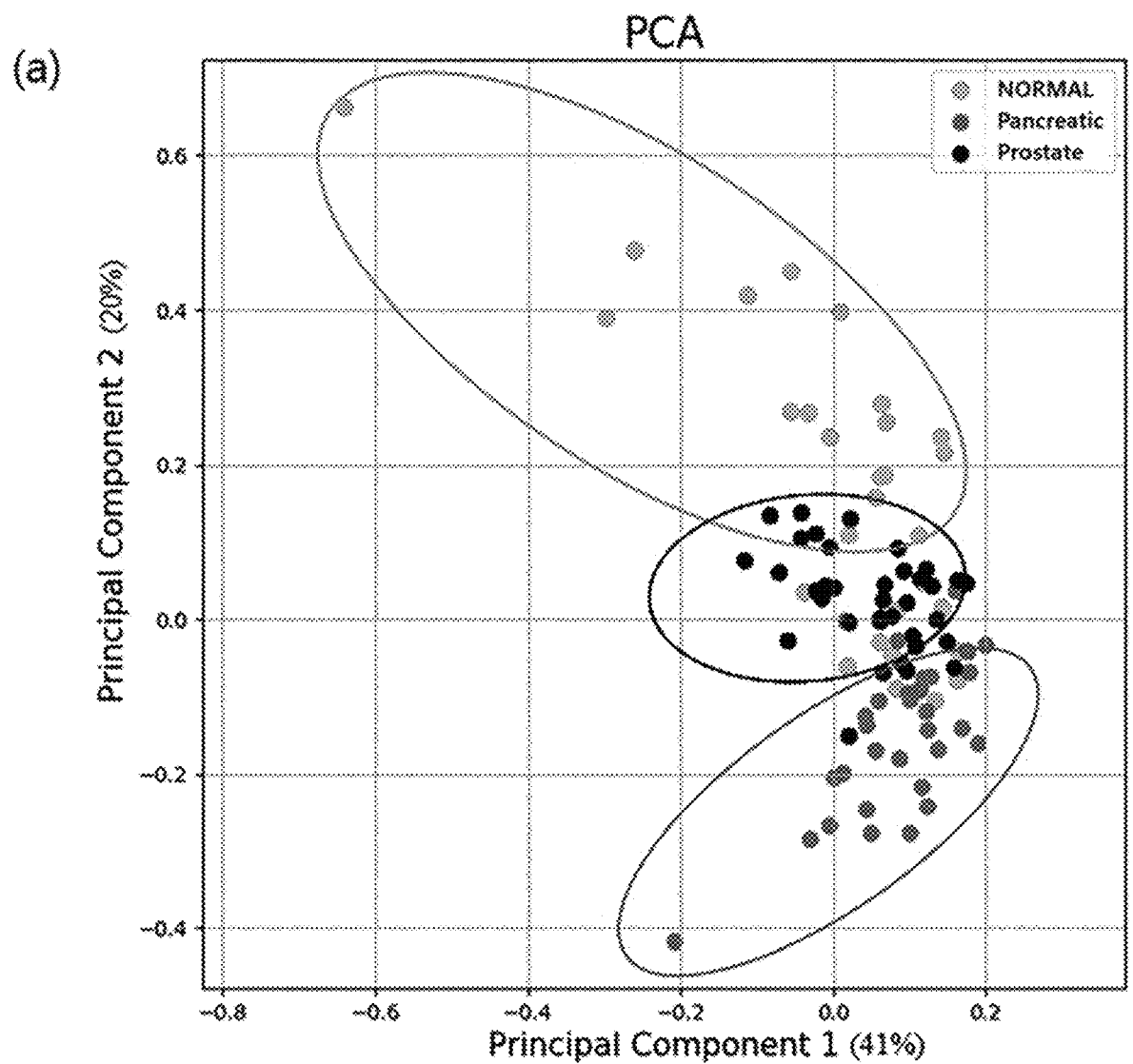
FIGS. 13a, 13b, 13c and 13d shows results of principal component analysis for surface-enhanced Raman spectra of methanol-pretreated samples according to an embodiment of the present disclosure.

As can be seen in FIG. 13a, the prostate cancer patient group was close to the normal control group, and the three groups were clustered and well distinguished although there were several prostate cancer samples in the pancreatic cancer patient group. The PCA results of the three groups showed that 61% of the covariance among all variables could be explained by PC1 and PC2. PC1 accounted for 41% of the total components, and PC2 accounted for 20% of the remaining components.

Figure 13B:
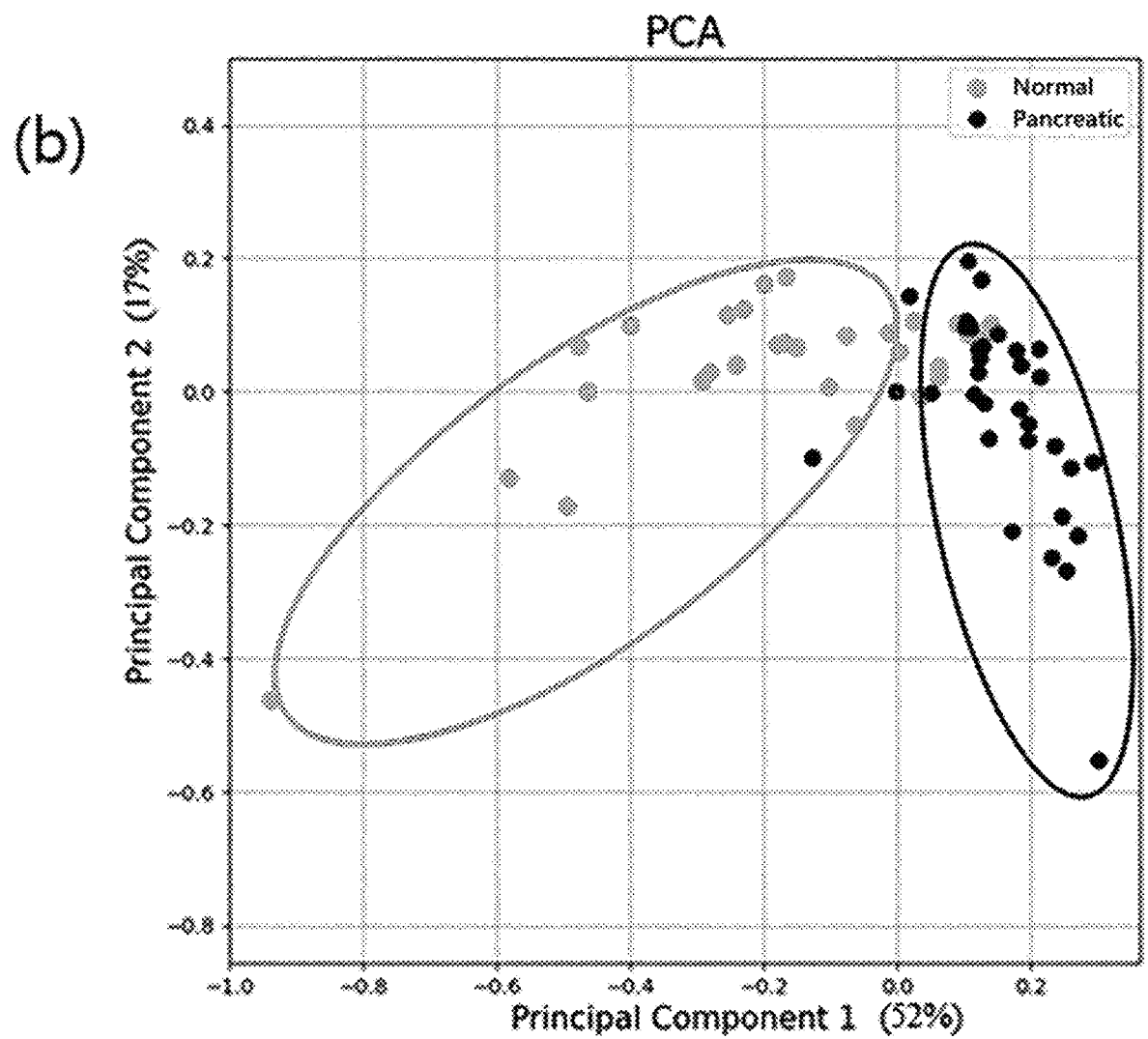

As can be seen in FIG. 13b, PCA was additionally performed for more accurate comparison between the two groups. The normal control group and the pancreatic cancer patient group were clearly distinguished without overlapping, and PC1 seems to reasonably differentiate the normal control group and the pancreatic cancer patient group. The results showed that 69% of the covariance among all variables could be explained by PC1 and PC2, with PC1 accounting for 52% of the total of the component and PC2 accounting for 17% of the remaining components.

Figure 13C:
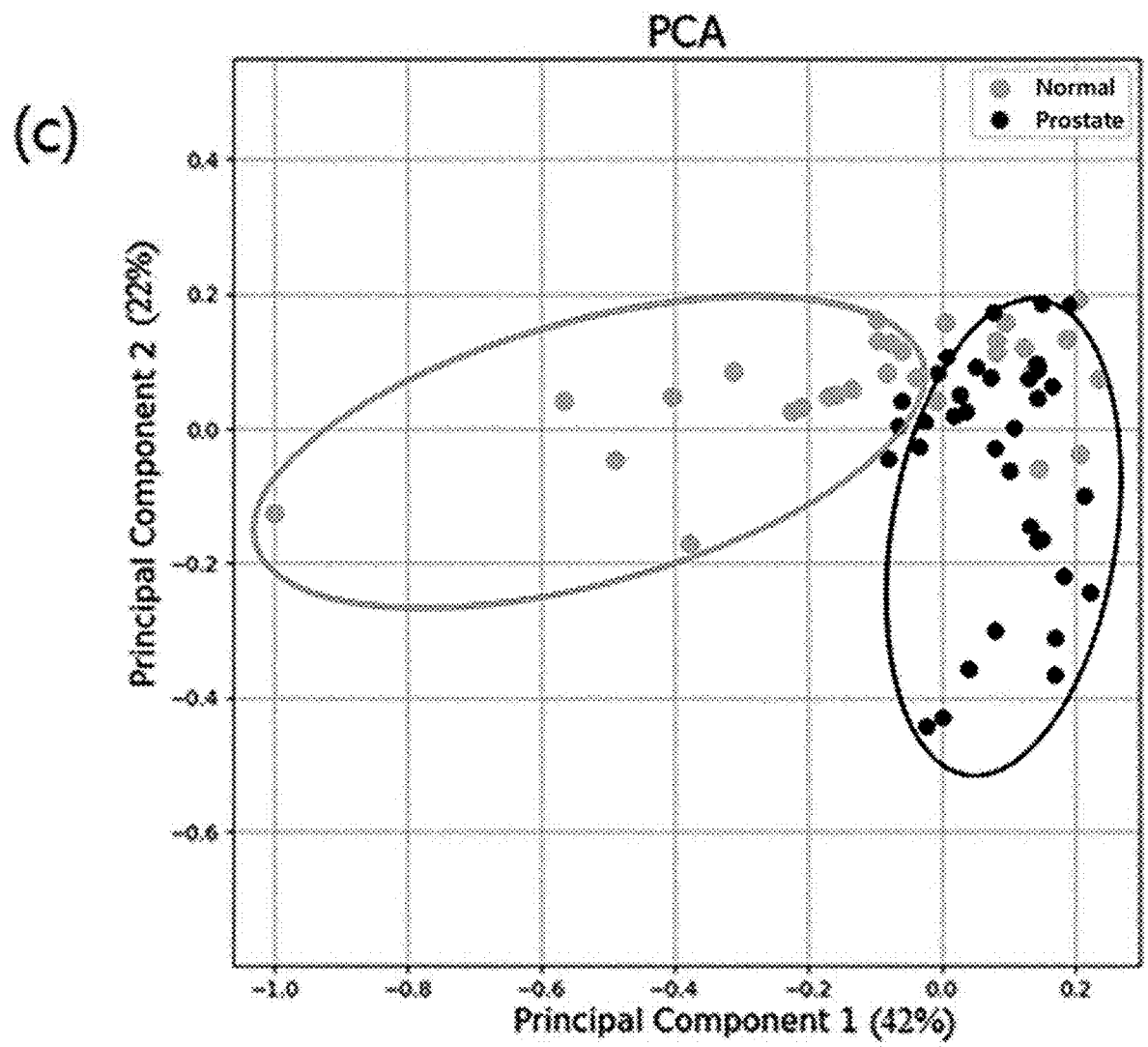

For the normal control group and the prostate cancer patient group, as can be seen in FIG. 13c, the prostate cancer patient group partially overlapped with the normal control group, but were, for the most part, reasonably classified. The results showed that 64% of the covariance among all variables could be explained by PC1 and PC2, with PC1 accounting for 42% of the total of the component and PC2 accounting for 22% of the remaining components.

Figure 13D:
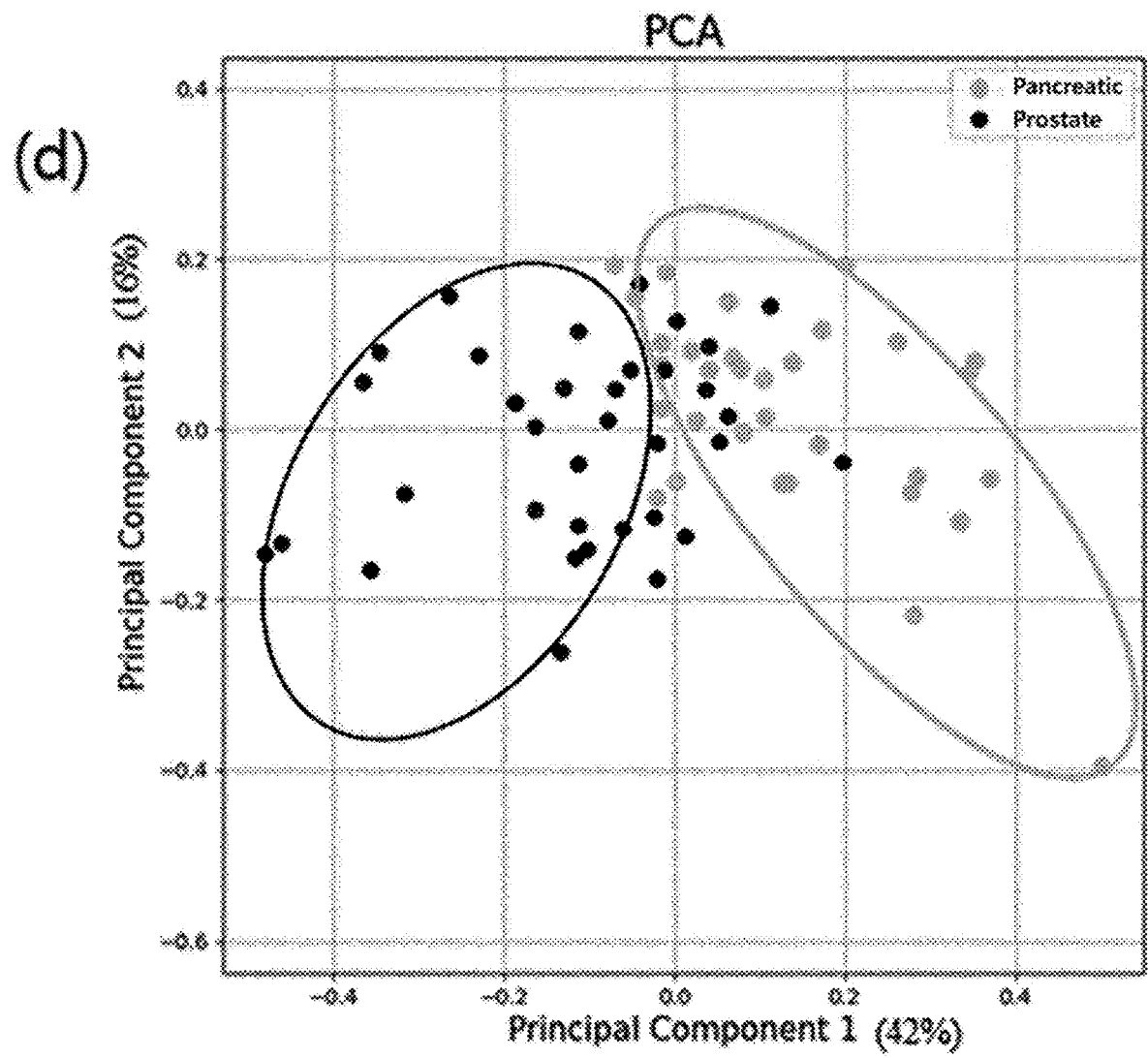

Finally, the patient groups of pancreatic cancer and prostate cancer were compared, and the results are depicted in FIG. 13d. Most of the pancreatic cancer area and prostate cancer area were clearly visible, but there were several overlapping samples. Although being lower than the classification of other groups, the results showed that the cancer types could be classified as a whole. The results showed that 58% of the covariance among all variables could be explained by PC1 and PC2, with PC1 accounting for 42% of the total of the component and PC2 accounting for 16% of the remaining components.

Next, the cumulative variance value was investigated according to the number of PCs. This curve represents the amount of multidimensional variance contained in the first n components. For instance, use of digits requires that the first two components contain a variance of about 0.6, while the cumulative proportion of the variance described must be at least 0.8. As a result of accumulating 10 components, it was found that the value was about 0.9 or more. To capture more than 0.8 of the original data variability, there was a need of the first 9 PC axes for the comparison of the three groups and the first 8 PC axes for the comparison of each group pair. As the number of the main axis PC increased, the cumulative variance value was found to approach 0.9 or higher. The sum of the values of PC1 and PC2 axes set in this experiment was more than 0.6, indicating a significant value. Plotting high-dimensional data sets can help understand the level of redundancy present in multiple observations.

Figure 14A:
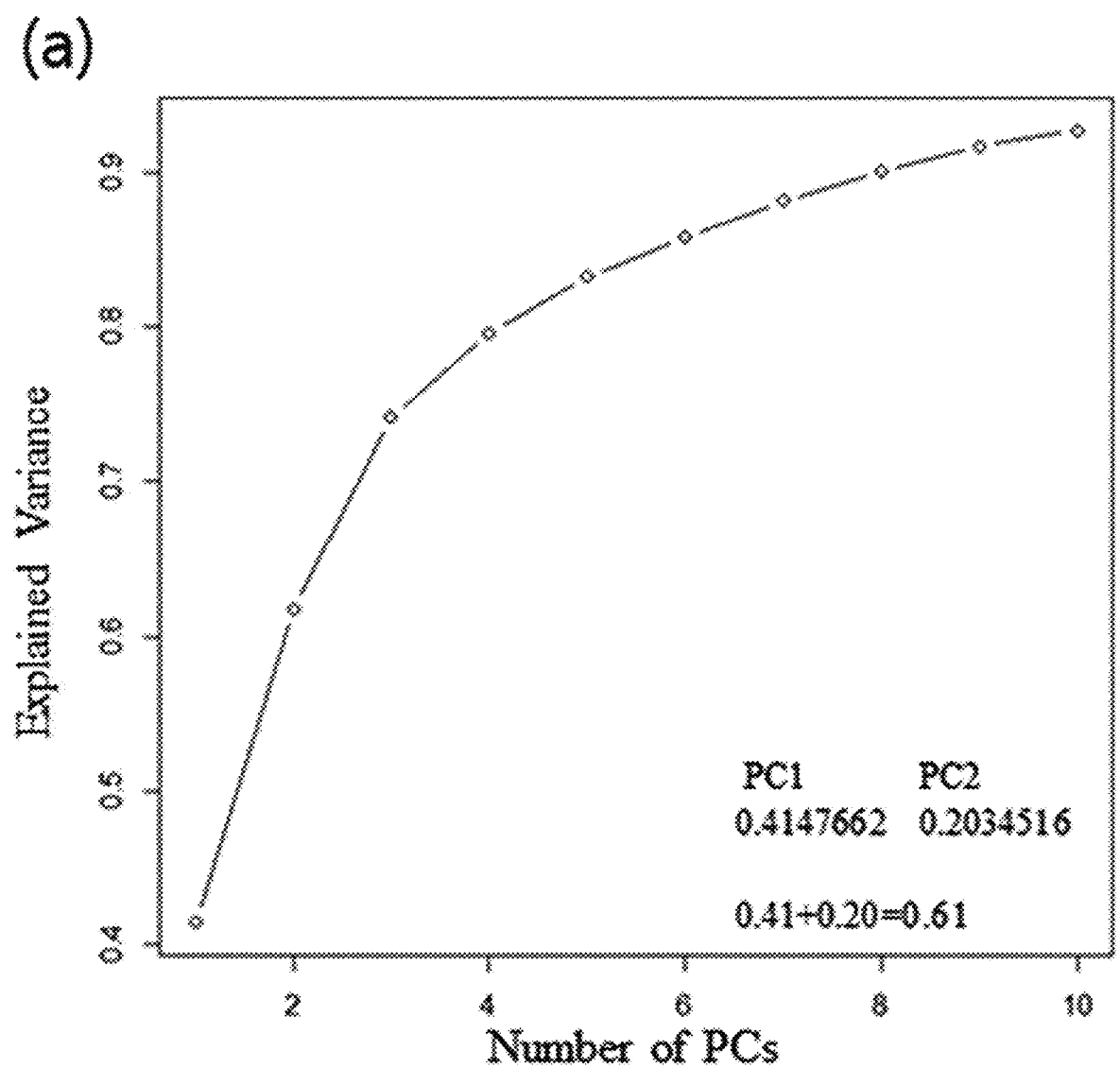
FIGS. 14a, 14b, 14c and 14d plots of cumulative variances of methanol-pretreated samples against numbers of PCs according to an embodiment of the present disclosure.
Figure 14B:
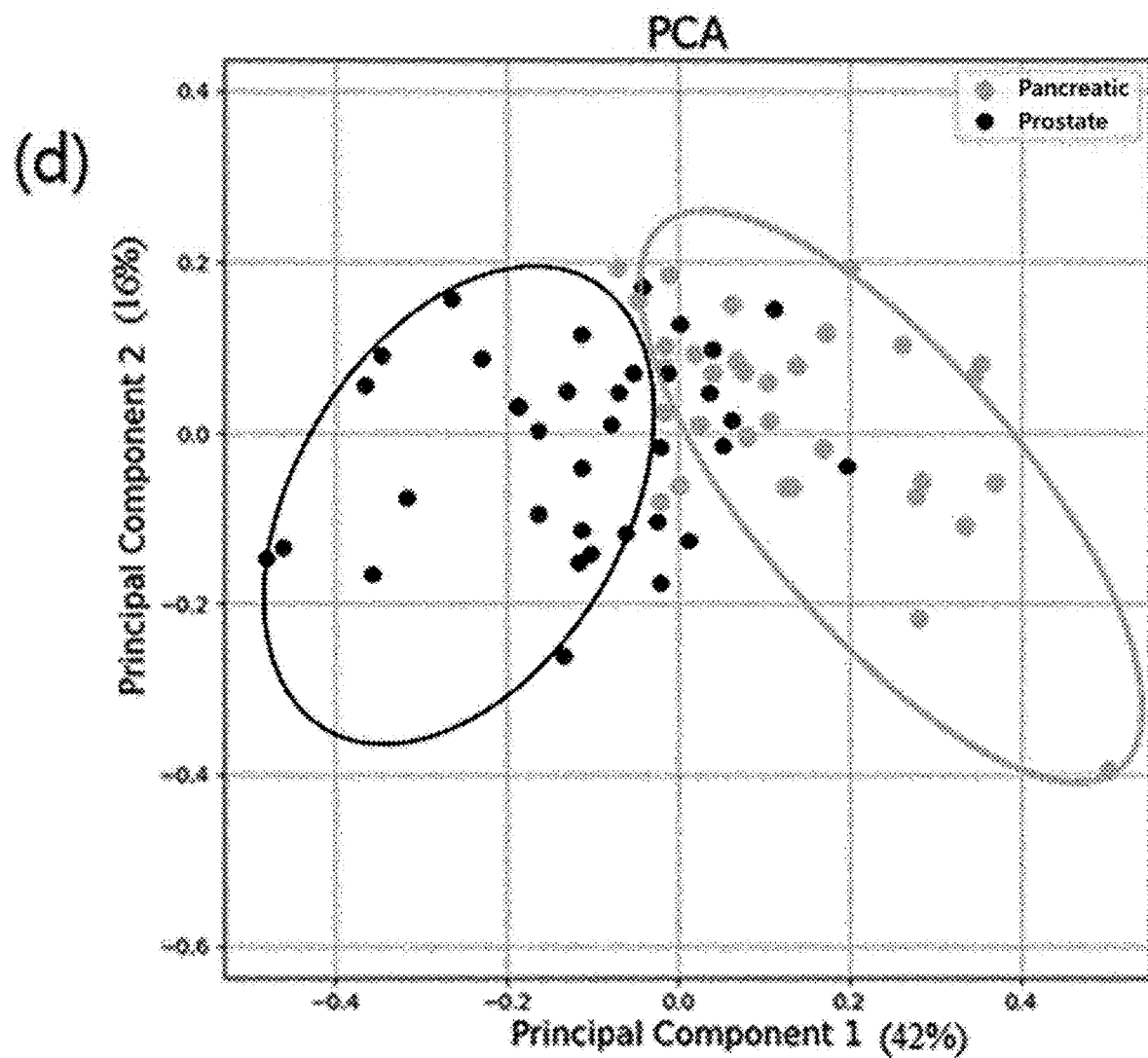
Figure 14C:
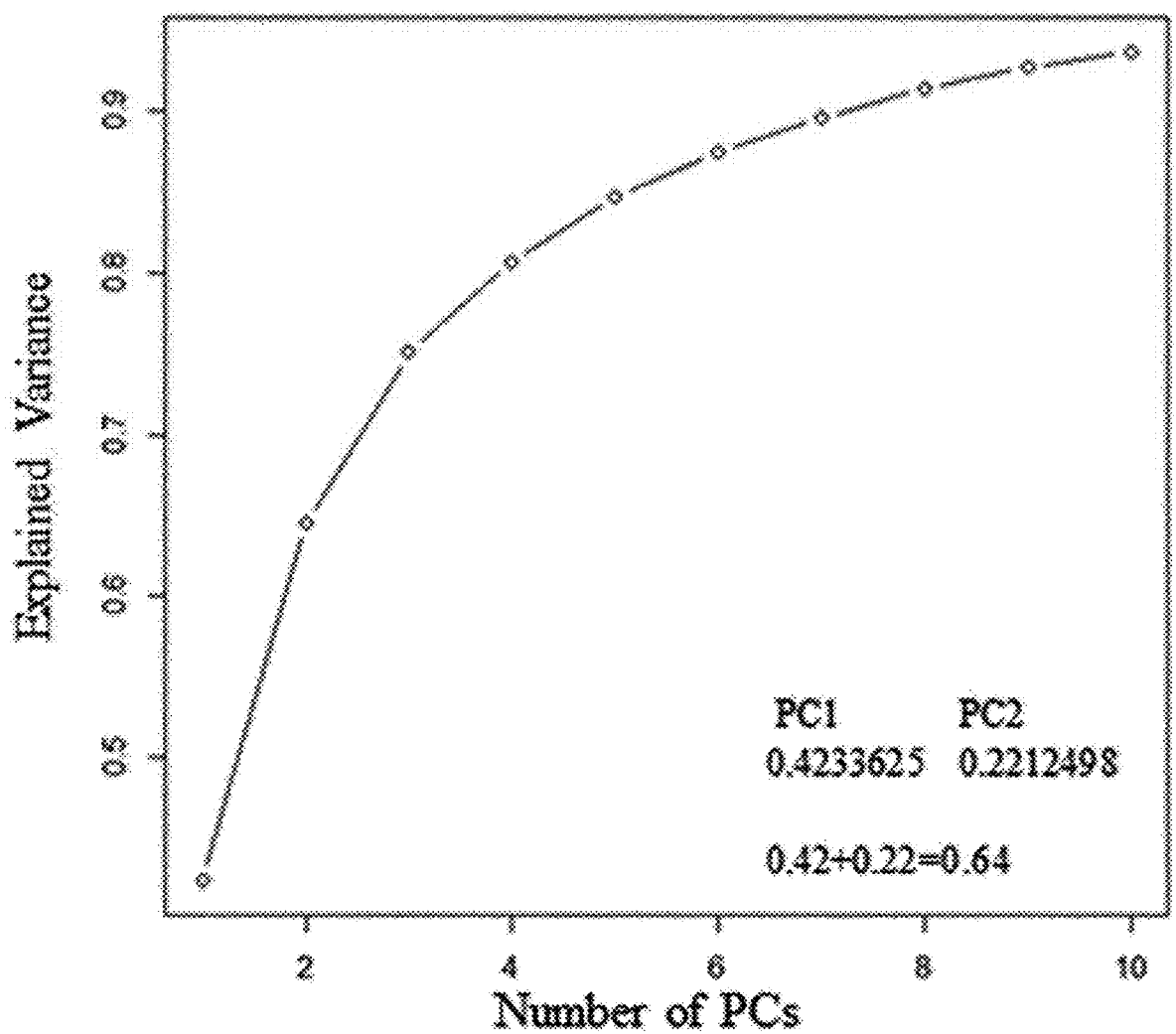
Figure 14D:
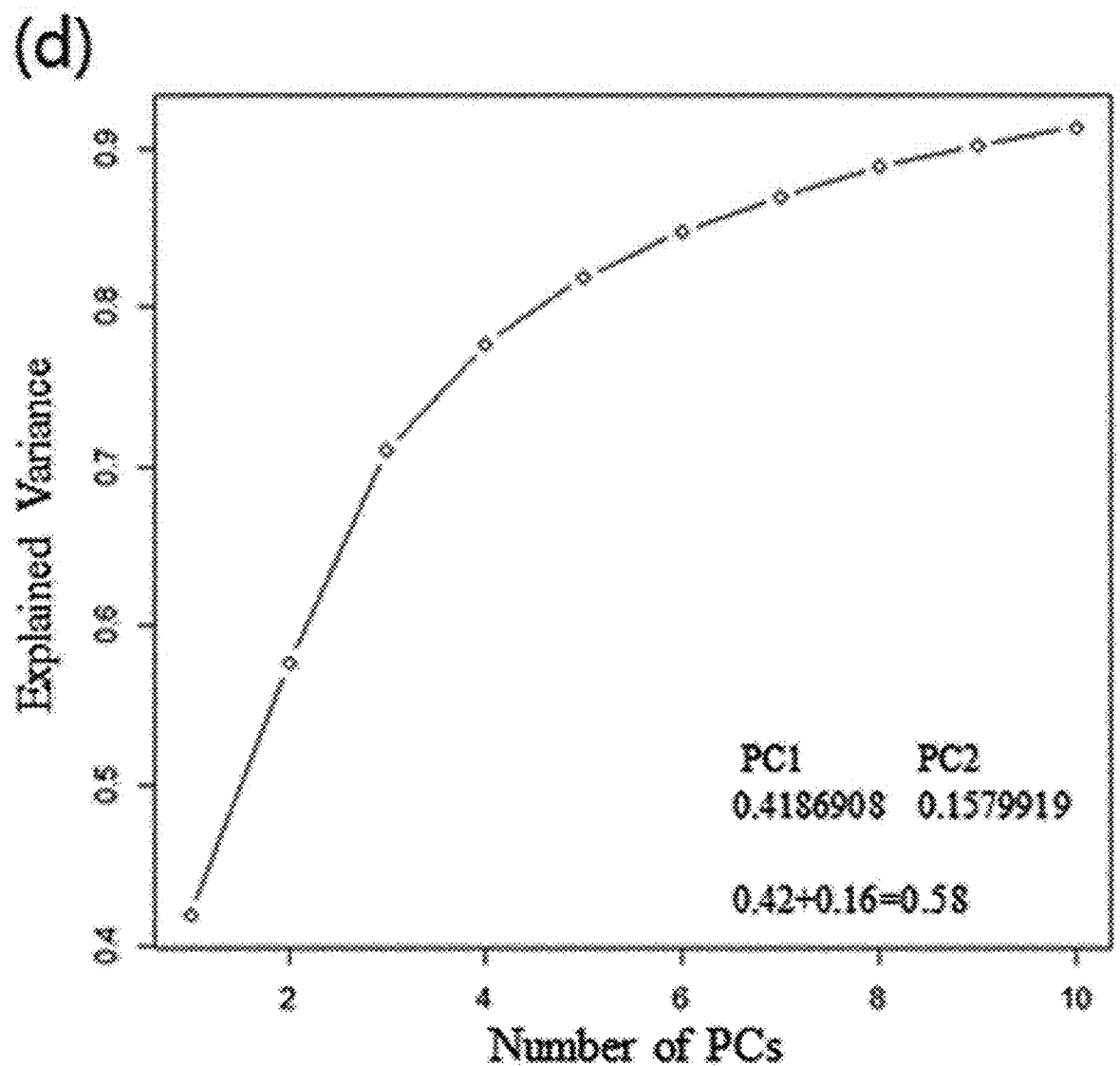

As can be seen in FIG. 14a, the cumulative variance value between the normal control group and the cancer patient group is 0.61. In FIG. 14b, the cumulative variance value between the normal control group and the pancreatic cancer patient group is 0.69. In FIG. 14c, the cumulative variance value between the normal control group and the prostate cancer patient group is 0.64. In FIG. 14d, the cumulative variance value between the pancreatic cancer patient group and the prostate cancer patient group is 0.58. Although there was some overlap between cancer types such as pancreatic cancer and prostate cancer to a relatively small extent, the overall distinction between individual groups was confirmed.

9-3. OPLS-DA Result

Predictable supervised OPLS-DA was additionally performed. PCA, a feature extraction method of unsupervised learning, is to obtain a new principal component using only the independent variable (X) while OPLS-DA is useful for spectroscopic analysis because it finds new variables by considering the correlation between the independent variable and the dependent variable (Y) of the quantitative response. The SERS spectra of the baseline-corrected normalized data were used, and the results of OPLS-DA were derived using the R program and are shown in FIGS. 15a to 15d.

Figure 15A:
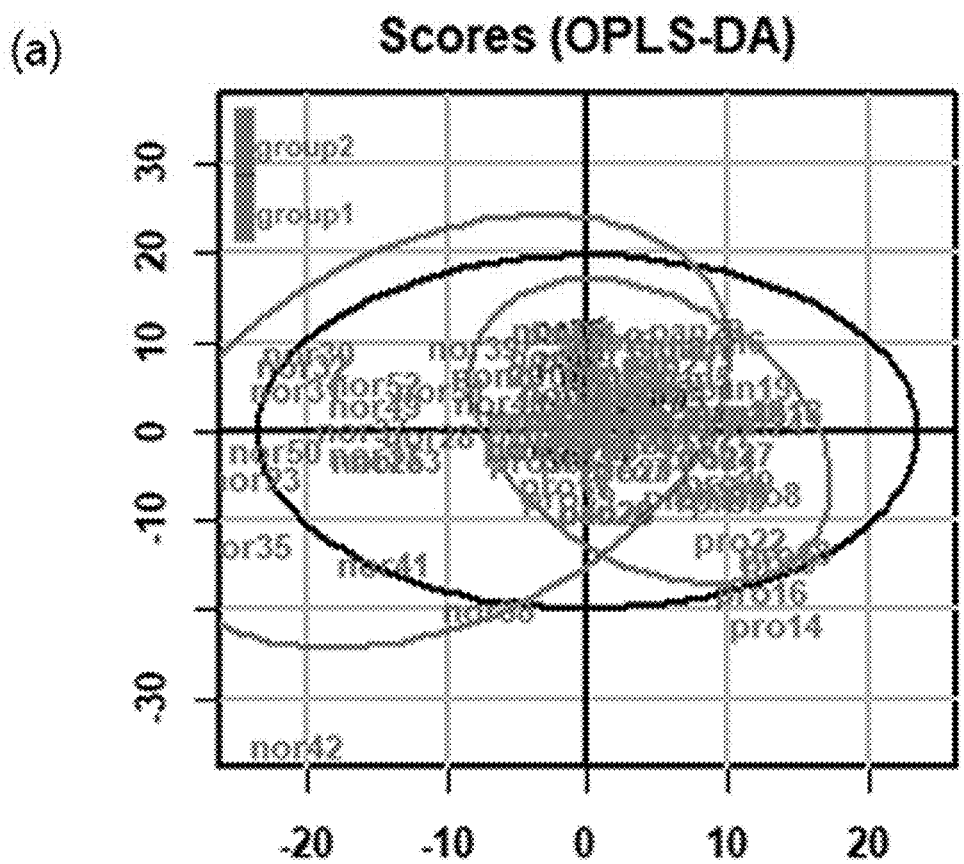
FIGS. 15a, 15b, 15c and 15d show OPLS-DA results of methanol-pretreated samples according to an embodiment of the present disclosure.

As can be seen in FIG. 15a, analysis of the data of the normal control group and the patient groups with pancreatic cancer and prostate cancer resulted in classification of 98 urine samples with a sensitivity of 88.5%, a specificity of 100%, and an accuracy of 90.8%.

Figure 15B:
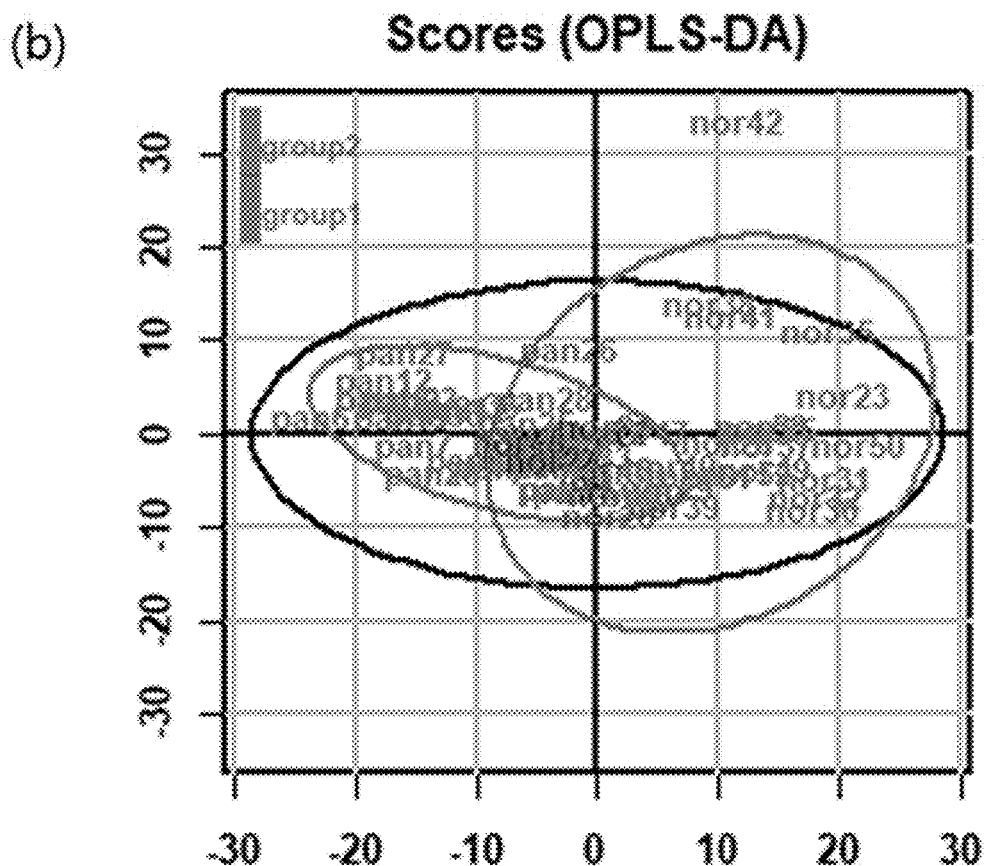

As can be seen in FIG. 15b, analysis of the data of only the normal control group and the pancreatic cancer patient groups resulted in classification of 62 urine samples with a sensitivity of 89.2%, a specificity of 100%, and an accuracy of 93.5%.

Figure 15C:
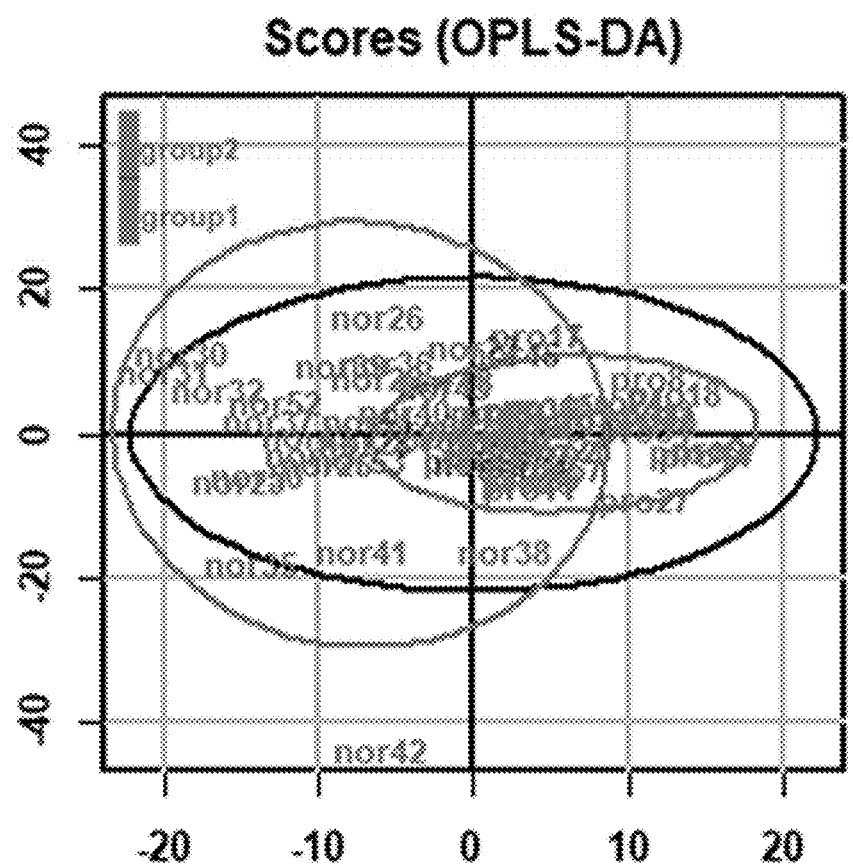

As can be seen in FIG.15c, in both cases, the specificity was measured at 100%, indicating that the normal control group was correctly classified. Analysis of the data of only the normal control group and the prostate cancer patient groups resulted in classification of 65 urine samples with a sensitivity of 85%, a specificity of 92%, and an accuracy of 87.7%.

Figure 15D:
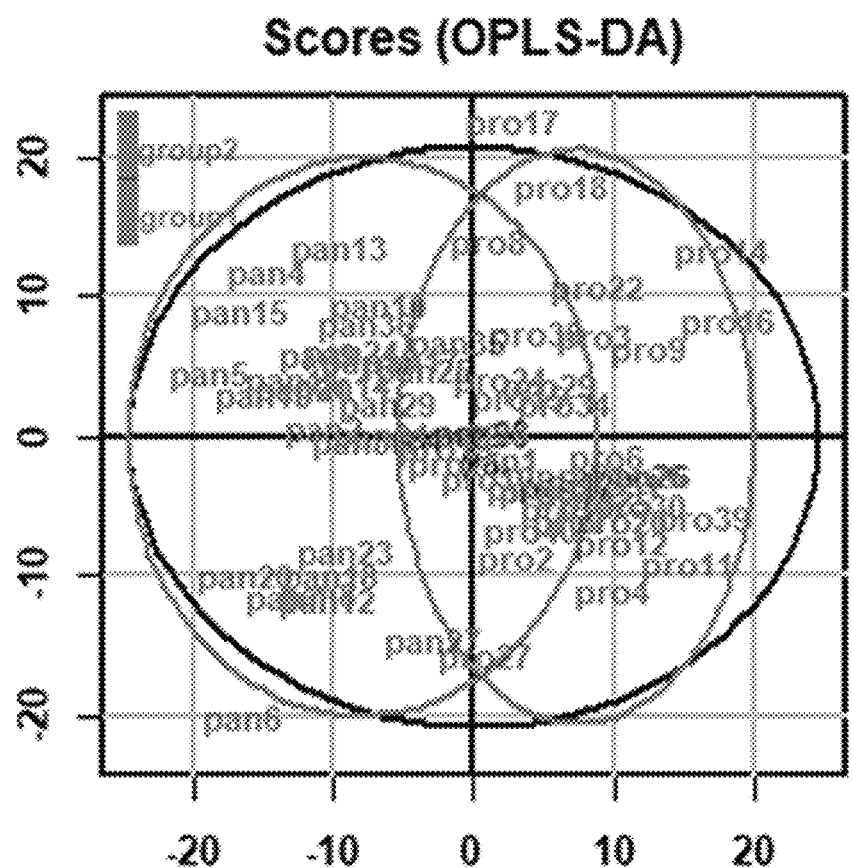

As can be seen in FIG. 15d, although different from the previous case, high sensitivity, specificity, and accuracy values were obtained on the whole. Finally, OPLS-DA was performed for the patient groups with pancreatic cancer and prostate cancer. 325 A total of 69 urine samples were classified with a sensitivity of 93.5%, a specificity of 89.5%, and an accuracy of 91.3%. The OPLS-DA classification between individual groups derived statistical data with significance on the whole.

The OPLS-DA model obtained in the above experimental example was verified with the values of R2Y (sum of squares) and Q2 (predictive performance). R2Y represents the goodness of fit and Q2 accounts for predictive ability of the model. A value of R2=1 means perfect fit of the data by the model, and a value of Q2=1 means perfect predictability. There are no comparison criteria or thresholds for significance inference for Q2, but significant values for Q2 are close to R2Y, and values of for biological models are generally reliable and acceptable. Therefore, the OPLS-DA model of this study showed high reliability in the fit and prediction for the normal control group and the cancer group. The classification of pancreatic and prostate cancers is relatively unpredictable, but its values are acceptable. In addition, the Root Mean Square Error of Estimation (RMSEE) of OPLS-DA for each group indicates that the OPLS-DA model was not overfitted.

INDUSTRIAL APPLICABILITY

The present disclosure relates to a method for fabrication of a surface-enhanced Raman scattering substrate, a method for pretreatment of urine, and a method for providing information necessary for cancer diagnosis through analysis of metabolites in urine using same.

What is claimed is:

1. A urine pretreatment method for surface-enhanced Raman spectroscopy-based analysis of metabolites in urine, the method comprising:
a sample preparation step of preparing a sample on the substrate; and
a treatment step of adding a cation or an organic solvent to the sample,
wherein the substrate is fabricated by:
a filtration step of passing a silver nanowire solution through a glass fiber filter;
a drying step of drying the filtered substrate; and
a carbonization step of thermally treating the substrate at 200 to 300° C. for 3 to 24 hours.

2. The method of claim 1, wherein the sample preparation step comprises a precipitate removal step of removing particles contained in the sample.

3. The method of claim 2, wherein the precipitate removal step is carried out by one selected from the group consisting of syringe filtration, membrane filtration, and centrifugation.

4. The method of claim 1, wherein the sample preparation step comprises a step of removing precipitates contained in the sample by centrifugation to obtain a supernatant.

5. The method of claim 1, wherein the sample is at least one selected from the group consisting of a tissue extract, a cell lysate, whole blood, plasma, serum, saliva, ocular humor, cerebrospinal fluid, sweat, milk, ascitic fluid, synovial fluid, peritoneal fluid, and urine.

6. The method of claim 1, wherein the treatment step is carried out by adding to the sample at least one cation selected from $MgCl_2$, $CaCl_2$, and $Ca(NO_3)_2$.

7. The method of claim 6, wherein the cation is used at a final concentration of 0.01 mM to 1 mM.

8. The method of claim 1, wherein the organic solvent is selected from the group consisting of methanol, chloroform, and DMSO.

9. The method of claim 1, wherein the addition of an organic solvent in the treatment step comprises the steps of adding an organic solvent to the sample and separating the organic solvent.

10. A method for providing information necessary for cancer diagnosis through surface-enhanced Raman spectrometry-based analysis of metabolites in urine, the method comprising:
a specimen pretreatment step of pretreating a specimen;
a sample preparation step of loading the specimen on to the surface-enhanced Raman scattering substrate and drying same;
a light application step of applying a laser beam to the surface-enhanced Raman scattering substrate;
a measurement step of measuring surface-enhanced Raman scattering (SERS) signals; and
an analysis step of comparing and analyzing patterns of the measured SERS signals,
wherein the surface-enhanced Raman scattering substrate is fabricated by:
a filtration step of passing a silver nanowire solution through a glass fiber filter:
a drying step of drying the filtered substrate; and
a carbonization step of thermally treating the substrate at 200 to 300° C. for 3 to 24 hours.

11. The method of claim 10, wherein the specimen pretreatment step is carried out in a method comprising: a sample preparation step of preparing a sample; and a treatment step of adding a cation or an organic solvent to the sample.

12. The method of claim 10, wherein the analysis step is conducted in a non-autonomous learning manner or in an autonomous learning manner.

13. The method of claim 10, wherein the cancer is at least one selected from the group consisting of lung cancer, bronchial cancer, colorectal cancer, breast cancer, stomach cancer, ovarian cancer, bladder cancer, brain cancer, thyroid cancer, esophageal cancer, uterine cancer, liver cancer, gallbladder cancer, pancreatic cancer, and prostate cancer.

* * * * *